United States Patent
Spiegel et al.

[11] Patent Number: 5,940,538
[45] Date of Patent: *Aug. 17, 1999

[54] APPARATUS AND METHODS FOR OBJECT BORDER TRACKING

[76] Inventors: Ehud Spiegel, Rehov Mordei Hagetaot 10, Rehovot 76464, Israel; Yosef Pastor, Rehov Hagalil 56, Haifa 32225, Israel

[ * ] Notice: This patent issued on a continued prosecution application filed under 37 CFR 1.53(d), and is subject to the twenty year patent term provisions of 35 U.S.C. 154(a)(2).

[21] Appl. No.: 08/692,297

[22] Filed: Aug. 5, 1996

[30] Foreign Application Priority Data

Aug. 4, 1995 [IL] Israel .......................................... 114838

[51] Int. Cl.⁶ ..................................................... G06K 9/36
[52] U.S. Cl. .......................... 382/236; 345/473; 382/107; 382/256
[58] Field of Search ..................................... 348/169, 384, 348/390, 403, 404, 407, 700, 170, 402, 413, 416, 699; 382/103, 209, 236, 278, 107, 199, 257; 364/516, 728.07; 345/473–475

[56] References Cited

U.S. PATENT DOCUMENTS

| | | | |
|---|---|---|---|
| 5,311,305 | 5/1994 | Mahadevan et al. | 348/169 |
| 5,587,927 | 12/1996 | Nagao et al. | 364/514 A |
| 5,625,715 | 4/1997 | Trew et al. | 382/236 |
| 5,638,116 | 6/1997 | Shimoura et al. | 348/118 |
| 5,717,463 | 2/1998 | Brailean et al. | 348/416 |

*Primary Examiner*—Jon Chang
*Assistant Examiner*—Jayanti K. Patel
*Attorney, Agent, or Firm*—Abelman, Frayne & Schwab

[57] ABSTRACT

A tracking method including receiving a representation of an event including at least one dynamic object having a border and having at least one edge portion which is absent during at least a portion of the event and providing an ongoing indication of the location of the border of the object during the event. Apparatus for carrying out the method is also disclosed.

36 Claims, 51 Drawing Sheets

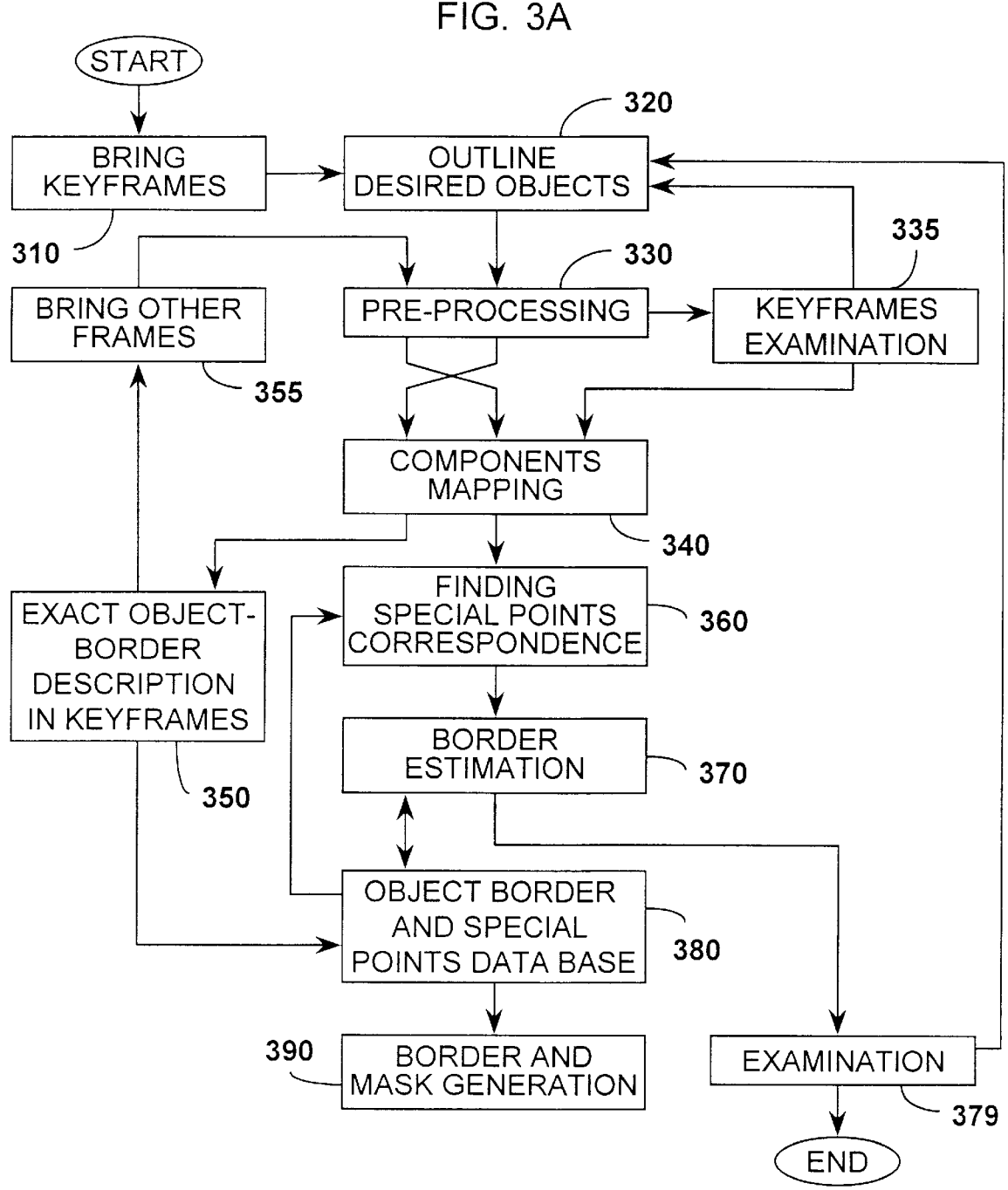

FIG. 12B

|  |  |  |  | 1267 |  |
|---|---|---|---|---|---|
|  |  | 1266 | 1263 | 1267 |  |
|  |  |  |  | 1264 |  |
|  |  |  |  | 1264 |  |
|  |  | 1261 | 1262 | 1265 | 1265 |
|  | 1261 |  |  |  |  |
| 1261 |  |  |  |  |  |

FIG. 13B

| I3 | | | I1 | | |
|----|----|----|----|----|----|
| | I3 | | I1 | I2 | I2 |
| | I3 | I2 | I1 | I3 | I3 |
| | I3 | I2 | I1 | | |
| | | I3 | I1 | I3 | I3 |
| | I3 | I1 | | | |
| I3 | | I1 | I2 | I2 | |

FIG. 13C

| I3 |    |    |    |    |    |
|----|----|----|----|----|----|
|    | I3 |    |    | I2 | I2 |
|    | I3 | I2 |    | I3 | I3 |
|    | I3 | I2 |    |    |    |
|    |    | I3 |    | I3 | I3 |
|    | I3 |    |    |    |    |
| I3 |    |    | I2 | I2 |    |

FIG. 13D

| I3 |    |    |    |    |    |
|----|----|----|----|----|----|
|    | I3 |    |    | I2 | I2 |
|    |    | I2 |    |    |    |
|    |    | I2 |    |    |    |
|    |    | I3 |    | I3 | I3 |
|    | I3 |    |    |    |    |
| I3 |    |    | I2 | I2 |    |

FIG. 13E

| I3 |    |    | I1 |    |    |
|----|----|----|----|----|----|
|    | I3 |    | I1 | I2 | I2 |
|    |    | I2 | I1 |    |    |
|    |    | I2 | I1 |    |    |
|    |    | I3 | I1 | I3 | I3 |
|    | I3 | I1 |    |    |    |
| I3 |    | I1 | I2 | I2 |    |

FIG. 13F

| I3 |    |    | I1 |    |    |
|----|----|----|----|----|----|
|    | I3 |    | I1 | I2 | I2 |
|    |    | I2 | I1 |    |    |
|    |    |    | I1 |    |    |
|    |    |    | I1 | I3 | I3 |
|    | I3 | I1 |    |    |    |
| I3 |    | I1 | I2 | I2 |    |

APPARATUS AND METHODS FOR OBJECT BORDER TRACKING

FIELD OF THE INVENTION

The present invention relates to image processing systems in general, and to object identification and tracking systems in particular.

BACKGROUND OF THE INVENTION

U.S. Pat. No. 5,333,213 to Koyama et al. describes a method and apparatus for image region extraction, extracting an image of a moving object in a dynamic image.

U.S. Pat. No. 5,067,014 to Bergen et al. describes a technique for analyzing two motions in successive image frames.

U.S. Pat. No. 5,134,472 to Abe describes a method and apparatus for moving object detection.

Published European patent application EP 0 532 823 A2 describes a method for separating images.

U.S. Pat. No. 5,274,453 to Maeda describes an image processing system using mask information to combine a plurality of images.

U.S. Pat. No. 5,345,313 to Blank describes an image editing system which takes a background and inserts part of an image in the background.

U.S. Pat. No. 5,093,869 to Alves et al. describes pattern recognition apparatus including high level graph matching.

Mathematical methods useful for image processing are described in the following references:

A. Rosenfeld, R. A. Hummel, and S. W. Zucker, "Scene Labeling by Relaxation Operations", IEEE Transactions on Systems, Man, and Cybernetics, Vol. SMC—6, Num. 6, June 1976.

D. K. Ballard and C. M. Brown, *Computer Vision*, Prentice-Hall, 1982;

C. de Boor, *A Practical Guide to Splines*, New York, Springer-Verlag, 1978;

P. J. Schneider, "An algorithm for automatically fitting digitized curves", Graphic GEMs I, Academic Press, Inc.;

S. T. Barnard and W. B. Thompson, "Disparity analysis of images", IEEE transactions on pattern analysis and machine intelligence", PAMI—2, No. 4, July 1980;

Yu-Ichi Ohta, Takeo Kanada, and T. Sakai, "Color Information for Region Segmentation", Computer Graphics and Image Processing 13, 222 241, 1980;

Yija Lin, Jiqing Dou and Eryi Zhang, "Edge expression based on tree structure", Pattern Recognition Vol. 25, No. 5, pp 507–517, 1992;

G. G. Pieroni and M. F. Costabile, "A method for detecting correspondences in a sequence of modifying shapes", Pattern Recognition Letters 3 (1985); and R. N. Strickland and Zuhua Mao, "Computing Correspondences in a sequence of non-rigid shapes", Pattern Recognition, Vol. 25, No 9, 1992, pp. 901–912.

The disclosures of all of the above publications and all references cited therein are hereby incorporated herein by reference. The disclosure of all publications mentioned in the specification and all references cited therein are also hereby incorporated herein by reference.

SUMMARY OF THE INVENTION

The present invention seeks to provide an improved object identification and tracking system.

There is thus provided in accordance with a preferred embodiment of the present invention a tracking method including receiving a representation of an event including at least one dynamic object having a border and having at least one edge portion which is absent during at least a portion of the event, and providing an ongoing indication of the location of the border of the object during the event.

Further in accordance with a preferred embodiment of the present invention the representation includes a video representation.

Still further in accordance with a preferred embodiment of the present invention the edge portion includes a portion of the border.

Additionally in accordance with a preferred embodiment of the present invention the method also includes reconstructing at least one absent edge portion.

There is also provided in accordance with another preferred embodiment of the present invention a tracking method including receiving a representation of an event including at least one dynamic object having a border, and providing an ongoing indication of the location of the border of the object during the event.

There is also provided in accordance with another preferred embodiment of the present invention an edge-tracking method for tracking at least one dynamic object appearing in a sequence of frames, the method including for at least one key frame within the sequence of frames, marking at least one edge of at least one dynamic object based at least partly on external input, and for all frames within the sequence of frames other than the at least one key frame, automatically marking at least one edge of at least one dynamic object based on output from the first marking step.

Further in accordance with a preferred embodiment of the present invention the method also includes remarking said at least one automatically marked edge at least once, based on external input.

Still further in accordance with a preferred embodiment of the present invention the external input includes human operator input.

Additionally in accordance with a preferred embodiment of the present invention at least one edge is marked without detecting the edge.

Moreover in accordance with a preferred embodiment of the present invention the at least one key frame includes a subsequence of frames preceding all other frames within the sequence.

Further in accordance with a preferred embodiment of the present invention the at least one key frame includes a subsequence of frames following all other frames within the sequence.

Still further in accordance with a preferred embodiment of the present invention the at least one key frame includes a subsequence of frames preceding at least one other frame within the sequence and following at least one other frame within the sequence.

There is also provided in accordance with another preferred embodiment of the present invention an edge-structuring method for structuring a plurality of connected edges into a graph, the method including providing a plurality of connected edges, traversing the plurality of connected edges in a chosen direction, and structuring the plurality of connected edges into a graph including a branch list and a node list, wherein the node list is independent of the chosen direction.

Further in accordance with a preferred embodiment of the present invention the node list includes an edge junction list.

Still further in accordance with a preferred embodiment of the present invention the node list includes an edge terminal point list.

Additionally in accordance with a preferred embodiment of the present invention the node list includes an edge corner list.

Moreover in accordance with a preferred embodiment of the present invention the node list includes a curvature list.

Further in accordance with a preferred embodiment of the present invention the plurality of connected edges includes a plurality of pixels and wherein the traversing step includes specifying a current pixel, identifying at least one visible pixel associated with the current pixel, and classifying the current pixel based, at least in part, on the number of visible pixels identified.

Still further in accordance with a preferred embodiment of the present invention the identifying step includes defining a blind strip, and ruling out as visible pixels at least one pixel associated with the blind strip.

Additionally in accordance with a preferred embodiment of the present invention the ruling out step includes ruling out as visible pixels all pixels associated with the blind strip whenever there is at least one visible pixel not associated with the blind strip.

There is also provided in accordance with another preferred embodiment of the present invention a method for tracking a border of a moving object, the method including selecting a plurality of border locations to be tracked in a first image, tracking at least some of the plurality of border locations from the first image to a second image, and computing the border in the second image based on an output of the tracking step and based on information characterizing the border in the first image.

Further in accordance with a preferred embodiment of the present invention at least one of the plurality of border locations includes a location at which at least one border characteristic changes.

Still further in accordance with a preferred embodiment of the present invention the border characteristic includes at least one color adjacent to the border.

Additionally in accordance with a preferred embodiment of the present invention the tracking includes disregarding a border location which, when tracked from the first image to the second image, is found to have moved differently from other adjacent border locations.

Moreover in accordance with a preferred embodiment of the present invention the computing step includes transforming the border in the first image such that each of the plurality of border locations in the first image is transformed onto a corresponding one of the plurality of border locations in the second image.

Further in accordance with a preferred embodiment of the present invention the method also includes identifying an actual border in the second image by searching adjacent to the border as computed in the second image.

Still further in accordance with a preferred embodiment of the present invention an actual border is identified depending on whether the adjacent colors of the actual border resemble the adjacent colors of the border in the first image.

Additionally in accordance with a preferred embodiment of the present invention an output border is defined as the actual border, if identified, and as the border as computed in the second image, if no actual border is identified.

Moreover in accordance with a preferred embodiment of the present invention a first output border is defined which coincides in part with the actual border, where the actual border has been identified, and in part with the border as computed in the second image, where the actual border has not been identified.

Further in accordance with a preferred embodiment of the present invention the method also includes identifying a new actual border in the second image by searching adjacent to the first output border, and defining a new output border which coincides in part with the new actual border, where the new actual border has been identified, and in part with the first output border, where the new actual border has not been identified.

Still further in accordance with a preferred embodiment of the present invention the transforming step includes transforming a spline representation of the border in the first image such that each of the plurality of border locations in the first image is transformed onto a corresponding one of the plurality of border locations in the second image.

Additionally in accordance with a preferred embodiment of the present invention the method also includes providing a first image seen from a first field of view and providing a second image seen from a different field of view.

Moreover in accordance with a preferred embodiment of the present invention the method also includes providing first and second images each including at least one of a moving dynamic object and a dynamic background.

Further in accordance with a preferred embodiment of the present invention the disregarding step employs a relaxation technique to identify border locations which have moved differently from other adjacent border locations.

Still further in accordance with a preferred embodiment of the present invention the automatic marking step includes automatically marking all edges of at least one dynamic object based on output from the first marking step.

There is also provided in accordance with another preferred embodiment of the present invention tracking apparatus including event input apparatus operative to receive a representation of an event including at least one dynamic object having a border and having at least one edge portion which is absent during at least a portion of the event, and a border locator operative to provide an ongoing indication of the location of the border of the object during the event.

There is also provided in accordance with another preferred embodiment of the present invention edge-tracking apparatus for tracking at least one dynamic object appearing in a sequence of frames, the apparatus including an edge marker operative, for at least one key frame within the sequence of frames, to mark at least one edge of at least one dynamic object based at least partly on external input, and an automatic edge marker operative, for all frames within the sequence of frames other than the at least one key frame, to automatically mark at least one edge of at least one dynamic object based on output from the first marking step.

There is also provided in accordance with another preferred embodiment of the present invention edge-structuring apparatus for structuring a plurality of connected edges into a graph, the apparatus including an edge traverser operative to traverse the plurality of connected edges in a chosen direction, and a graph structurer operative to structure the plurality of connected edges into a graph including a branch list and a node list, wherein the node list is independent of the chosen direction.

There is also provided in accordance with another preferred embodiment of the present invention apparatus for tracking a border of a moving object, the apparatus including a border selector operative to select a plurality of border locations to be tracked in a first image, a border tracker operative to track at least some of the plurality of border locations from the first image to a second image, and border computation apparatus operative to compute the border in the second image based on an output of the border tracker and based on information characterizing the border in the first image.

There is also provided in accordance with another preferred embodiment of the present invention tracking apparatus including event input apparatus operative to receive a representation of an event including at least one dynamic object having a border, and a border locator operative to provide an ongoing indication of the location of the border of the object during the event.

Further in accordance with a preferred embodiment of the present invention, the method also includes generating an effect which is applied differentially on different sides of the border.

Still further in accordance with a preferred embodiment of the present invention, the method also includes generating an effect which is applied differentially on different sides of the at least one edge.

Additionally in accordance with a preferred embodiment of the present invention, the effect includes an effect which is carried out at a location determined by a portion of the dynamic object.

Also provided, in accordance with another preferred embodiment of the present invention, is an image modification method including receiving a representation of an event, the representation including a plurality of frames, the event including at least one dynamic object having a border, computing the location of the border of the dynamic object during the event, generating an effect which is applied differentially on different sides of the border, and displaying a result of applying the effect without previously displaying a separate representation of the border.

Further in accordance with a preferred embodiment of the present invention, the step of generating an effect is performed on a subsequence of frames, including a plurality of frames, within the sequence of frames after an automatic marking step has been performed for the subsequence of frames.

Still further in accordance with a preferred embodiment of the present invention, the step of generating an effect is performed on an individual frame from among the sequence of frames after an automatic marking step has been performed for the individual frame.

Additionally in accordance with a preferred embodiment of the present invention, the effect is generated and displayed for an individual frame before the effect is generated for a subsequent frame.

Further in accordance with a preferred embodiment of the present invention, the effect is displayed for all of the plurality of individual frames without expecting user input between frames.

Further in accordance with a preferred embodiment of the present invention, there is provided an image marking method including receiving a representation of an event, the representation including a plurality of frames, the event including at least one dynamic object having a border, computing the location of the border of the dynamic object during the event, and providing a user-sensible indication of locations of the dynamic object during the event, without previously displaying a separate representation of the border.

Still further in accordance with a preferred embodiment of the present invention, the effect includes one of the following group of effects: compositing, retouching, smoothing, compression, compositing, painting, blurring, sharpening, a filter operation, and an effect which changes over time at a different rate on different sides of the edge.

Additionally in accordance with a preferred embodiment of the present invention, the event includes a plurality of dynamic hotspot objects and wherein the providing step includes providing an ongoing indication of locations of borders of each of the plurality of dynamic hotspot objects during the event.

Further in accordance with a preferred embodiment of the present invention, the method also includes the steps of using the ongoing indication of locations of the borders of each of the hotspot objects to interpret a user's selection of an individual one of the plurality of dynamic hotspot objects, and displaying information regarding the individual dynamic hotspot object selected by the user.

Still further in accordance with a preferred embodiment of the present invention, the dynamic object is a portion of a larger object.

BRIEF DESCRIPTION OF THE DRAWINGS

The present invention will be understood and appreciated from the following detailed description, taken in conjunction with the drawings in which:

FIG. 3A is a simplified block diagram of apparatus, such as the dynamic object border tracker 70 of FIG. 1, for performing the method of FIG. 2A;

FIG. 12B which is a simplified pictorial illustration depicting a portion of the operation of steps 1240 and 1260 of FIG. 12A;

FIGS. 13B–13F are simplified pictorial illustrations illustrating the operation of steps 1320 and 1330 of FIG. 13A;

Attached herewith are the following appendices which aids in the understanding and appreciation of one preferred embodiment of the invention shown and described herein:

Appendices A–D comprise a preferred software implementation of a method operative in accordance with a preferred embodiment of the present invention.

DETAILED DESCRIPTION OF PREFERRED EMBODIMENTS

Figure 1:
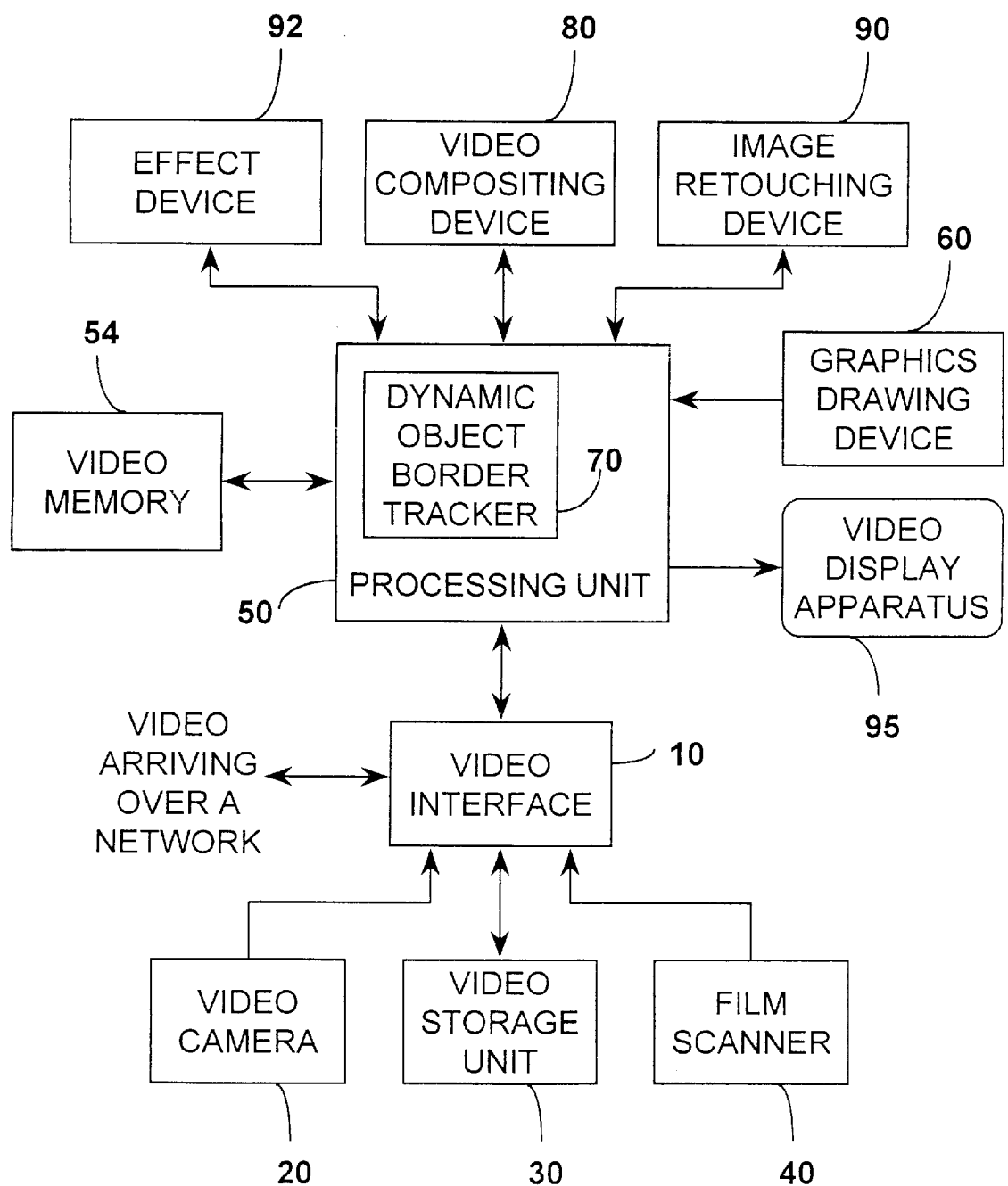
FIG. 1 is a simplified top-level block diagram of a dynamic object processing system constructed and operative in accordance with a preferred embodiment of the present invention.

Reference is now made to FIG. 1 which is a simplified top-level block diagram of a dynamic object processing system constructed and operative in accordance with a preferred embodiment of the present invention. The term "dynamic object" is here intended to include objects which are stationary at times and at motion at other times, as well as objects which are always in motion.

The system of FIG. 1 receives a sequence of time-varying images such as animation, photographed or other video images from any suitable source, via a suitable video interface 10 which may include an A/D unit if the input thereto is analog. Suitable video sources include, for example, a video camera 20, a network, a video storage unit 30 (video memory, video disk, tape, CD-ROM or hard disk) or a film scanner 40.

The system includes processing unit 50, associated with a video memory 54. The processing unit 50 may, for example, be any appropriate computer equipped with video capability and programmed with appropriate software. For example, an IBM compatible Pentium PC, equipped with video I/O cards, as are well known in the art, may be used. Alternatively, the processing unit 50 may be implemented partly or completely in custom hardware or otherwise.

The processing unit 50 receives from a suitable user input device such as a graphics drawing device 60 (e.g. tablet and stylus or mouse), an indication of at least one initial border of at least one dynamic object, in an initial frame. Alternatively, the indication may be of borders of the dynamic object as it appears other than in the initial frame.

The term "frame", as used throughout the present specification and claims, refers to either a frame as generally understood in the art or, in the case of interlaced video wherein a frame as generally understood in the art comprises more than one field, any of the fields comprising a frame as generally understood in the art.

The frame or frames for which the user provides a border indication (here termed "a reference border") are termed herein "key frames". Preferably, key frames are selected to be those frames in which a characteristic of the dynamic object's appearance changes, e.g. due to a change in the object's motion or due to occlusion by another object or due to light condition changes.

It is appreciated that the frames, whether key frames or non-key frames, may comprise a plurality of frames seen from more than one field of view, such as, for example, two different fields of view, or a dynamic field of view.

It is appreciated that the frames may comprise frames depicting a dynamic object, a dynamic background, or both.

The processing unit 50 includes a dynamic object border tracker 70 which is operative to track the borders of the dynamic object through non-key frames, based on the locations of the borders in the key frames. It is appreciated that the dynamic object border tracker 70 may preferably be operative to track borders in any direction through the non-key frames, that is, forwards, backwards, converging from both ends, and so forth.

Preferably, the dynamic object border tracker 70 is operative to complete a border by adding border segments which the tracker 70 did not succeed in finding. These border segments are termed herein "missing border segments".

The user may interactively correct the tracking of the border through either key frames or non-key frames by means of the drawing device 60.

The output of the dynamic object border tracker 70 typically comprises an indication of the location of the border for each of the frames of the image sequence. The border location indication typically comprises a mask, having "1" values at the border and "0" values other than at the border. The border location indication is fed to and utilized by any of a plurality of application devices, thereby enabling an operator to issue a single command for processing the dynamic object in the entire image sequence, rather than having to process the dynamic object "frame by frame", i.e. separately for each frame. Similarly, processing of the background in the entire image sequence may also be carried out without having to process separately for each frame.

Examples of suitable application devices include:
 a. A video compositing device 80, operative to generate a video image comprising a plurality of "layers".
 b. An image retouching device 90, operative to perform one-step enhancement, segmentation or special effects, on at least one dynamic object in the image sequence, rather than frame-by-frame retouching of the dynamic object. Retouching operations include: color alteration, filtering, as, for example, noise reduction, sharpening, or other types of filtering; and effects, as, for example, tiling.

Alternatively, the border location may be fed elsewhere, as, for example, to the network or to the video storage unit 30.

Preferably, a video display device 95 provides a display which facilitates interactive sessions.

It is believed that the border location indication may also be employed for a variety of other applications, including, for example, the following:
 a. video rate conversion or video standard conversion.
 b. image compression in which at least one dynamic object in the image is compressed differently, typically more accurately, than the remaining portions of the image.
 c. Scene analysis, such as automatic navigation applications in which the borders of encountered objects are tracked so as to determine an optimal route therepast.

Figure 2A:
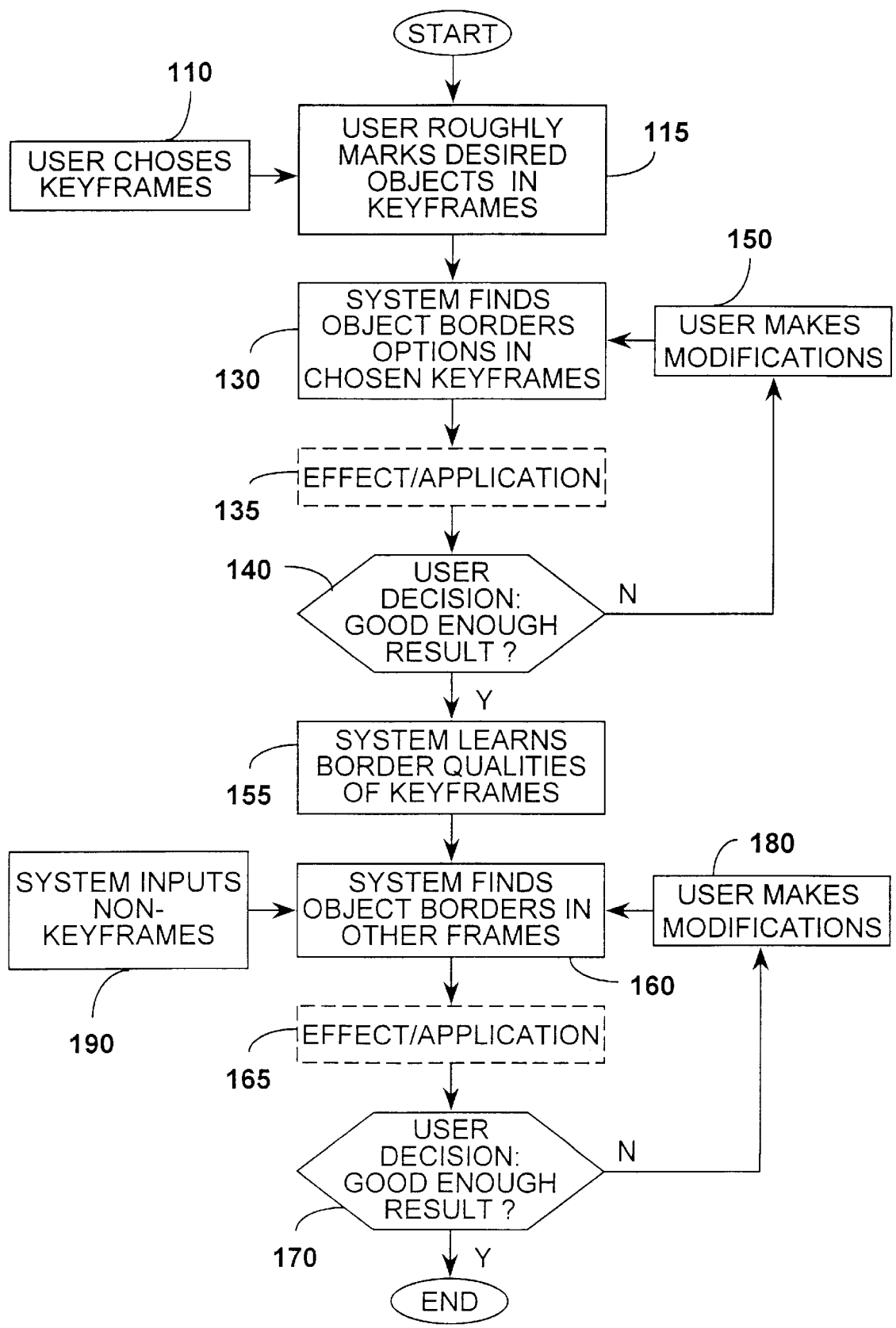
FIG. 2A is a simplified flowchart of an interactive process for identifying boundaries of an object of interest in at least one key frame from among a sequence of frames and for marking the boundaries in the remaining frames from among the sequence of frames.

Reference is now made to FIG. 2A which is a simplified flowchart for interactive operation of the dynamic object border tracker of FIG. 1. In the method of FIG. 2A, boundaries of an object of interest are identified in at least one key frame from among a sequence of frames and are utilized for marking the boundaries in the remaining frames from among the sequence of frames.

The user may select or localize borders by any suitable method such as:
 a. As shown in FIG. 2A (step 115), rough manual marking of border location of an object of interest, e.g. by means of a brush operated by a tablet's stylus, such as a stylus associated with the graphics drawing device 60. The system then attempts to find a plurality of candidate edges within the rough marking. These candidate edges are displayed to the user who selects an appropriate edge from among them.

Alternatively, the following border selection or localization methods may, for example, be employed:
 b. The user may mark the exact border location manually.
 c. A spline tool or other curve drawing tool may be employed by the user to mark the border location.
 d. The user may select a border contour from among a library of border contours such as rectangles, previously used border contours or other predetermined border contours.
 e. The user may use another means of indicating the border as, for example, choosing a color selecting method well known in the art such as chroma-key or color-key, to identify either the object or the background. The system then identifies the transition between the selected and unselected portions, using methods well-known in the art, and takes the transition between the selected and unselected portions to be the border.
 f. Any combination of (a)–(e).

In the case of (b)–(d), the system may, preferably at user option, add a rough marking surrounding all or a portion of the marking selected by the user. The result of this process is a rough marking similar to that of case (a), and the rough marking is then utilized as described above for case (a).

Missing edges may preferably be filled in by the user.

The borders, once marked as above, may preferably be modified manually by the user.

The system finds the marked border locations in key frames (step 130), and gives the user the option to modify the marked border locations based on the system response (steps 140 and 150).

Reference is now additionally made to FIGS. 2B–2F which are simplified pictorial illustrations of an example of rough marking in accordance with the method of steps 115, 130, 140, and 150 of FIG. 2A. In FIGS. 2B–2F, option (a), rough manual marking, is shown. FIGS. 2B–2F depict a display preferably provided to the user during the operation of steps 115, 130, 140, and 150 typically on video display 95 of FIG. 1.

Figure 2B:
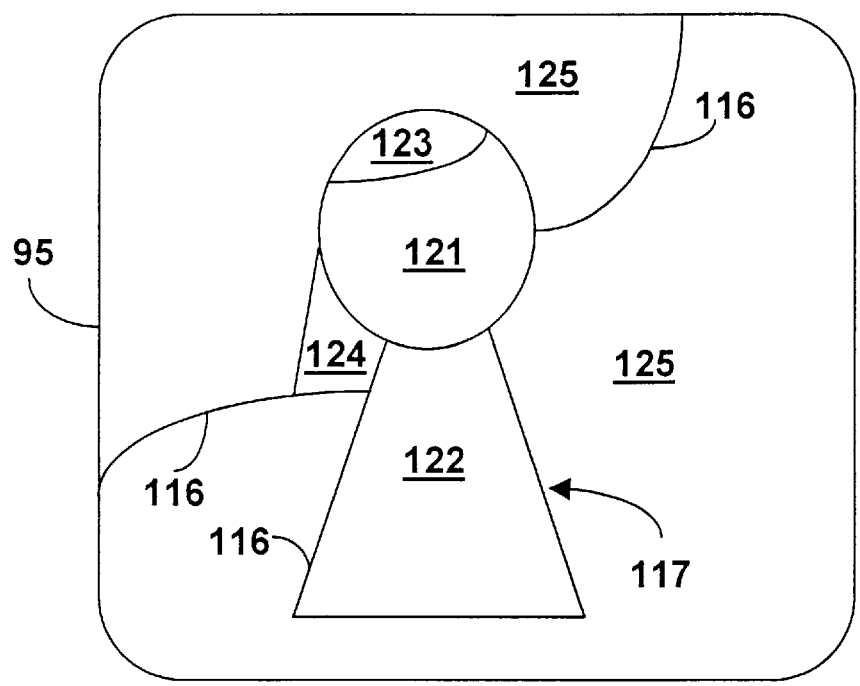
FIGS. 2B–2F are simplified pictorial illustrations of an example of rough marking in accordance with the method of steps 115, 130, 140, 150 of FIG. 2A.

FIG. 2B depicts an actual frame. Preferably, in FIGS. 2C–2F the actual frame of FIG. 2B is displayed as background to assist the user in making marks and modifications. For simplicity, said background is not shown in FIGS. 2D–2F.

FIG. 2B comprises a plurality of edges 116. The edges 116 comprise the limits of areas 121, 122, 123, 124, and 125. In FIG. 2B, the areas 121, 122, 123, 124, and 125 are taken to be of different color, but it is appreciated that, in general, different areas need not be of different color. Areas 125 are taken not to be of interest to the user, while areas 121, 122, 123 are areas of interest, because areas of interest 121, 123, and 123 together comprise a desired object 117. Area 124 is also taken to be not of interest to the user. In the example of FIGS. 2B–2F, areas are defined by being surrounded by closed edges, or by the ends of the video display 95.

Figure 2C:
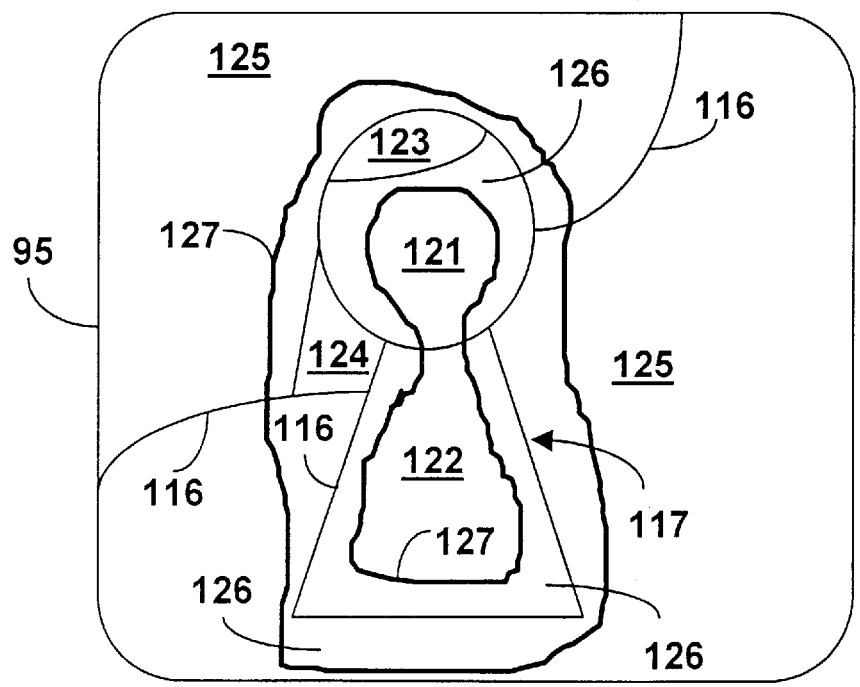

In FIG. 2C, the user has marked a rough marking area 126, whose limits are shown in FIG. 2C by marking area limits 127. Typically, the user marks the rough marking area 126 with, for example, the graphic drawing device 60. Alternatively, the user may mark the marking area limits 127 and indicate that the area 126 in between the marking area limits 127 is to be the rough marking area.

Figure 2D:
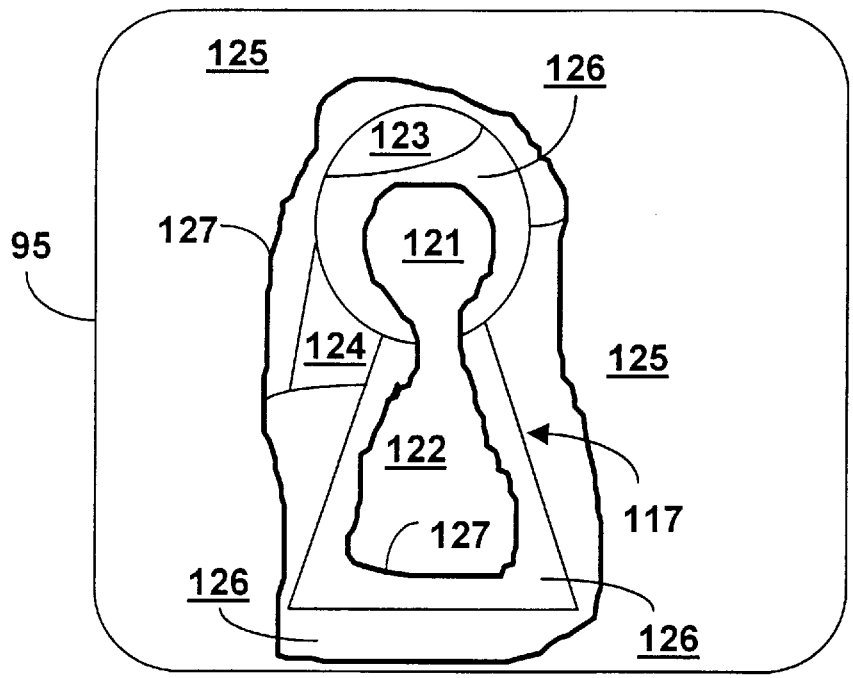

In FIG. 2D, all edges 116 not within the rough marking area 126 have been removed by step 130 of FIG. 2A. It is appreciated that the rough marking area 126 includes areas of interest 121, 122, and 123 and the edges 116 surrounding them, along with area 124, which is not of interest.

Figure 2E:
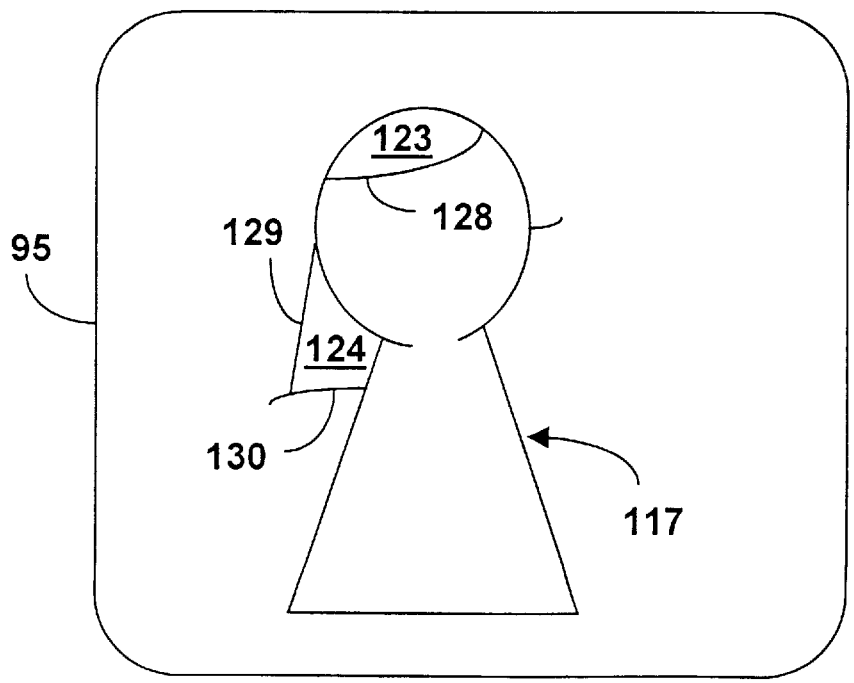

In FIG. 2E only the remaining edges, within the rough marking area 126 are shown. Edge 128 is internal to the desired object 117, while edges 129 and 130 define area 124, which is not of interest. In order to define the areas of interest based on closed edges, it is desirable to open the edges of area 124, so that area 124 will be outside the desired object 117. Typically, the user decision of step 140 is based on the display of FIG. 2E.

Figure 2F:
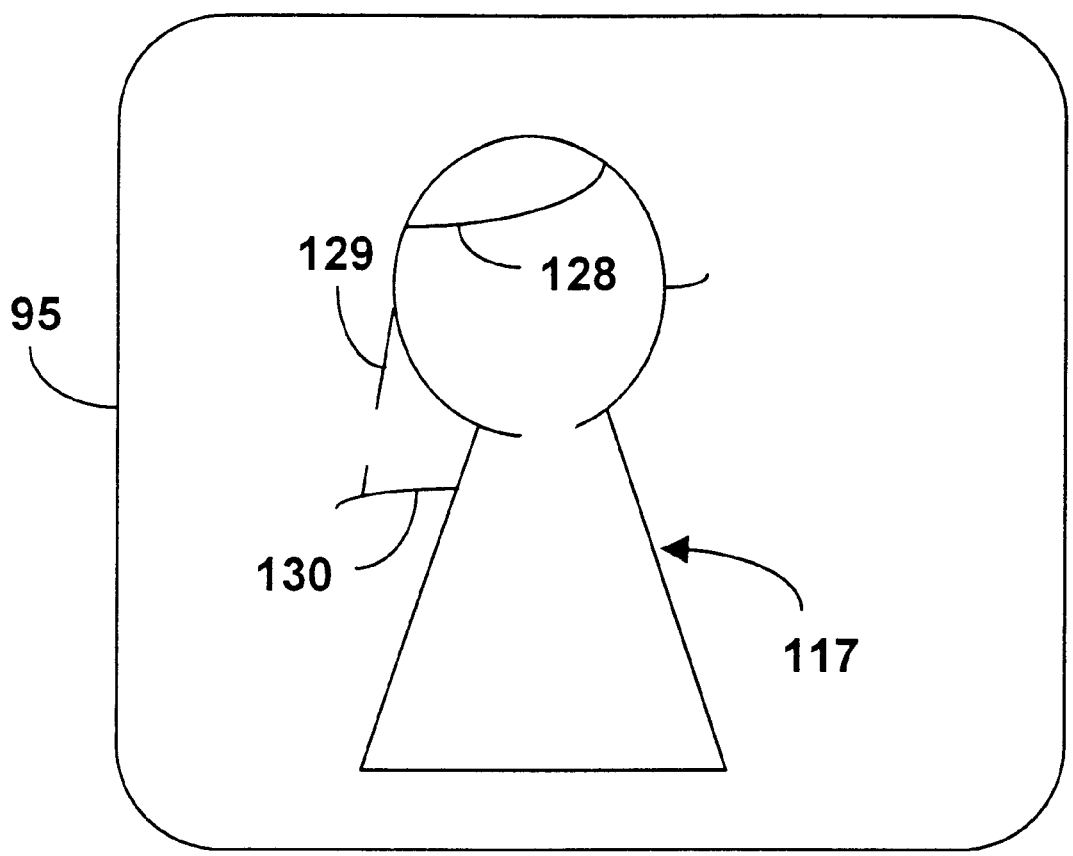

In FIG. 2F, representing the results of step 150, the user has erased a portion of edge 129, typically using the graphic drawing device 60, so that area 124 is now outside the desired object 117. It is appreciated that, in general, the user may make a wide variety of modifications, including erasing edges or portions thereof, and adding edges or portions thereof.

In step 155, the system learns the border qualities of the key frames. Border qualities may comprise, for example, border length, average color and color changes. The border qualities may also comprise aspects of motion of the borders such as, for example, border velocity and border acceleration. The method of step 155 is explained in more detail below with reference to the apparatus of FIG. 3A.

Non-key frames are input in step 190.

The system then proceeds to identify, in non-key frames, the borders which were marked in the key frames (step 160). In this step, the system may optionally make use of information obtained from the processing of other frames which were already processed. Preferably, the system seeks the borders only in a specific region of interest (ROI), which is taken to be the region in which the borders are expected to be found, typically based on information from other frames already processed, by identifying a region around the object borders in the previously processed frame or frames as the ROI. The method of step 160 is described in more detail below with reference to the apparatus of FIG. 3A.

It is appreciated that the borders output in step 160 may be fed back to step 155, where the borders may be treated as key frame borders in further iterations of the method of FIG. 2A.

If the user decides that the object borders in the non-key frames found by the system in step 160 are not good enough (step 170), the user may modify these borders directly (step 180) or can decide to define more of the frames, or different frames, as key-frames and re-run the system, based on the reference borders of the new set of key-frames. Typically, in step 180, the user is presented with displays and modification options similar to those described above with reference to FIGS. 2E and 2F. Alternatively, the user may use any other method as described with reference to step 115 of FIG. 2A.

The user may be confronted with the "good enough?" decision of step 170 either only once, for the image sequence as a whole, or at one or more intermediate points, determined by the user and/or by the system, within the process of border marking of the image sequence.

The user may make a "good enough?" decision regarding each of the frames of the image sequence or regarding only some of the frames of the image sequence.

It is appreciated that, throughout the operation of the method of FIG. 2A, the user may provide additional input, to modify or correct the operation of the system, at any of the steps involving user input, comprising steps 110, 150, and 180.

Figure 2G:
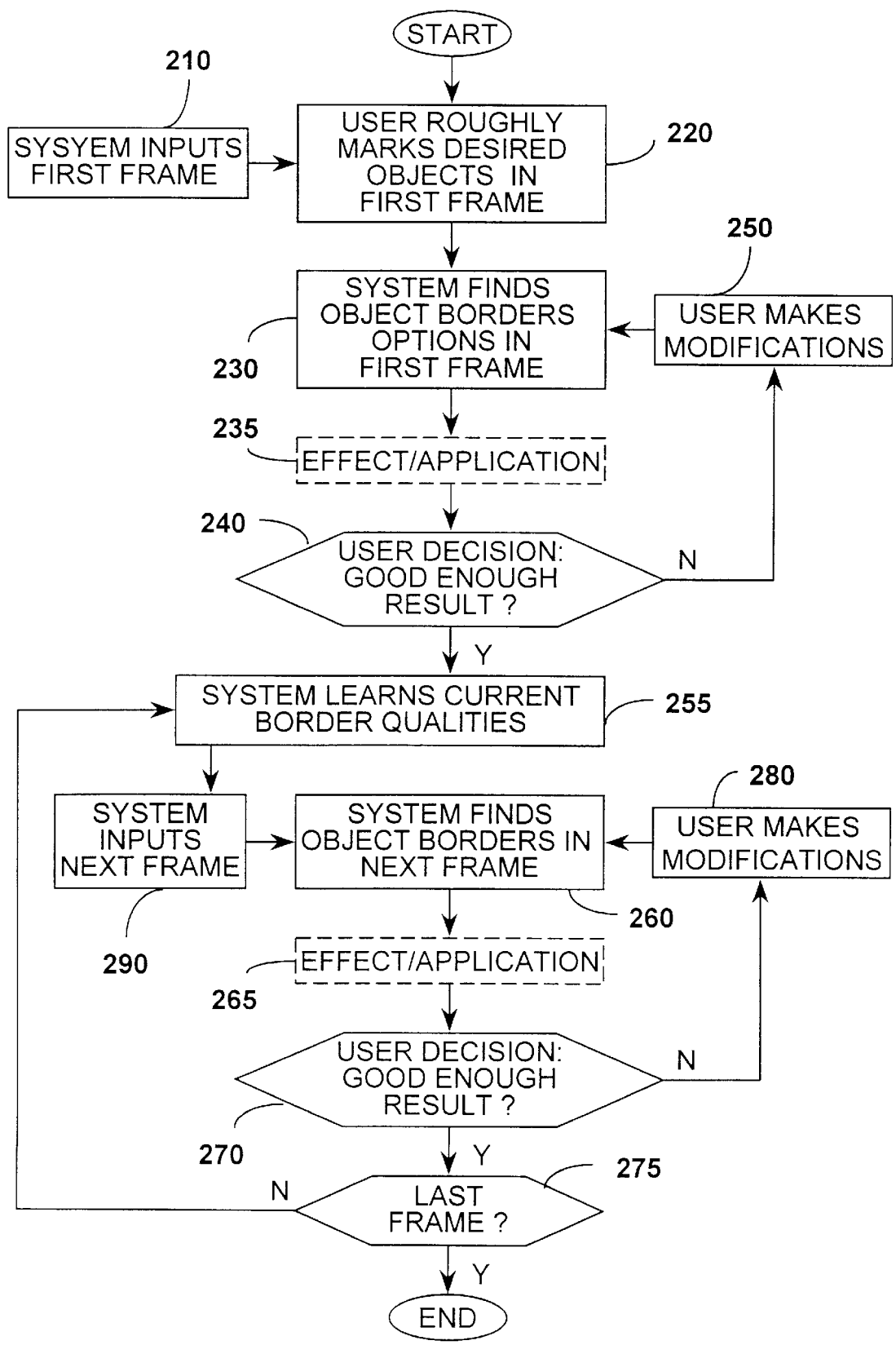
FIG. 2G is a simplified flowchart of the process of FIG. 1 wherein the at least one key frame comprises only the first frame in the sequence of frames.

FIG. 2G is a special case of the flowchart of FIG. 2A in which a first frame in a frame sequence is initially selected as the sole key frame, and processing continues on all the frames. The steps of FIG. 2G are self-explanatory in light of the above explanation of FIG. 2A, except as follows.

In step 210, the system may input only one frame or a sequence of sequential frames. In the case where a sequence of frames is input, steps 220, 230, 240, and 250 process the sequence of frames, typically one frame at a time.

In step 255 the system learns the border qualities of the current frame. Optionally, border qualities of a sequence of frames may be learned as, for example, border length, average color and color changes. Such a sequence may have been input in step 210 or may be built in step 255 as a plurality of frames is processed. In the case where a sequence of frames is processed, the border qualities may also comprise aspects of motion of the borders such as, for example, border velocity, border acceleration. The method of step 255 is explained in more detail below with reference to the apparatus of FIG. 4.

In step 290, the next frame is input. The system finds borders of the next frame in step 260 with reference to the border qualities learned in step 255. As described above with reference to step 160, the operation of step 260 is preferably limited to an ROI, defined based on the object behavior in previous frames. The operation of step 260 is further described below with reference to the apparatus of FIG. 4.

After step 275, if the last frame has not been reached, processing continues with step 255.

Reference is now made to FIG. 3A, which is a simplified block diagram of apparatus, such as the dynamic object border tracker 70 of FIG. 1, for performing the method of FIG. 2A.

The steps of FIG. 2A are performed by the following units in FIG. 3A:

| | |
|---|---|
| Step 110 | Unit 310 |
| Step 115 | Unit 320 |
| Step 130 | Units 330 and 340 |
| Step 140 | Unit 335 |
| Step 150 | Unit 320 |
| Step 190 | Unit 355 |
| Step 155 | Units 350 and 380 |
| Step 160 | Units 330, 340, 360 and 370 |
| Step 170 | Unit 379 |
| Step 180 | Unit 320 |

In a pre-processing unit 330, edges in each frame, including key frames and non-key frames, are detected and are preferably modified to facilitate the remaining steps, as described in more detail below with reference to FIGS. 11–14B.

In a component mapping unit 340, the edges found by the pre-processing unit 330 are traced, as further described below with reference to FIG. 15, and a data structure is generated to represent the edges. This structure typically comprises a forest of edge trees in which each branch comprises an edge and each node comprises a "special point" such as, for example, a junction. Special points may also, for example, include terminal points in an edge, whether or not the edge is connected to a junction, and edge corners.

As used throughout the present specification and claims, the term "tree" includes trees which contain loops, that is, paths which return to a junction that was already reached. It is appreciated, as is well known in the art, that this type of tree may also be depicted as a graph. Thus all operations specified herein to be performed on a tree may be performed on a corresponding graph. The terms "graph" and "tree" as used throughout the specification and claims are each meant to include both graph and tree representations.

The term "forest" is used throughout the present specification and claims to refer to a collection of trees. It is appreciated that a single graph may represent a collection of trees, and thus a forest may comprise a single graph or more than one graph.

Preferably, when tracking an object, special points are taken to be internal junctions, that is, junctions internal to the object or lying on the internal side of the border thereof. In the case where one object occludes another, tracking external junctions may be preferred; alternatively, a combination of internal and external junctions or other special points may be tracked, depending on the precise position of a plurality of partially occluding objects.

Figure 3B:
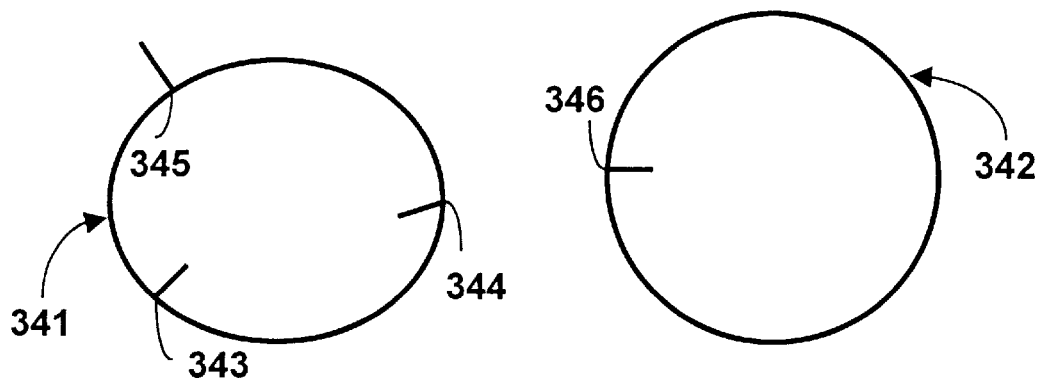
FIGS. 3B–3D are simplified pictorial illustrations showing internal junctions, external junctions, and occlusion.
Figure 3C:
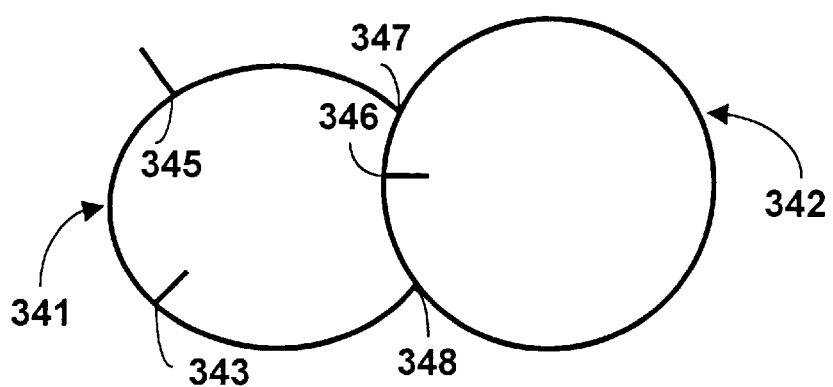
Figure 3D:
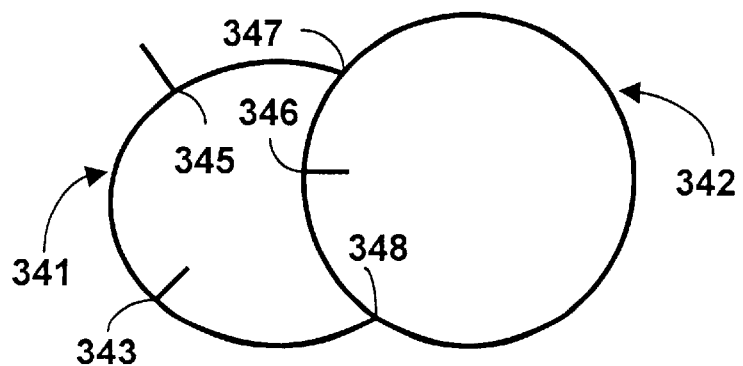

Reference is now additionally made to FIGS. 3B–3D which are simplified pictorial illustrations showing internal junctions, external junctions, and occlusion. FIG. 3B comprises a tracked object 341 and a second object 342. The tracked object 341 has internal junctions 343 and 344 and an external junction 345. The second object 342 has an internal junction 346. It is appreciated that there may be other junctions in addition to those which are shown in FIG. 3B. As stated above, special points are, preferable, taken to be internal junctions.

In FIG. 3C the tracked object 341 and the second object 342 have moved closer to each other, such that the second object 342 partially occludes the tracked object 341. It is appreciated from FIG. 3C that internal junction 344, visible in FIG. 3B, is not visible in FIG. 3C due to the partial occlusion of the tracked object 341. In addition, new external junctions 347 and 348 are created due to the partial occlusion. Furthermore, it will be seen that, in FIG. 3C, junction 346 is now an external junction of the tracked object 341 due to the partial occlusion. It will therefore be appreciated that, in the case of partial occlusion, it may be preferred to take external junctions also as special points.

In FIG. 3D the tracked object 341 and the second object 342 have moved still closer to one another, such that the extent of occlusion is greater. It is appreciated that, in FIG. 3D, new external junctions 347 and 348 and external junction 346 are still present, so that designating junctions 346, 347, and 348 as special points would be preferred in tracking the tracked object 341.

Unit 340 is described in more detail below with reference to FIGS. 15 and 16.

Unit 350 receives the output of step 340, and creates an exact object border description, preferably represented in terms of a "chain code", for each keyframe. A chain code is a representation of the border in terms of edges and special points and typically comprises pointers to the edges and special points which form the border, in their proper sequence.

In addition curves, typically splines, connecting the points, are computed. These curves are also termed herein "initial border estimation segments". Computation of splines is described in C. de Boor and in P. J. Schneider, referred to above. The splines are typically employed in further steps for the purpose of border estimation.

The chain code and a representation of the splines, typically a representation of the control points of the splines' control polygons, are stored in the data base 380.

The operation of unit 350 is described more fully below, with reference to FIG. 22.

Typically after the keyframes have all been processed, units 330 and 340 operate on the non-keyframes.

Unit 360 finds correspondences between the special points in the keyframe or frames and special points in the non-keyframes, that is, pairs of special points which, one in a key frame and one not in a key frame, represent the same location in the object. In the context of processing other frames, corresponding special points may be treated as estimated special points.

The correspondence is found with reference to stored point data found in the data base 380. The stored point data typically comprises chain codes representing special points and edge segments of borders and spline representations of edge segments of borders, both produced by units 350 and 370. Optionally, once correspondences are found between special points in a keyframe and special points in a non-keyframe, these correspondences may be employed to find correspondences between special points in the keyframe and special points in other non-keyframes. Unit 360 is described in more detail below with reference to FIGS. 17 and 18.

When a correspondence is found with reference to, for example, two special points, the special points are termed herein "corresponding points.". Similarly, when a correspondence is found between two border segments, the two border segments are termed herein "corresponding segments". Corresponding points and corresponding segments are assumed to represent the same points and border segments, respectively, in the dynamic object. The process of finding corresponding segments is described below with reference to unit 370.

Preferably, the operation of unit 360 is restricted to an ROI, as described above with reference to FIG. 2A. In step 360, the ROI is typically taken to be a region of a predetermined size around the borders and special points of the object as, for example, five pixels around.

The special points identified by unit 360 are received by unit 370, and the chain codes and spline representations stored in the data base 380 are retrieved. When a gap exists because certain special points were not found by unit 360, gaps are filled in via use of the spline representations, which represent border estimation.

The points are typically connected together by projecting the spline curve, from the data base 380, of the initial border estimation segments between the points. Typically, since the points may have moved and the distance between the points and their position relative to other points may have changed since the spline curve was stored in the data base 380, the projecting preferably includes use of an affine transformation. The affine transformation may include rotation, scaling, and shifting. Affine transformations are well known in the art, and are described in Ballard and Brown, referred to above, at page 477.

Preferably, the affine transformation is applied only to the control points of the spline curve, and the spline curve is then recomputed.

The newly projected curves, when applied to other frames, are termed herein "estimated border segments".

Figure 3E:
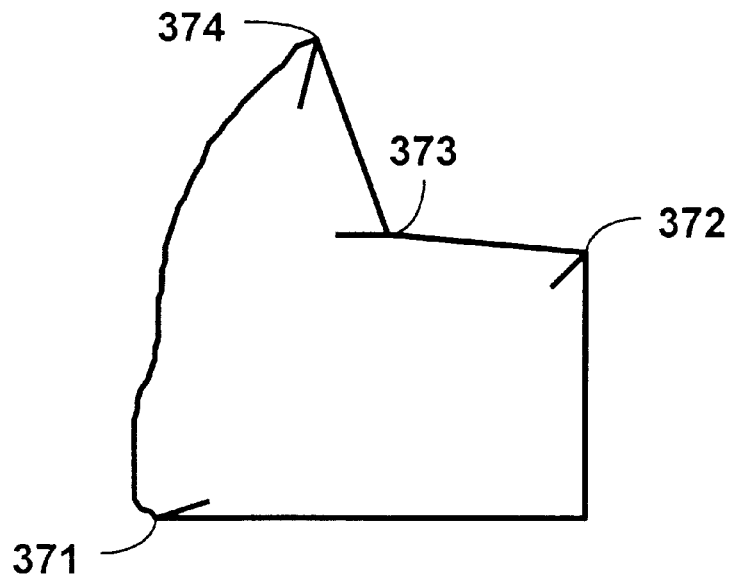
FIGS. 3E and 3F are simplified pictorial illustrations depicting a portion of the operation of step 370 of FIG. 3A.
Figure 3F:
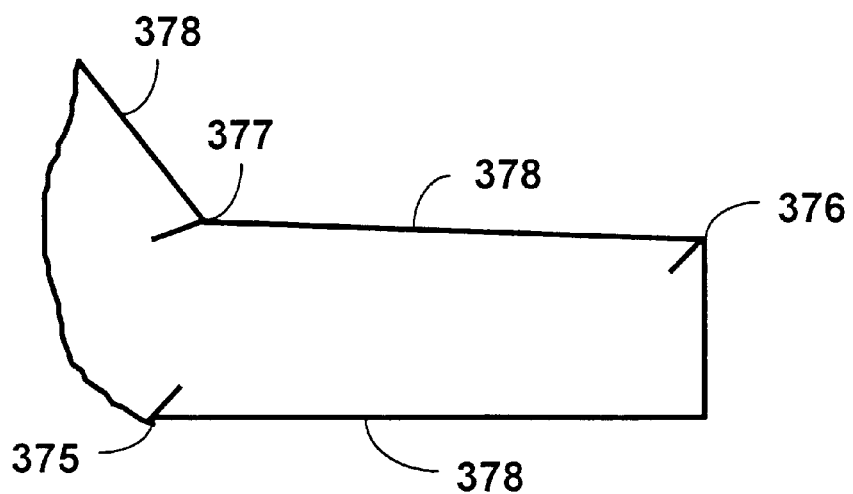

Reference is now additionally made to FIGS. 3E and 3F which are simplified pictorial illustrations depicting a portion of the operation of step 370 of FIG. 3A.

FIG. 3E depicts a first frame, comprising special points 371, 372, 373 and 374. FIG. 3F depicts another frame, comprising special points 375, 376, and 377. Correspondences have already been found, as described above with reference to unit 360, between the following pairs of special points: 371 and 375; 372 and 376; and 373 and 377. No correspondence was found for point 374.

Estimated border segments 378, projected as previously described, has been added between each adjacent pair of points, including points 375 and 377. It is appreciated that an estimated border segment 378 is projected between points 375 and 377 even though no corresponding point was found for point 374, based on the previous segments between points 373, 374, and 371.

Updated chain codes are computed from the estimated border segments and the corresponding special points. Descriptions of the special points and estimated border segments, as well as the updated chain codes, are stored in the data base 380. Estimated border segments may be used, in a later iteration, as initial border estimation segments. Computation of chain codes is described in more detail below with reference to FIG. 22.

An object border description, comprising an externally-usable representation of the object border as, for example, a list of coordinates defining the location of the border, and an object mask, suitable for further processing, are generated by unit 390. Alternatively, only an object mask may be generated, and an object border description may be generated from the object mask in a later step when the object border description is to be used. Unit 390 is more fully described below with reference to FIG. 21.

Unit 379 allows the user to examine the results of the method of FIG. 3A and to modify the results accordingly, including choosing new key frames, as explained above with reference to FIGS. 2A–2F. The results of the method of FIG. 3A are presented to the user by drawing the object chain code over the present frame. It is appreciated that, although unit 379 is depicted as receiving input from unit 370, unit 379 may also utilize any other object border information available as, for example, information stored in the data base 380.

Unit 335 operates similarly to unit 379, except that unit 335 relates to preprocessing and thus it draws directly the edges found by unit 330 rather than using a chain code drawing.

Figure 4:
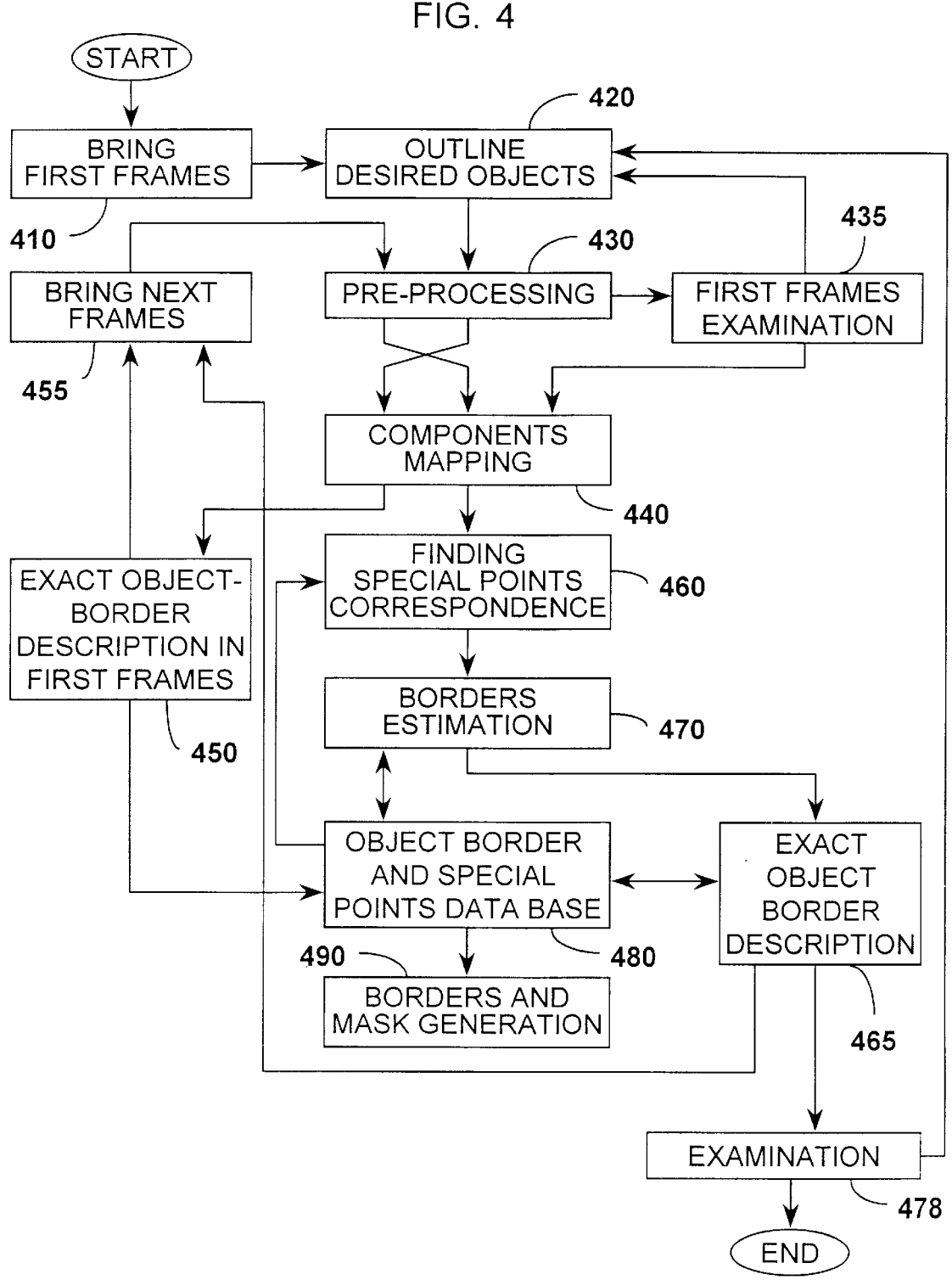
FIG. 4 is a simplified block diagram of apparatus, such as the dynamic object border tracker 70 of FIG. 1, for performing the process of FIG. 2G wherein the at least one key frame comprises a subsequence of the first few frames in the sequence of frames.

Reference is now made to FIG. 4 which is a simplified block diagram of apparatus for performing the process of FIG. 2G wherein the at least one key frame comprises a subsequence of the first few frames in the sequence of frames.

The steps of FIG. 2G are performed by the following units in FIG. 4:

| | |
|---|---|
| Step 210 | Unit 410 |
| Step 220 | Unit 420 |
| Step 230 | Units 430 and 440 |
| Step 240 | Unit 435 |
| Step 250 | Unit 420 |

-continued

| | |
|---|---|
| Step 290 | Unit 455 |
| Step 255 | Units 450, 480, 465 |
| Step 260 | Units 430, 440, 460 and 470 |
| Step 270 | Unit 478 |
| Step 280 | Unit 420 |

The units of FIG. 4 are similar to the units of FIG. 3A and are self-explanatory with reference to the above discussion of FIG. 3A, except as described below. The correspondence between the units of FIG. 3A and the units of FIG. 4 is as follows:

| | |
|---|---|
| Unit 310 | Unit 410 |
| Unit 320 | Unit 420 |
| Unit 330 | Unit 430 |
| Unit 340 | Unit 440 |
| Unit 335 | Unit 435 |
| Unit 350 | Unit 450 |
| Unit 355 | Unit 455 |
| Unit 360 | Unit 460 |
| Unit 370 | Unit 470 and Unit 465 combined |
| Unit 379 | Unit 478 |
| Unit 380 | Unit 480 |
| Unit 390 | Unit 490 |

In FIG. 4, the following units operate on consecutive first frames, treating the first frames as key frames, rather than on key frames in general as in the corresponding units of FIG. 3: 410, 435, 450.

In FIG. 4 a plurality of first frames are processed together.

Unit 455 provides next frames consecutively, preferably one frame at a time, to unit 430.

Preferably, the operation of unit 460 is restricted to an ROI, as described above with reference to FIG. 2G. In unit 460, the ROI is typically taken to be a region of an predetermined size around the borders and special points of the object as, for example, five pixels around. Preferably, unit 460 operates on consecutive frames, one frame at a time.

Unit 460 finds correspondences between the special points in consecutive frames, that is, pairs of special points which, one in a first frame and one in the succeeding frame, represent the same location in the object. In the context of processing further frames, corresponding special points may be treated as estimated special points.

The correspondence is found with reference to stored point data found in the data base 480. The stored point data typically comprises chain codes representing special points and edge segments of borders and spline representations of edge segments of borders, both produced by units 450 and 465, described below. Optionally, once correspondences are found between special points in two consecutive frames, these correspondences may be employed to find correspondences between special points in the two frames and special points in other frames. Unit 460 is described in more detail below with reference to FIGS. 17 and 18.

Unit 470 operates similarly to unit 370, except that an exact object border description is created by unit 465. A current frame chain code, representing an exact border description of the current frame, is computed based on the corresponding special points found by unit 460 and the borders estimated by unit 470. It is appreciated that, in FIG. 3A, the functionality of unit 465 is included in unit 370. Unit 465 is described more fully below with reference to FIG. 22.

Unit 478 operates similarly to unit 379 of FIG. 3A, except that unit 478 operates on the output of unit 465.

Figure 5:
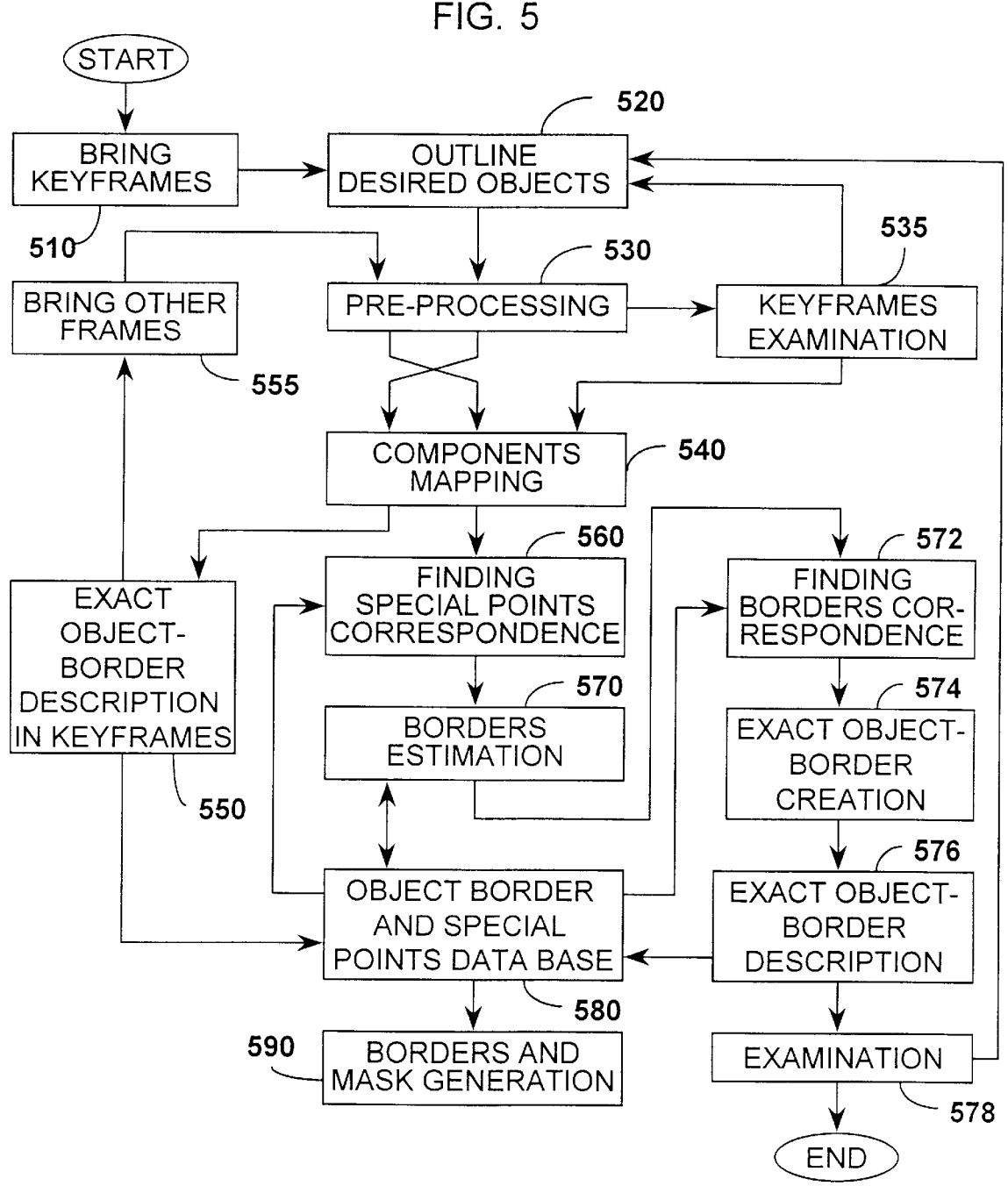
FIG. 5 is a simplified block diagram of a modification of the apparatus of FIG. 3A in which borders are accurately identified.

Reference is now made to FIG. 5 which is a simplified block diagram of a modification of the apparatus of FIG. 3A in which borders are accurately identified. The units of FIG. 5 are self-explanatory with reference to the above discussion of FIG. 3A, except as follows.

In FIG. 5, additional processing is performed after the completion of border estimation. An estimated border, represented by a chain code termed herein an "intermediate chain code", is created by unit 570. A more precise border is identified by unit 572, based on the estimated border produced by unit 570 and on chain code and spline data describing a stored frame border, obtained from the data base 580. Unit 572 preferably operates by identifying edges in the vicinity of the estimated border and selecting the best candidates for border segments. Estimated border segments provided by unit 572 may be filled in by unit 574 where a more precise border was not successfully identified by unit 572, and an exact object border description is created.

Preferably, the operation of unit 572 is restricted to an ROI, as described above with reference to FIG. 2A. In unit 572, the ROI is typically taken to be a region of an predetermined size around the borders and special points of the object as, for example, five pixels around.

Units 570, 572 and 574 are described more fully below with reference to FIGS. 23 and 24.

A chain code is computed based on the new more precise border by unit 576. In the case of FIG. 5, the chain code is typically computed by unit 576 rather than by unit 570. The chain code is stored in the database 580 and is also passed along to unit 578, which allows the user to examine the new border. The operation of unit 576 is described in more detail below with reference to FIG. 22.

Figure 6:
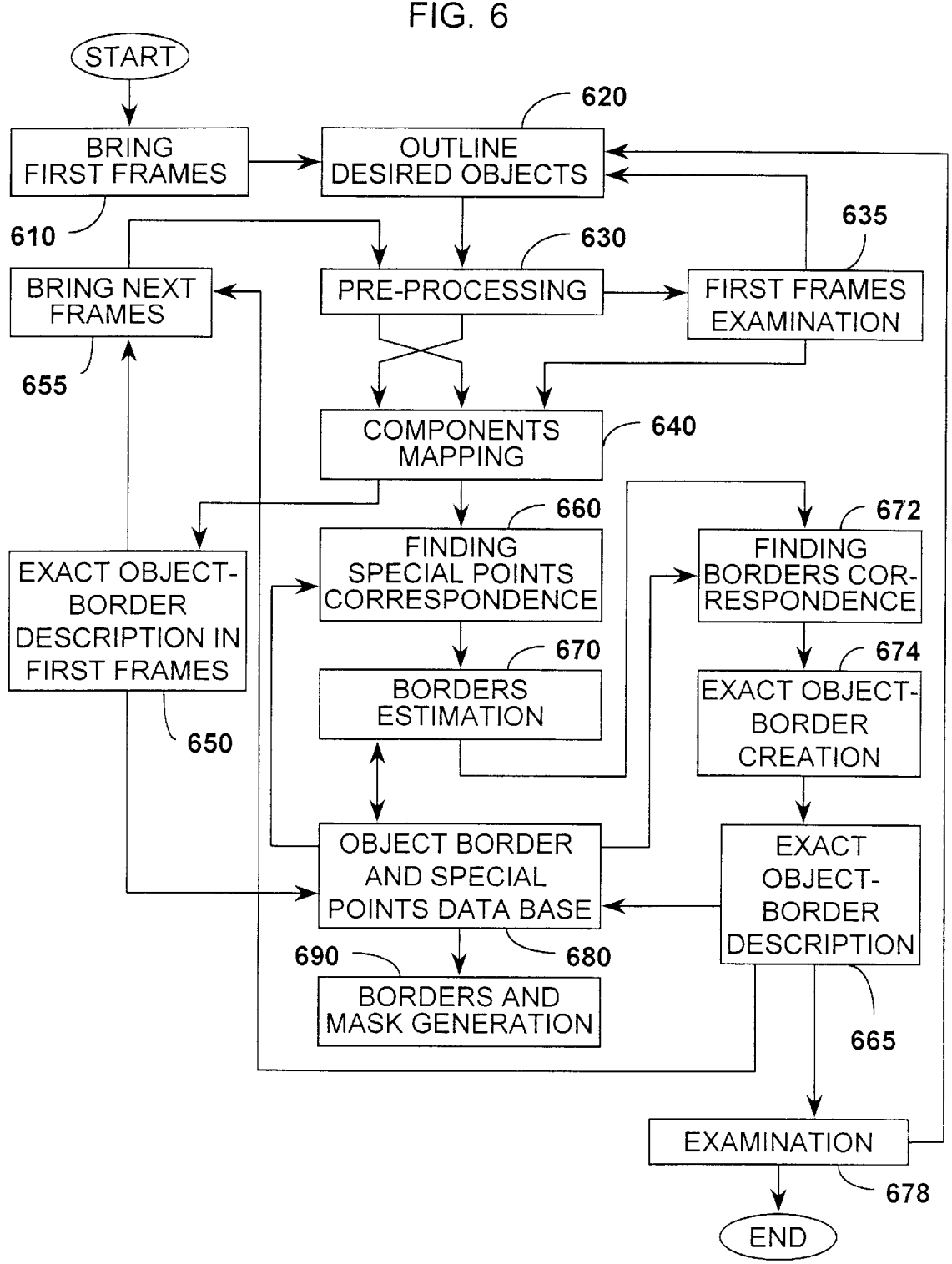
FIG. 6 is a simplified block diagram of a modification of the apparatus of FIG. 4 in which borders are accurately identified.

Reference is now made to FIG. 6 which is a simplified block diagram of a modification of the apparatus of FIG. 4 in which borders are accurately identified. The units of FIG. 6 are self-explanatory with reference to the above discussion of FIG. 4, except as follows.

An estimated border, represented by an intermediate chain code, is identified by unit 670. A more precise border is identified by unit 672, based on the estimated border from unit 670 and on data on previous frames, preferably comprising chain codes and splines, obtained from the data base 680. Unit 672 preferably operates by identifying edges in the vicinity of the estimated border and selecting the best candidates for border segments. The operation of unit 672 is described in detail below with reference to FIGS. 23–27.

Preferably, the operation of unit 672 is restricted to an ROI, as described above with reference to FIG. 2A. In unit 672, the ROI is typically taken to be a region of an predetermined size around the borders and special points of the object as, for example, five pixels around.

In unit 674, estimated border segments may be filled in where a more precise border was not successfully identified by unit 672, and an exact object border description is created by unit 665. The operation of unit 674 is described in detail below with reference to FIGS. 23–27.

Figure 7:
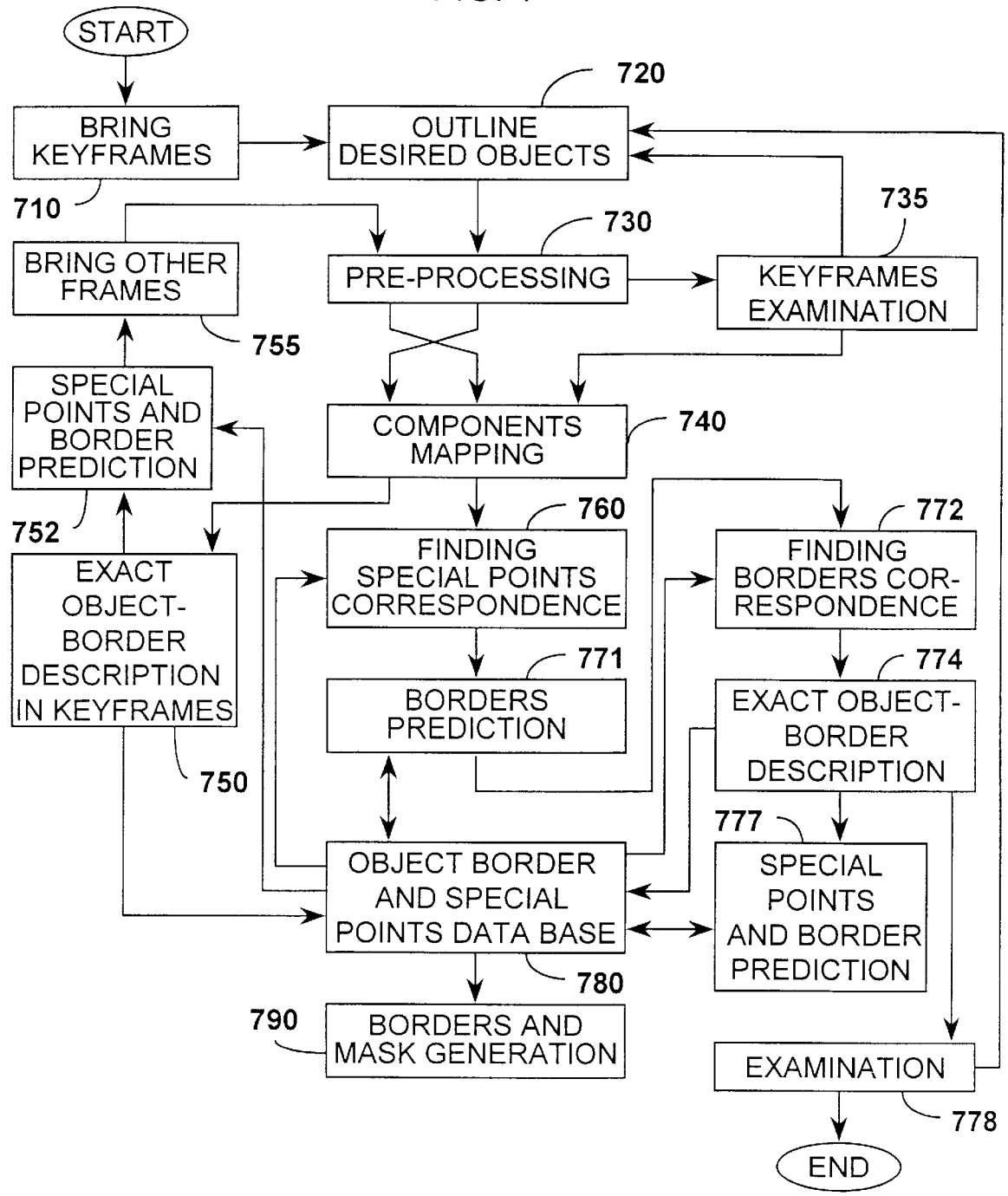
FIG. 7 is a simplified block diagram of a modification of the apparatus of FIG. 5 which is operative to predict border locations in non-key frames.

Reference is now made to FIG. 7 which is a simplified block diagram of a modification of the apparatus of FIG. 5 which is operative to predict border locations in non-key frames. The units of FIG. 7 are self-explanatory with reference to the above discussion of FIG. 5, except as follows.

Unit 774, exact object border description, performs both the operation of unit 574 of FIG. 5 and the operation of unit 576 of FIG. 5.

Unit 777 applies equations of motion, relating position to changes in position and to rate of change in position, to the positions of special points and borders stored in the data base 780 in order to predict the location, in upcoming frames, of the special points and borders. It is appreciated that, in applying the equations of motion, it is necessary to take into account the distance and direction in time, in frames, between key frames being processed, since time between frames is an important variable in applying equations of motion. Equations of motion are discussed in more detail below with reference to FIGS. 29–31.

Unit 752 operates similarly to unit 777, but uses equations of motion to predict special points and borders according to the key frames rather than using other frames as is the case with unit 752.

Similarly, unit 871, in contrast to unit 570 of FIG. 5, may apply equations of motion also to the stored spline data received from the data base 780, so that the stored spline data is updated to more accurately predict border position.

Figure 8:
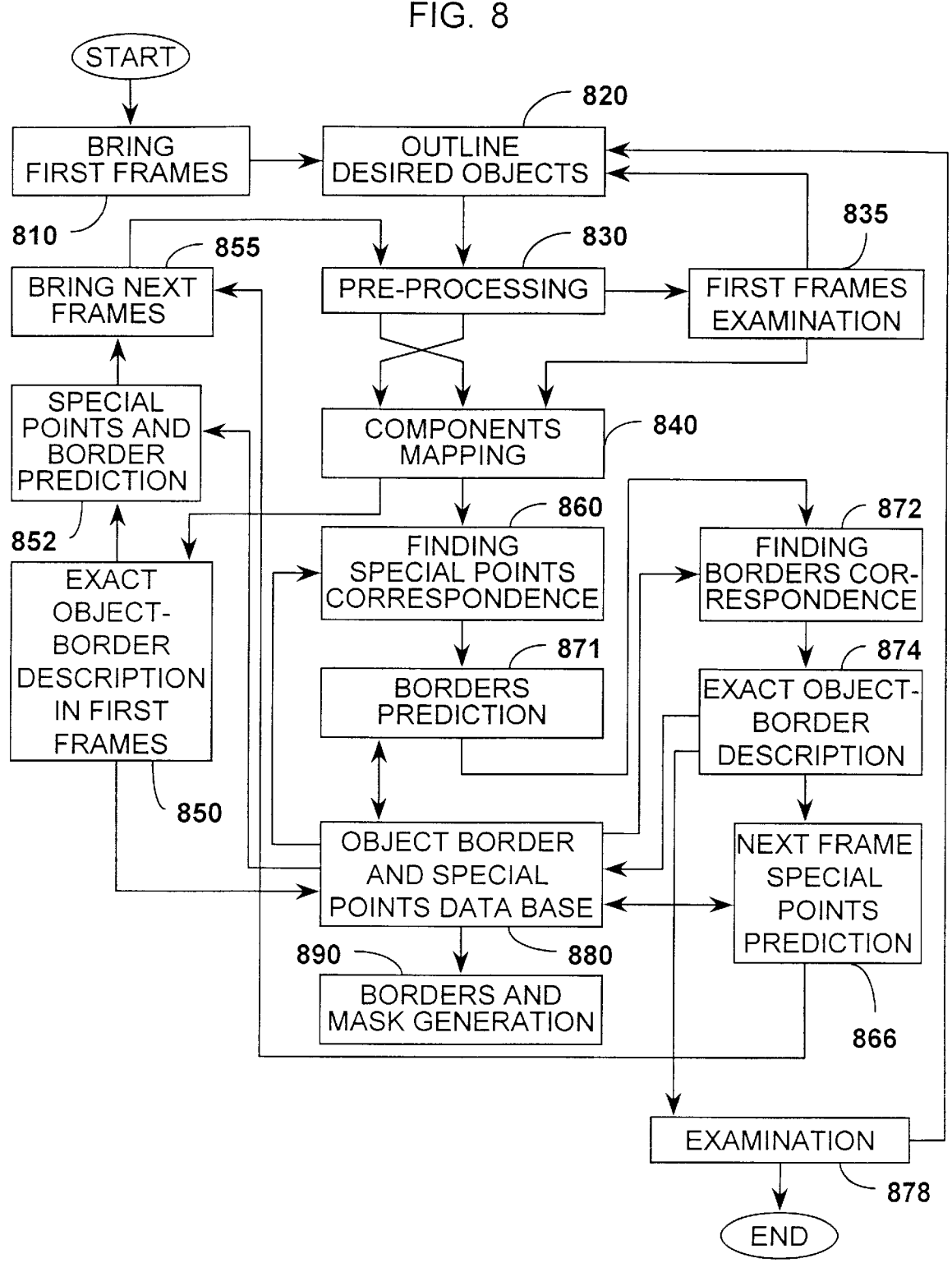
FIG. 8 is a simplified block diagram of a modification of the apparatus of FIG. 6 which is operative to predict border locations in non-key frames.

Reference is now made to FIG. 8 which is a simplified block diagram of a modification of the apparatus of FIG. 6 which is operative to predict border locations in non-key frames. The units of FIG. 8 are self-explanatory with reference to the above discussion of FIGS. 6 and 7, except as follows.

A prediction is made of the special points and borders by unit 866. Equations of motion are applied to the positions of special points and borders for a previous frame stored in the data base 880 in order to predict the location, in subsequent frames, of the special points and borders. Equations of motion useful in the method of FIG. 8 are discussed below with reference to FIGS. 28–31.

Unit 852, similarly to unit 866, uses equations of motion to predict special points and borders according to the key frames.

Similarly, unit 871, like unit 771 of FIG. 7, may apply equations of motion to the stored spline data received from the data base 880, so that the stored spline data is updated to more accurately predict border position.

Unit 874 is similar to unit 774 of FIG. 7.

Figure 9:
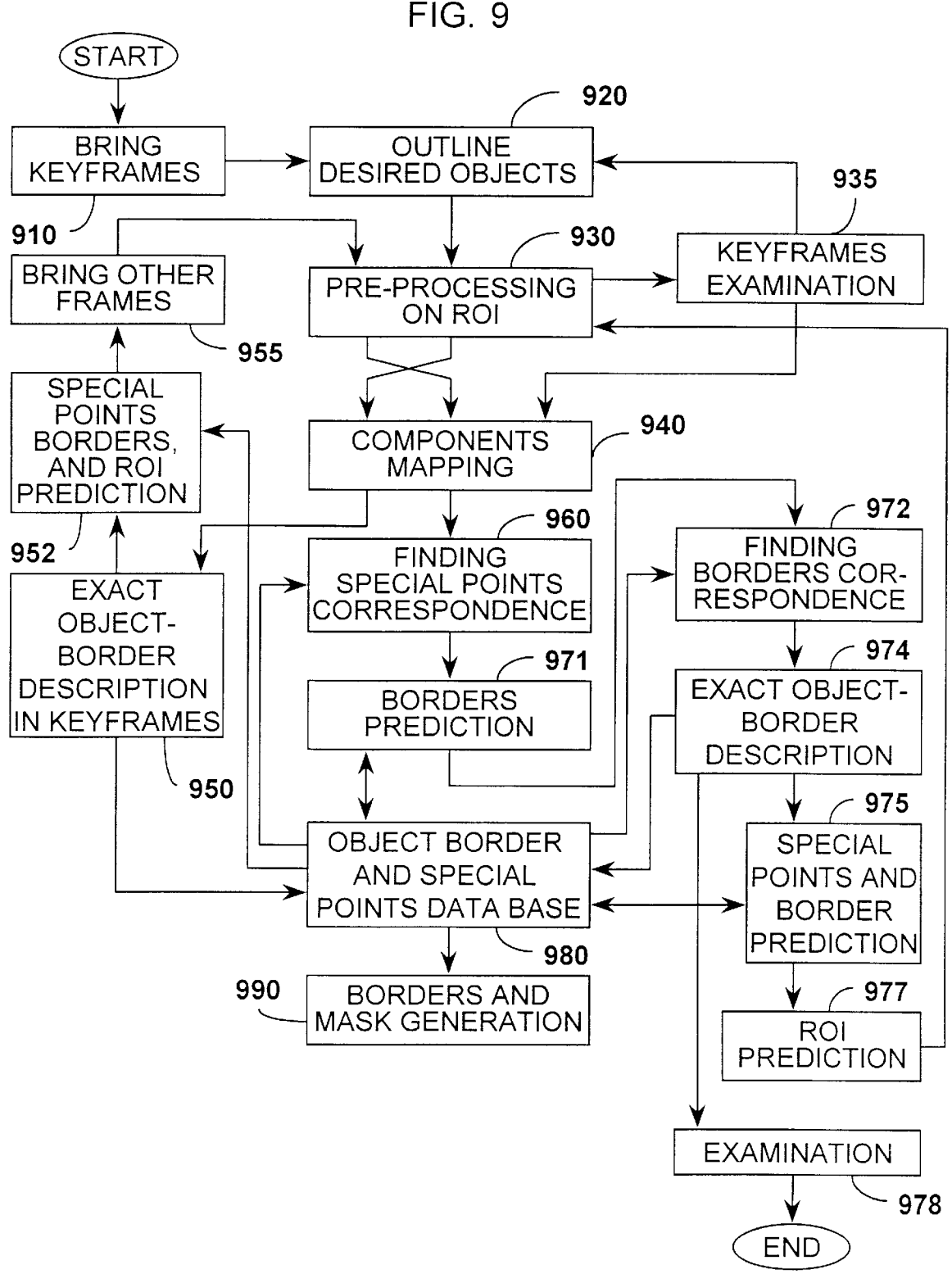
FIG. 9 is a simplified block diagram of a modification of the apparatus of FIG. 7 at least the preprocessing is performed only within the ROIs.

Reference is now made FIG. 9 which is a simplified block diagram of a modification of the apparatus of FIG. 7 at least the preprocessing is performed only within the ROIs. It is a particular advantage of the apparatus of FIG. 9 that the results obtained are, in general, more precise and may be obtained at lesser expense than with the apparatus of FIG. 7.

The units of FIG. 9 are self-explanatory with reference to the above discussion of FIG. 7, except as follows.

The ROI is identified (unit 920) as a region of interest identified by the user. Unit 930 typically processes only the ROI, in contrast to the preprocessing of unit 730 of FIG. 7.

The ROI location is already known as a result of the operation of unit 975, since the ROI is centered around the predicted border. The ROI size, is predicted by unit 977 for the purpose of preprocessing, after the prediction of special points and borders by unit 975. Special point ROI size is preferably predicted as described below with reference to FIGS. 29–31, and border ROI size is preferably predicted as the larger of the two ROI sizes of the two consecutive corresponding special points at the ends of the border segment.

Similarly, the ROI is also predicted by unit 952, in addition to the special points and borders prediction described above with reference to step 752 of FIG. 7.

In all cases of ROI prediction described above, the ROI is predicted based on applying equations of motion to the special points and the border. Furthermore, the size of the predicted ROI depends on the extent of motion of the special points and borders. When the motion is constant, the ROI size is small. When the motion changes rapidly, the ROI size is large. For intermediate degrees of change of motion, the size of the ROI is intermediate.

It is appreciated that, in applying the equations of motion, it is necessary to take into account the distance and direction in time, in frames, between key frames being processed, since time between frames is an important variable in applying equations of motion. Equations of motion are discussed in more detail below with reference to FIGS. 29–31.

Figure 10:
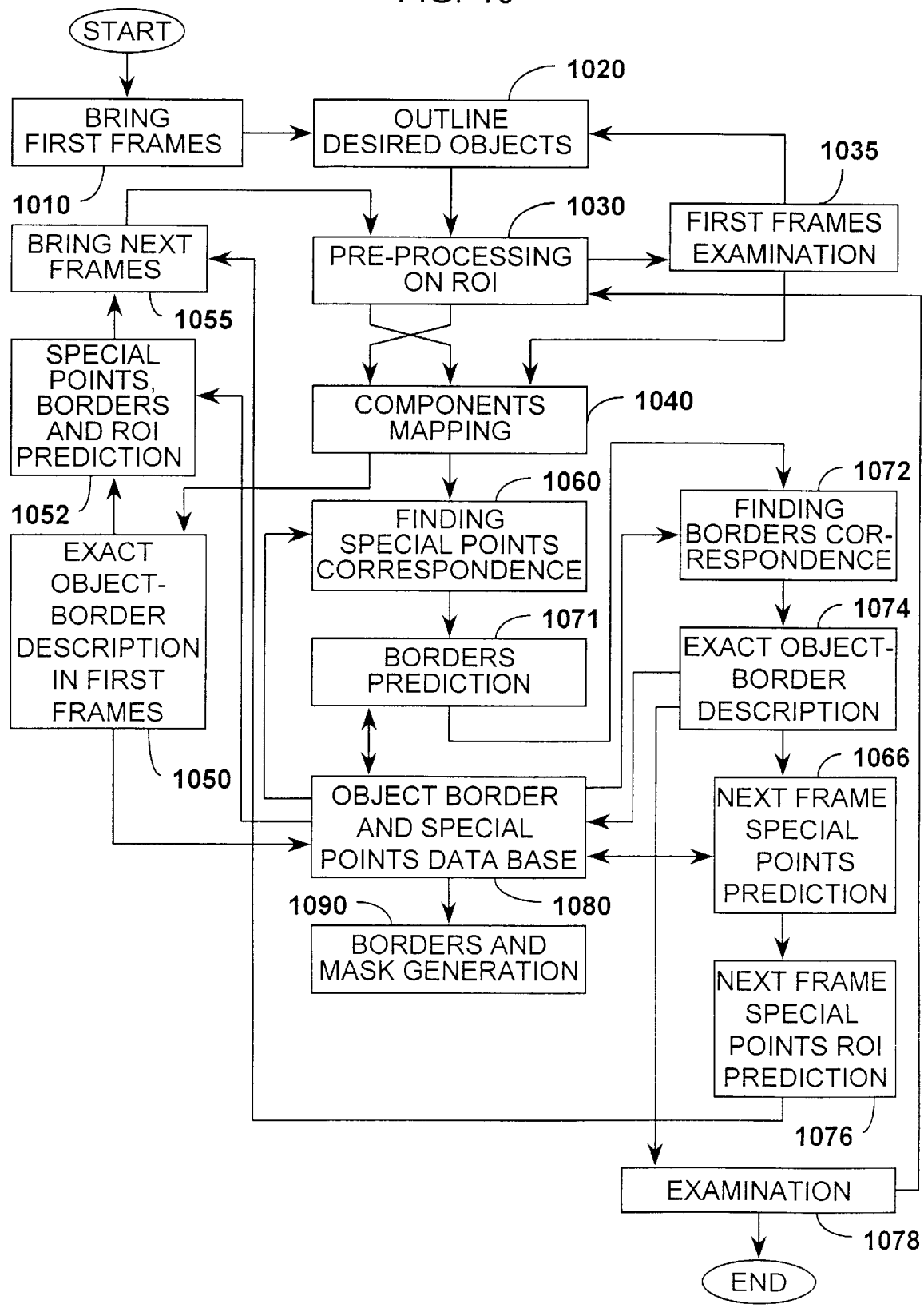
FIG. 10 is a simplified block diagram of a modification of the apparatus of FIG. 8 in which regions of interest are identified and at least a portion of the processing is performed only within the regions of interest.

Reference is now made to FIG. 10 which is a simplified block diagram of a modification of the apparatus of FIG. 8 in which regions of interest are identified and at least a portion of the processing is performed only within the regions of interest.

The units of FIG. 10 are self-explanatory with reference to the above discussion of FIG. 8, except as follows.

Similarly to the apparatus of FIG. 9, the apparatus of FIG. 10 comprises units 1020, 1030, 1052, and 1076, which perform ROI processing similar to that described above with reference to FIG. 9, except that, in FIG. 10, the processing occurs on consecutive frames. Consecutive frame processing may be preferred because of ease of computation.

Equations of motion useful in the method of FIG. 10 are discussed below with reference to FIGS. 29–31.

Figure 11:
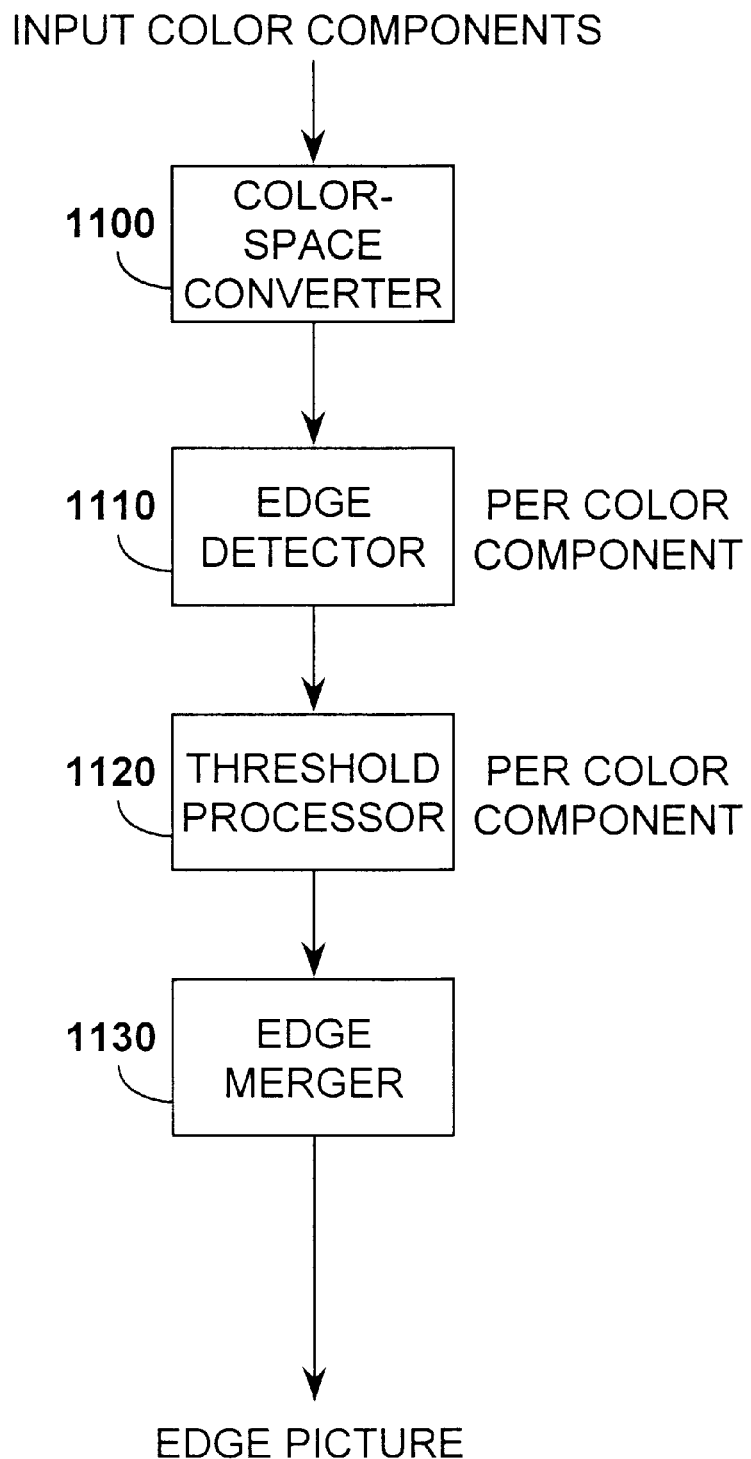
FIG. 11 is a simplified block diagram of a first alternative subsystem for performing the preprocessing operations of FIGS. 3A and 4–10.

Reference is now made to FIG. 11 which is a simplified block diagram of an alternative subsystem for performing the preprocessing operations of blocks 330, 430, 530, 630, 730, 830, 930, and 1030 of FIGS. 3A and 4–10.

A commonly used RGB color space may not be optimal for edge detection because the three components R-G-B tend to all change similarly and in concert with intensity change, so that edges identified from the components of such a color space will tend to be similar. It is therefore desirable to choose a color space where the above behavior typically does not occur, that is, where the components tend to behave differently, so that edges identified from the components of such a color space will tend to be different. Preferably, a color space having the following components, computed from R, G, and B components of an RGB color space, is used:

$$I_1=(R+G+B)/3$$

$$I_2=(R-B)$$

$$I_3=(2*G-R-B)/2$$

The above color space is discussed in Yu-Ichi Ohta, Takeo Kanada, and T. Sakai, referred to above.

In FIG. 11, the input color components are converted to the chosen color space (unit 1100). In the case of the color space described above, the formulas provided may be used to compute the conversion. Optionally, the RGB space or any other appropriate color space may be used.

Edge detection for each color component is then performed (unit 1110). In order to eliminate falsely detected edges, a minimum threshold value is applied to the color intensity of each color component and all edges whose color component intensity is less than the threshold value are ignored (1120). The operation of units 1110 and 1120 is described in more detail below with reference to FIGS. 14A and 14B.

Edges detected in the separate color components are merged together (unit 1130). The operation of unit 1130 is described in more detail below with reference to FIG. 13A. An edge picture, comprising typically "1" values wherever an edge was detected and "0" values otherwise, is produced.

Figure 12A:
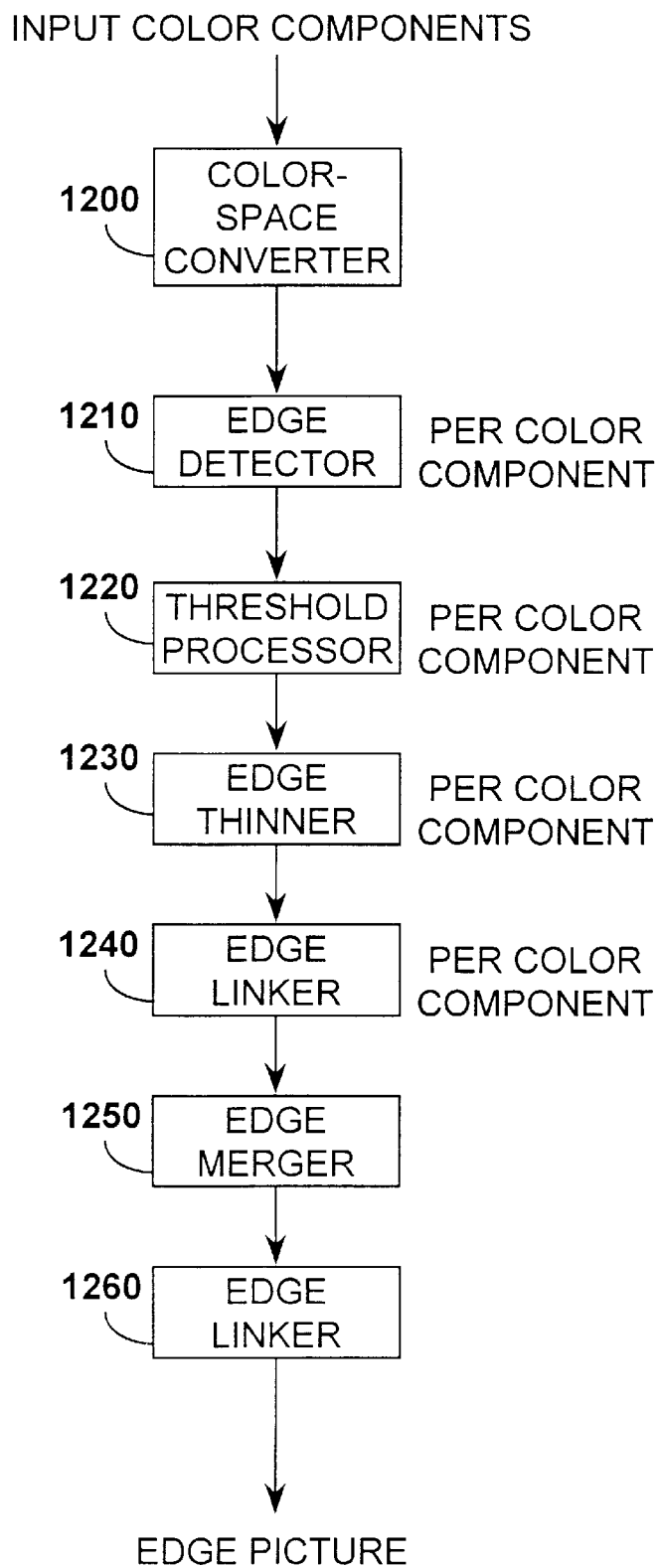
FIG. 12A is a simplified block diagram of a preferred subsystem for performing the preprocessing operations of FIGS. 3A and 4–10.

Reference is now made to FIG. 12A which is a simplified block diagram of a preferred subsystem for performing the preprocessing operations of FIGS. 3A and 4–10. FIG. 12A is similar to FIG. 11, and the units of FIG. 12A are self-explanatory with reference to the above discussion of FIG. 11, except as described below.

Edge thinning is performed to increase the accuracy of edge detection by reducing the thickness of edges, preferably to a width of one pixel (unit 1230).

Edge linking is performed to fill in gaps, typically only gaps of one pixel, within the identified edges (unit 1240). Generally, gaps of no more than one pixel are only filled if there are edges of at least 2 pixels in length on each side of the gap, the edges being disposed at any angle relative to each other. Typically, the edge linker operates once on each color in the color space and again on the edges after merger (unit 1260). Optionally, pixels added by unit 1260 may be assigned a specific or artificial color to identify the pixels as edge linker added pixels in further processing.

Reference is now made to FIG. 12B, which is a simplified pictorial illustration depicting a portion of the operation of steps 1240 and 1260 of FIG. 12A. FIG. 12B comprises a plurality of edge pixels 1261, 1265, 1266, and 1267. Pixel 1262 will be added by units 1240 and 1260 because pixel 1262 comprises a one pixel gap surrounded by edges of at least 2 pixels in length, made up of pixels 1261 and 1265. Pixel 1263 will not be filled in because it does not have edges of at least 2 pixels in length on both sides, having single edge pixel 1266 on one side thereof. Pixels 1264 will not be filled in because, even though they are surrounded on both sides by edges of at least 2 pixels in length, made up of pixels 1265 and 1267, pixels 1264 comprise a gap of more than one pixel.

Figure 13A:
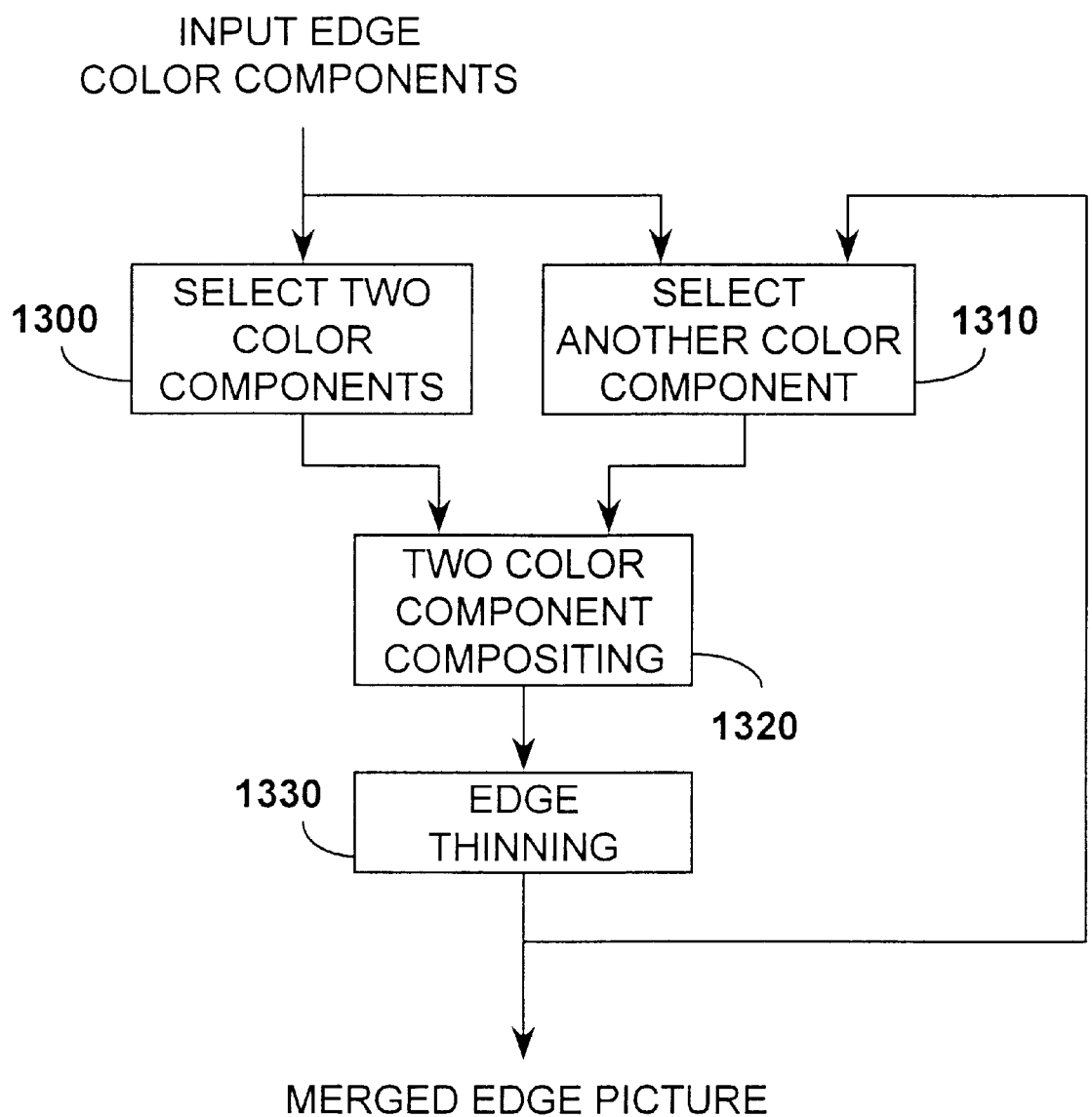
FIG. 13A is a simplified flowchart illustration of a preferred method for carrying out the edge merging operation of the edge mergers of FIGS. 11 and 12A.

Reference is now made to FIG. 13A which is a simplified flowchart illustration of a preferred method for carrying out the edge merging operation of the edge mergers of FIGS. 11 and 12A. In edge merging, it is desirable to maintain the reduced edge thickness, preferably of one pixel, previously obtained in edge thinning (unit 1230 of FIG. 12A).

Two color components are selected for processing by step 1300. Step 1300 processes two components at a time. Preferably the components $I_2$ and $I_3$ described above are processed first, and then the component $I_1$ is processed. The reason for this order of processing is that preference is thereby given to component $I_1$. $I_1$ is given preference because it represents intensity, which typically is the component which carries most of the significant edge information.

The two selected color components are combined together with each combined pixel storing color information from both of the components (step 1320). The pixels are then thinned, preferably to a thickness of one pixel (step 1330). In thinning, when non-zero color values are stored for more than one color component in a given pixel, only one color component, preferably $I_2$ is retained.

When two adjacent lines are found, one such line is removed. In step 1330, a line is at least 2 adjacent pixels. Two lines are adjacent in step 1330 whenever each of at least 2 neighboring pixels of one line are neighbors of, or adjacent to, 2 pixels of a second line, the 2 pixels of the second line being the same 2 pixels for each of the 2 pixels of the first line and the 2 pixels of the second line being neighbors of each other. An exception to the removal of a line is that a pixel which is the only connection between two lines is not removed even when the rest of the line containing the pixel is removed. In deciding which line to retain, preference is typically given to $I_2$, which method is believed to give preferable results, although it is appreciated that preference may be also given to $I_3$.

The result of step 1330 is used as an input to step 1310, along with the remaining component $I_1$. The remaining components are then processed by steps 1320 and 1330, described above. In this case, preference in step 1330 is given to $I_1$, for reasons described above.

Reference is now made to FIGS. 13B–13F, which are simplified pictorial illustrations illustrating the operation of steps 1320 and 1330 of FIG. 13A.

In the present example, $I_1$ is preferred over $I_2$ and $I_3$ and $I_2$ is preferred over $I_3$.

FIG. 13B comprises pixels of all three color components $I_1$, $I_2$, and $I_3$. FIG. 13B comprises one possible example of such pixels. In cases where two or more non-zero color components are present in the same pixel, all but the one preferred component has already been removed in FIG. 13B, as defined above.

FIG. 13C comprises pixels from two color components, $I_2$ and $I_3$, as described in step 1320. FIG. 13D comprises pixels after thinning of the pixels of FIG. 13C, as described in step 1330. FIG. 13E comprises pixels of FIG. 13C with pixels of color component $I_1$ added, again as described in step 1320. FIG. 13F comprises pixels after thinning of the pixels of step 13E, again as described in step 1330.

Figure 14A:
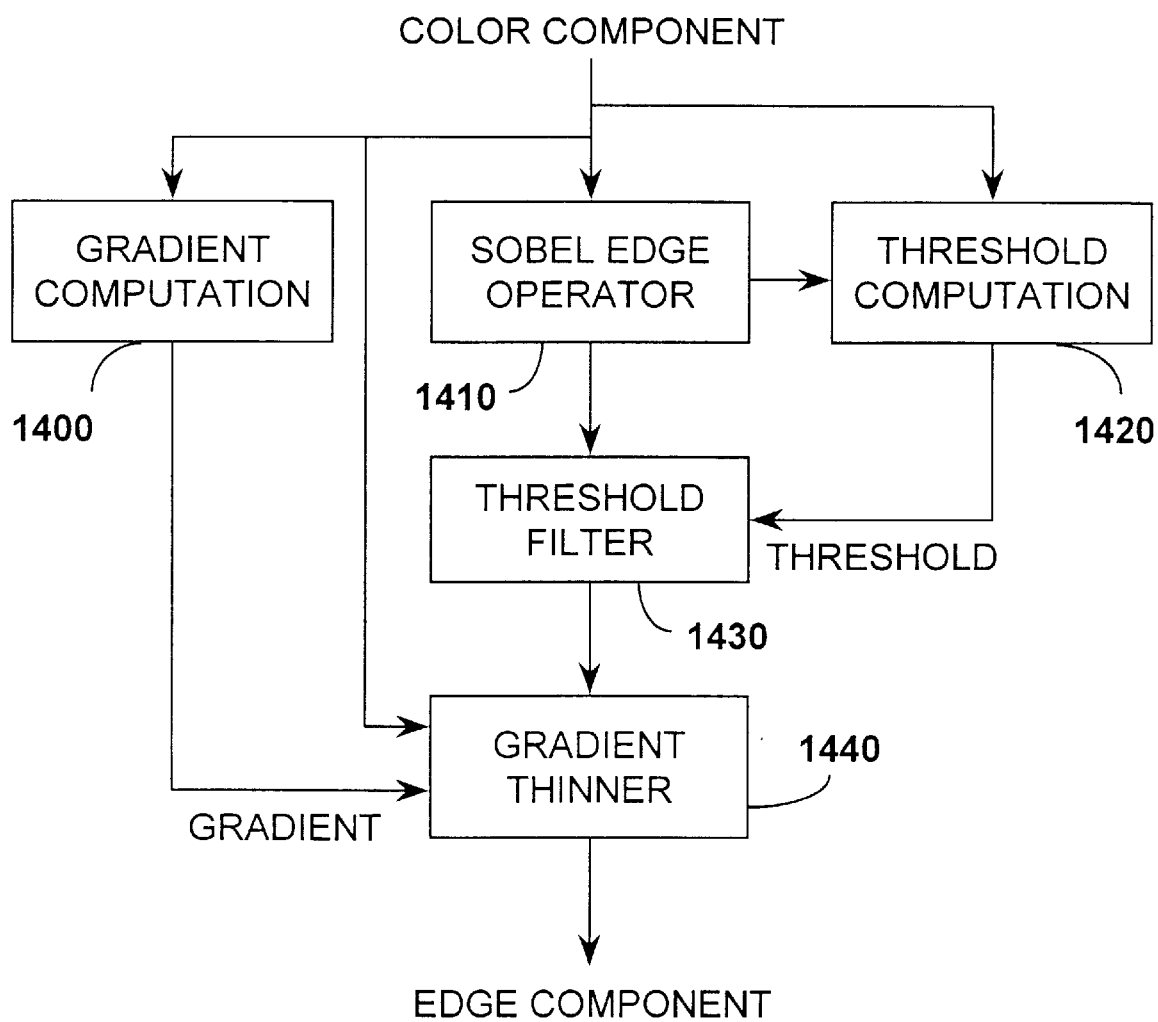
FIG. 14A is a simplified block diagram of the edge detectors, threshold processors, and thinner of FIGS. 11 and 12.

FIG. 14A is a simplified block diagram of the edge detectors, threshold processors, and thinner of FIG. 12, particularly of units 1210, 1220, and 1230.

The input to FIG. 14A comprises a single color component of the original picture.

Edges are detected, preferably using a Sobel edge operator (step 1410). The Sobel edge operator is described in D. K. Ballard and C. M. Brown, *Computer Vision,* Prentice-Hall, 1982, referred to above, at page 77. It is appreciated that other types of edge operator, including various types well known in the art, may be used in place of the Sobel edge operator 1410.

The output of the edge detector is passed to a threshold computation unit 1420, and also to a threshold filter 1430.

Optionally, the threshold computation unit 1420 also receives the original picture, before edge detection. The output of the threshold computation unit 1420, representing a chosen threshold, is passed as input to the threshold filter 1430, which removes all edge pixels with value below the chosen threshold.

The gradient of values of the pixels of the original picture, before edge detection, is computed by a gradient computation unit 1400.

A gradient thinner unit 1440 chooses the edges, preferably of width one pixel, within the output of the threshold filter 1430, based on the original picture and the output of the gradient computation unit 1400, by choosing edges lying along peaks of gradient, where the gradient is maximum. Edges not lying along peaks of gradient are preferred.

Figure 14B:
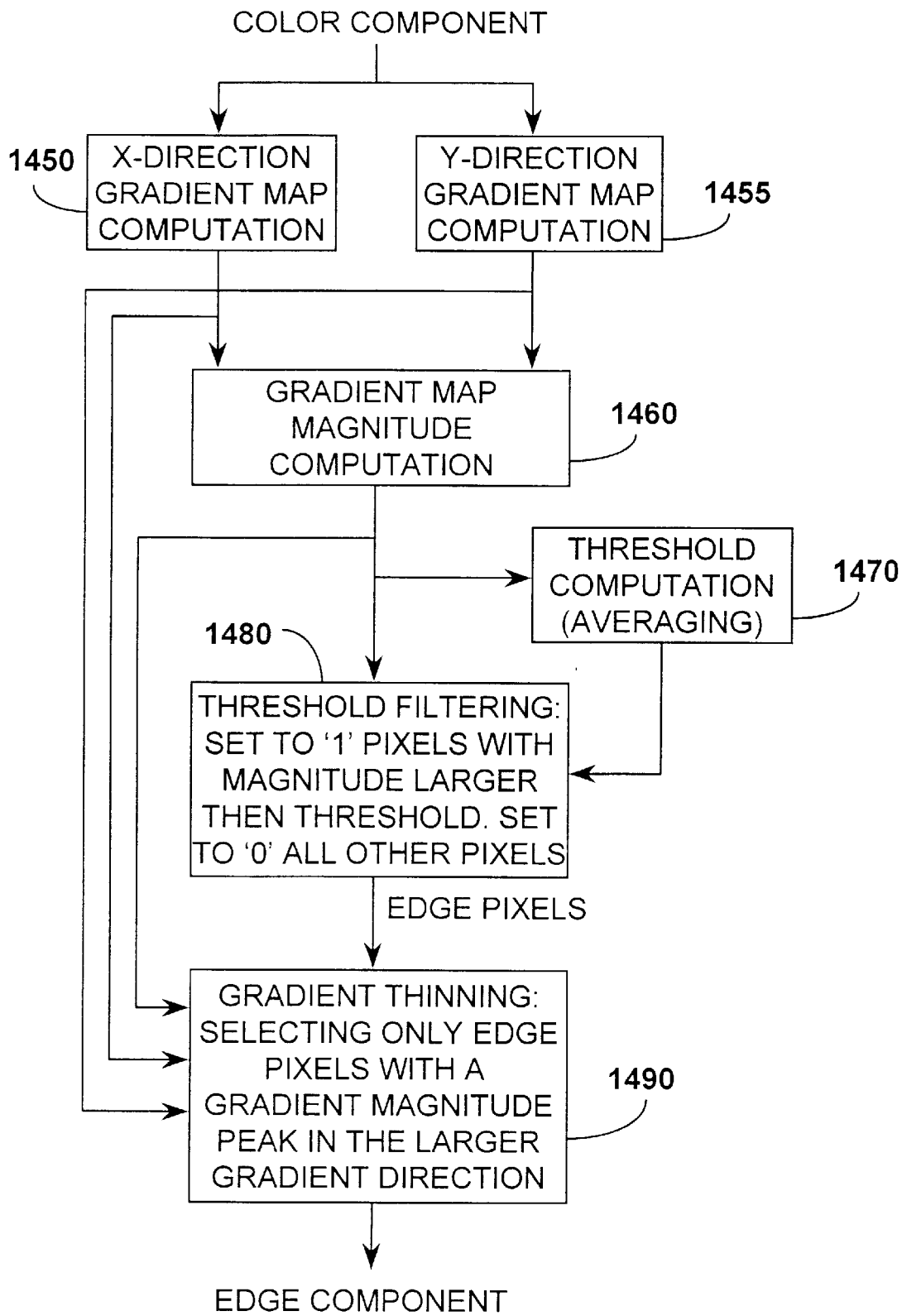
FIG. 14B is a more detailed block diagram of the edge detectors, threshold processors, and thinner of FIG. 14A.

Reference is now made FIG. 14B which is a more detailed block diagram of the edge detectors, threshold processors, and thinner of FIG. 14A. In FIG. 14B, an x-direction gradient map and a y-direction gradient map are computed separately by units 1450 and 1455. The magnitude of the gradient map is computed by unit 1460, typically by computing the square root of the sum of the squares of the magnitude of the x-direction gradient and the magnitude of the y-direction gradient.

Units 1450, 1455, and 1460 correspond to the Sobel edge operator 1410 of FIG. 14A. In FIG. 14B, the outputs of units 1450 and 1455 are also used later by unit 1490, described below, to increase computational efficiency.

A threshold is computed by unit 1470. Typically, the threshold is twice the average of all magnitudes computed by unit 1460. The threshold is applied by threshold filter unit 1480.

A gradient thinning unit 1490 is operative to find edges, typically by finding the larger of the x-direction and y-direction gradients for each pixel. For each pixel, in the direction of the larger gradient, the gradient thinning unit 1490 selects at least one pixel with maximum gradient from among all edge pixels in the direction of the larger gradient. Together, all the selected pixels chosen by selecting from all of the pixels comprise an edge.

Figure 15:
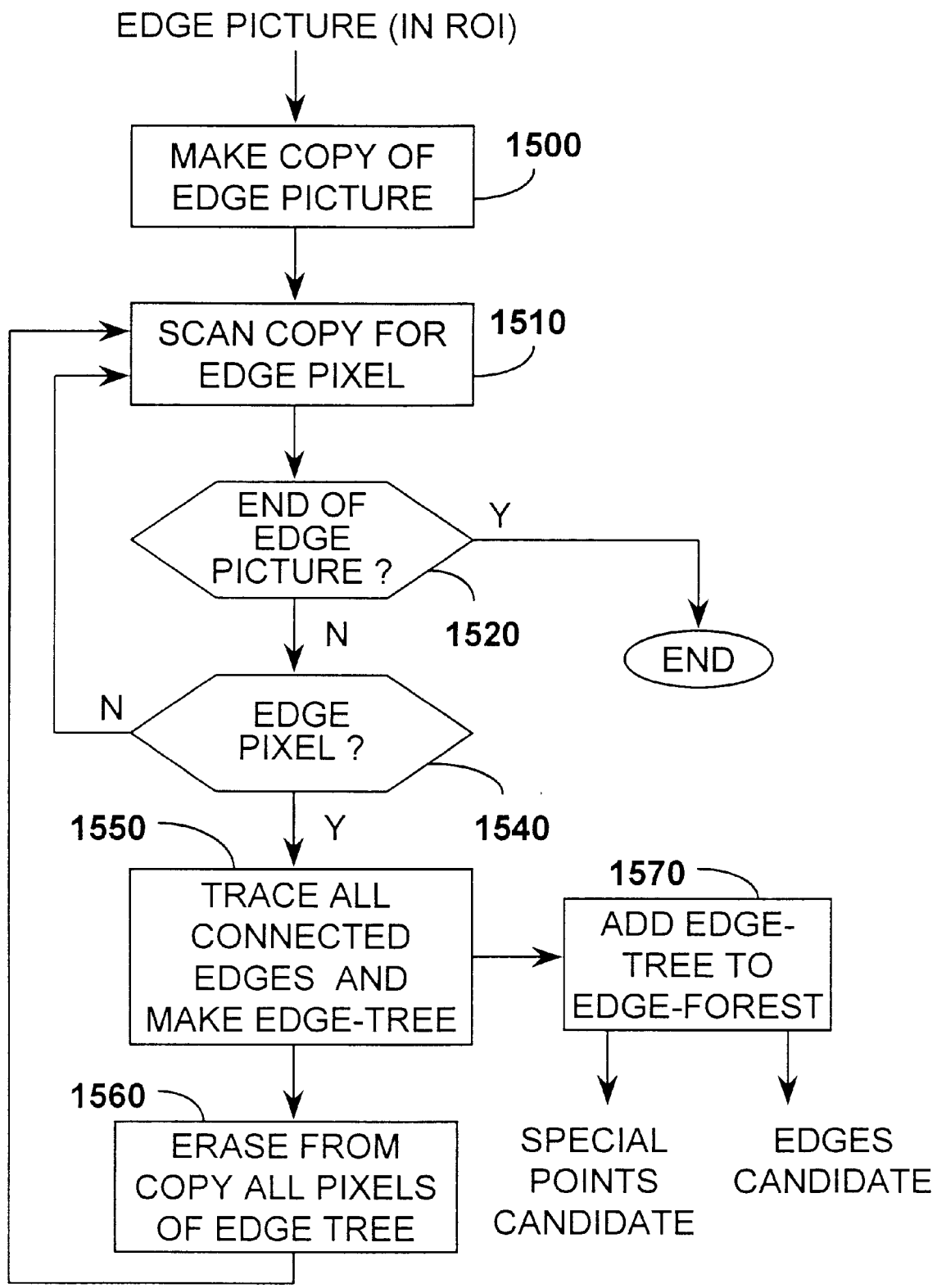
FIG. 15 is a simplified block diagram of the component mapping unit of FIGS. 3A and 4–10.

Reference is now made to FIG. 15 which is a simplified block diagram of the component mapping unit of FIGS. 3A and 4–10. Unit 1500 makes a working copy of the edge picture produced by the pre-processing units of FIGS. 3A and 4–10. The working copy is scanned for an edge pixel (unit 1510), until the end of the picture is reached (unit 1520). If the current pixel is not an edge pixel (unit 1540), scanning continues.

If the current pixel is an edge pixel, pixels along the edge are traversed until a junction pixel, a terminal pixel, or another special point is identified as described below with reference to FIG. 16A, and the junction pixel, terminal pixel, or other special point is identified as a root pixel. All pixels connected with the root pixel are traced, forming an edge tree (unit 1550). If no junction pixel, terminal pixel, or other special point is found, the initial edge pixel is taken as the root pixel.

Unit 1550 identifies candidate special points, as, for example, points at edge junctions. Candidate special points may also, for example, include terminal points in an edge not connected to a junction and edge corners.

The edge tree is added to an edge forest consisting of all edge trees found (step 1570), and the pixels of the edge tree are erased from the working copy of the edge picture (step 1560).

The edge forest provides a component map comprising special point candidates and edge candidates and the relationships between them, as described below with reference to FIG. 16A.

Methods for forming an edge tree are well known in the art, and include the method described in Yija Lin, Jiqing Dou and Eryi Zhang, "Edge expression based on tree structure", Pattern Recognition Vol. 25, No. 5, pp 507–517, 1992, referred to above.

The methods for forming an edge tree known in the art have the drawback that the list of edges and the list of nodes produced are not necessarily independent of the direction of traversal of the edges and of the choice of root node. A preferred method for forming an edge tree, which overcomes the drawbacks of methods known in the prior art, is now described with reference to FIG. 16A as follows. The method of FIG. 16A is specific to the case where all special points are junctions.

Evaluation rules for forming the edge tree are as follows:

Visible area rule: The region around the current edge pixel, as seen from the direction of entry to the pixel and towards the other directions, is termed herein a "visible area". The visible area of the current edge pixel is classified as diagonal or straight according to the direction in which the current edge proceeds from the current edge pixel. "Straight" means entering horizontally or vertically, that is, not diagonally. Reference is now additionally made to FIGS. 16B and 16C, which are simplified pictorial illustrations of visible areas, useful in understanding the method of FIG. 16A. In FIG. 16B, arrows depict the directions that are straight, while in FIG. 16C arrows depict the directions which are diagonal.

All directions are seen as part of the visible area except as follows:

a. If the visible area is straight, all backwards directions, both the directly backwards direction and the diagonally backward directions, are not seen.

b. If the visible area is diagonal, only the directly backwards direction, which is the diagonal direction from which the pixel was entered, is not seen.

Figure 16A:
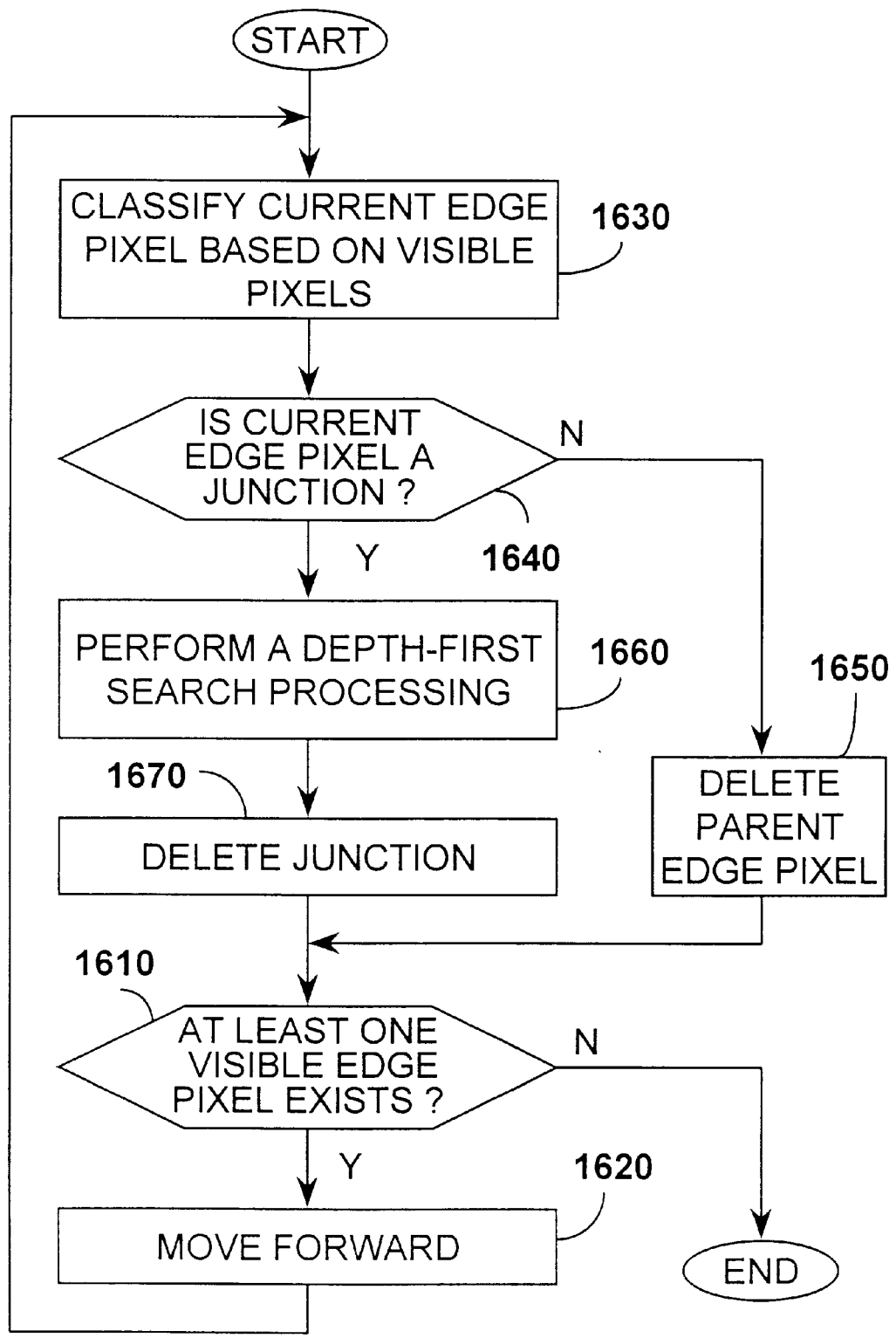
FIG. 16A is a simplified block diagram of a preferred method of operation of units 1550 and 1560 of FIG. 15.
Figure 16B:
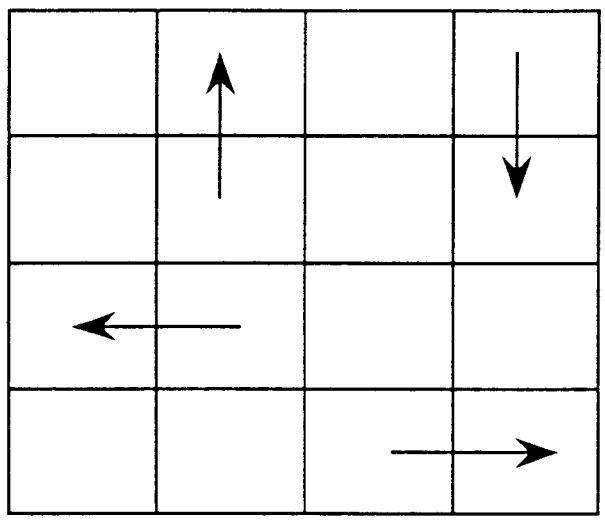
FIGS. 16B and 16C are simplified pictorial illustrations of visible areas, useful in understanding the method of FIG. 16A.
Figure 16C:
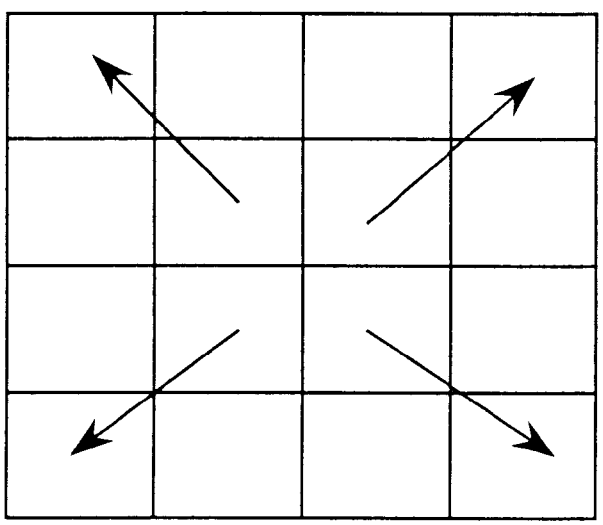
Figure 16D:
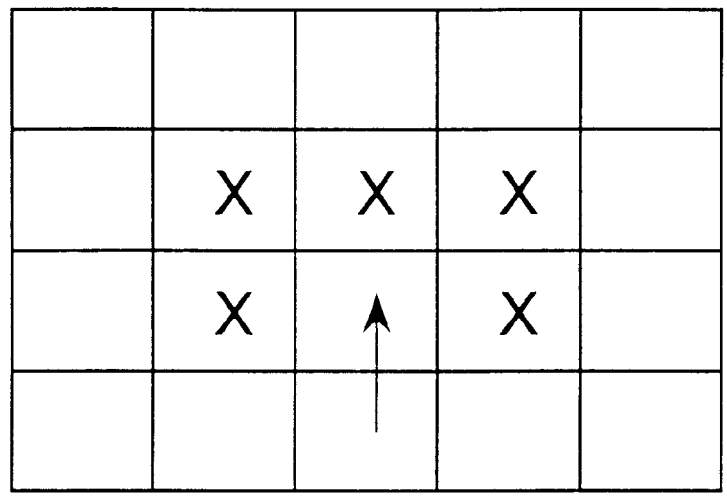
FIGS. 16D–16H, are simplified pictorial illustrations of a plurality of pixels, useful in understanding the method of FIG. 16A.
Figure 16E:
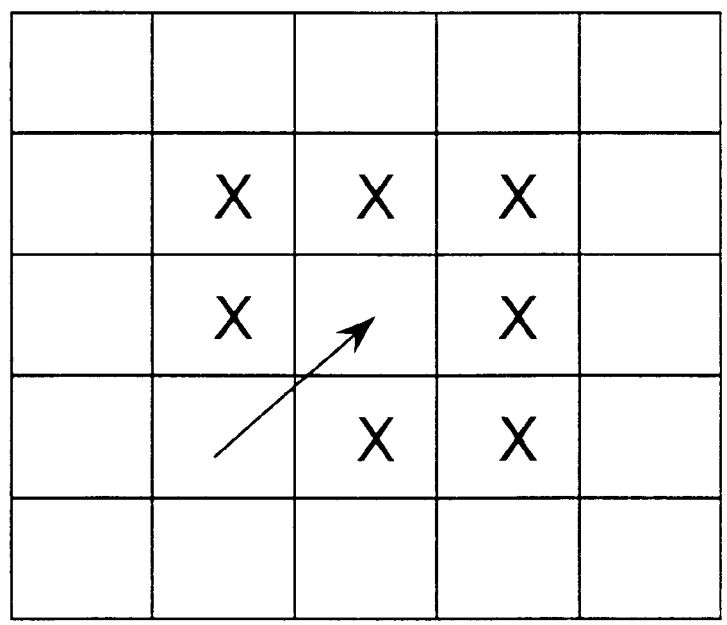

Reference is now additionally made to FIGS. 16D–16E, which are simplified pictorial illustrations of a plurality of pixels, useful in understanding the method of FIG. 16A. In FIGS. 16D and 16E, arrows depict the direction of entry into the visible area. FIG. 16D comprises a straight visible area. FIG. 16E comprises a diagonal visible area.

Blind strip rule: If, in the visible area of the current edge pixel, there are one or more pixels in a straight direction, further connected edge pixels are preferably sought in the straight direction, and the diagonal directions are blocked, in the sense that they are not seen as part of the visible area.

Figure 16F:
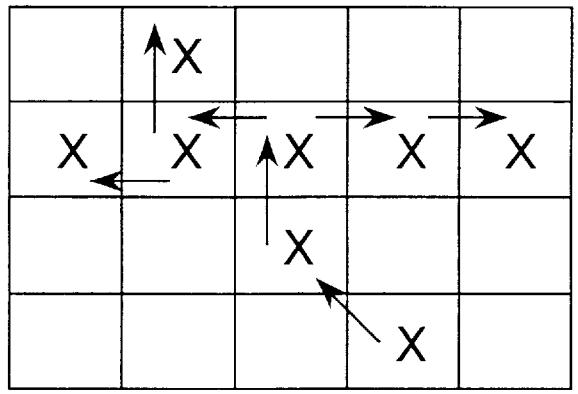
Figure 16G:
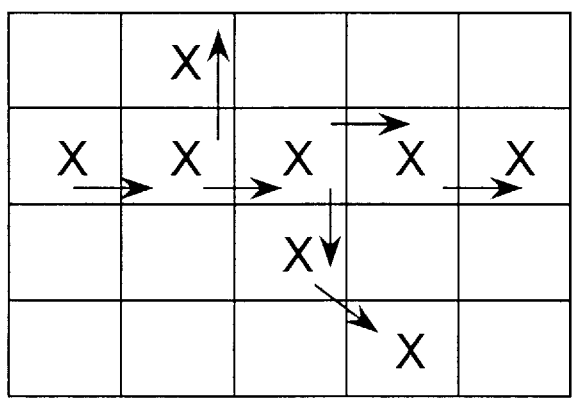
Figure 16H:
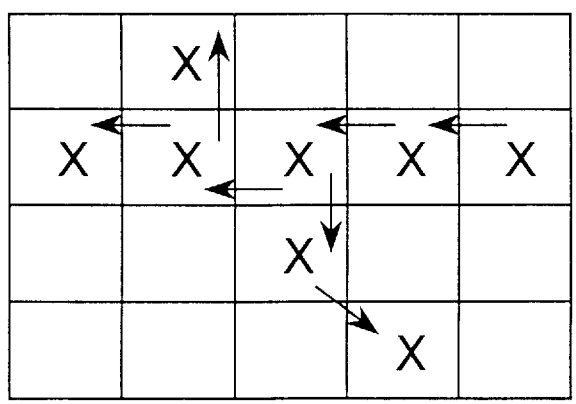

Reference is now additionally made to FIGS. 16F–16H, which are simplified pictorial illustrations of a plurality of pixels, useful in understanding the method of FIG. 16A. FIGS. 16F–16H comprise a plurality of edge pixels and depict application of the blind strip rule thereto. In FIGS. 16F–16H, arrows depict the directions in which additional pixels are sought according to the blind strip rule. Each of FIGS. 16F–16H depict entry at a different pixel. It is appreciated that, in each case, regardless of point of entry, the same junctions are found.

Visible pixel rule: The term "visible pixels", as used throughout the specification and claims, refers to edge pixels adjacent to the current pixel in the visible area, not including any pixels ignored under the blind strip rule. Note that, generally, because of the method of identifying edge pixels, no more than 3 visible pixels will be seen, except in the case of a root pixel which is at a junction of four edges, in which case 4 visible pixels will be seen.

The current edge pixel is classified based on the following pixel classification rules:

1. If the current pixel has two or more visible pixels, the current pixel is identified as a junction pixel. However, if exactly 2 visible pixels are seen and the current pixel is a root pixel, the current pixel is not identified as a junction pixel; rather, subsequent pixels are processed.
2. If the current pixel has no visible pixels, the current pixel is identified as a terminal pixel.
3. If the current pixel has one visible pixel, the current pixel is identified as a "usual branch pixel". However, if the current pixel is the root pixel, the current pixel is classified as a terminal pixel.

The description of the tree structure is as follows:

Every element of the tree is either a branch or a junction. A branch is defined herein as a sequential, connected set of usual branch pixels, and is typically represented as a dynamic array of pixel coordinates and characteristics. The color typically represents the color or some other characteristic of the pixel, such as an indication that the pixel is a pixel which was added to fill in a gap.

Each element of the tree is preferably defined by a list of attributes, preferably including the following:

flag, defining its type as branch or junction;
parent pointer, pointing to previous element or parent; and
neighboring pointers, pointing to neighboring elements in the direction of traversal, or children.

The tree is then built according to the following tree building method:

First, the first pixel is classified according to the above rules (step 1630).

1. Delete parent pixel (step 1650); i.e., delete pixels from the image that were already processed. This step is omitted in case of the first pixel, which has no parent.
2. Exception to rule 1: if current pixel is a junction (step 1640), perform a depth-first search and delete a junction only after all of its children are evaluated (steps 1660 and 1670).
3. If at least one visible edge pixel exists (step 1610), move forward to the next edge pixel (1620).
4. Classify the next pixel (step 1630).

It is appreciated that, in addition to junctions, other types of special points may be identified as, for example, corners.

Figure 16I:
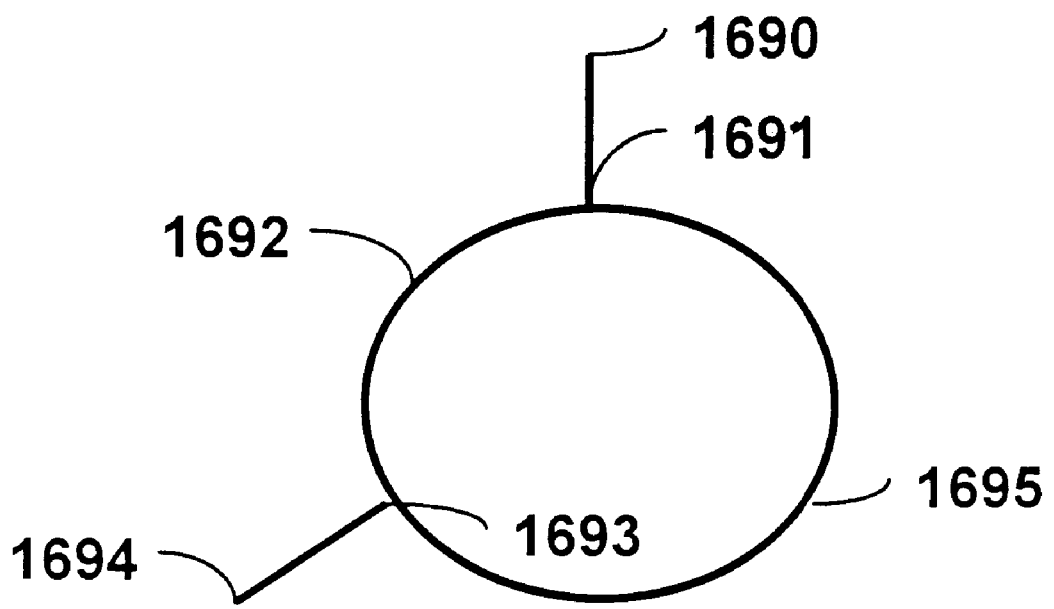
FIG. 16I is a simplified pictorial illustration of an edge picture, from which a tree is to be built according to the method of FIG. 16A.

Reference is now additionally made to FIG. 16I, which is a simplified pictorial illustration of an edge picture, from which a tree is to be built according to the method of FIG. 16A.

FIG. 16I comprises an edge 1690. FIG. 16I also comprises an edge junction 1691, at the end of the edge 1690. FIG. 16I also comprises an edge 1692 lying between the edge junction 1691 and an edge junction 1693. FIG. 16I also comprises an edge 1694, at one end of which lies edge junction 1693. FIG. 16I also comprises an edge 1695, lying between edge junction 1691 and edge junction 1693.

Processing of FIG. 16I in accordance with the method of FIG. 16A, in order to build a tree, may proceed as follows:

1. Begin at a root pixel (not shown in FIG. 16I) at the end of edge 1690 away from the edge junction 1691.
2. According to pixel classification rule 3, the root pixel is classified as a terminal pixel (step 1630).
3. All of the pixels of edge 1690 are processed according to steps 1610, 1620, 1630, 1640 and 1650 until the edge junction 1691 is reached.
4. An edge pixel (not shown in FIG. 16I) is found at edge junction 1691, and processing continues with steps 1660 and 1670. The effect of steps 1660 and 1670, which comprise depth-first search processing and junction deletion, is to process the remainder of FIG. 16I before deleting the edge junction 1691.

Figure 17:
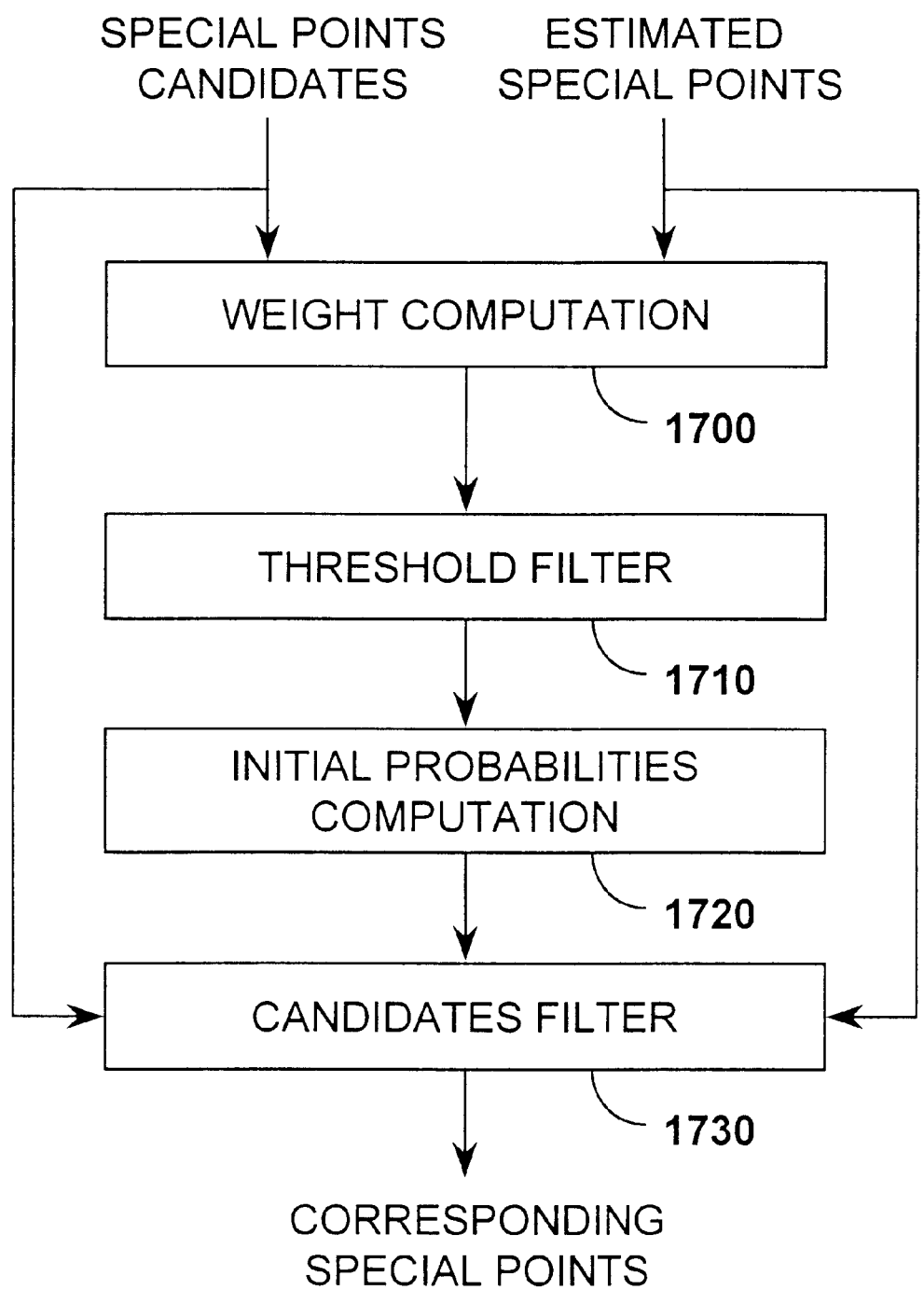
FIG. 17 is a simplified block diagram of the special points correspondence finding block of FIGS. 3A and 4–10.

Reference is now made to FIG. 17 which is a simplified block diagram of the special points correspondence finding block of FIGS. 3A and 4–10. A weight computation unit 1700 receives as input a list of special point candidates, typically from the ROI, and estimated or predicted special points and computes a correlation weight between each special point candidate and each estimated or predicted special point. The correlation weight is based on a correlation error. The estimated points may comprise known points from a previous frame. The operation of the weight computation unit 1700 is described in more detail below with reference to FIG. 18.

A threshold filter 1710 applies a minimum threshold to the weights received from the weight computation unit 1700 and outputs a thresholded weight. The threshold filter 1710 receives the correlation error from the weight computation unit 1700, and preferably computes an appropriate threshold based thereupon. A typical threshold is based directly on correlation error as, for example 0.125, when the correlation error is normalized in a range 0:1.

It is appreciated that the special point candidates may not necessarily come only from the ROI, but may also come from a region chosen based on distance from an estimated point, or from a region chosen based on other criteria. In such a case, the weight computation may take the distance into account.

Based on the thresholded weight an initial probability is computed (unit 1720) for each candidate, showing its probability to be each of one or more special points. Typically, the initial probability for each point is computed as follows:

1. The possibility exists that no appropriate candidates exist. Therefore, a fictional candidate is added, preferably without a specific location, with an initial assigned probability of $Pr^*=(1-W_{max})$, where $W_{max}$=maximum correlation weight of all candidates.

2. For each candidate not including the fictional candidate, the probability is computed as follows:

$$Pr(j)=W_{max}*(W_j)/SUM\ (W_j),$$

where $W_j$ is the weight of candidate j, and

SUM is taken over all candidates, not including the fictional candidate.

The candidates are then filtered in a candidates filter 1730, which picks the best possible candidate for each special point based on a filter criterion. The filter method may, for example, choose the candidate with the highest probability. Preferably, the method may use a more complex filtering criterion taking into account possible movements and irregularities in movement of the special points, and the relationships between them. A preferred method for operation unit 1730 is described below with reference to FIG. 32.

Figure 18:
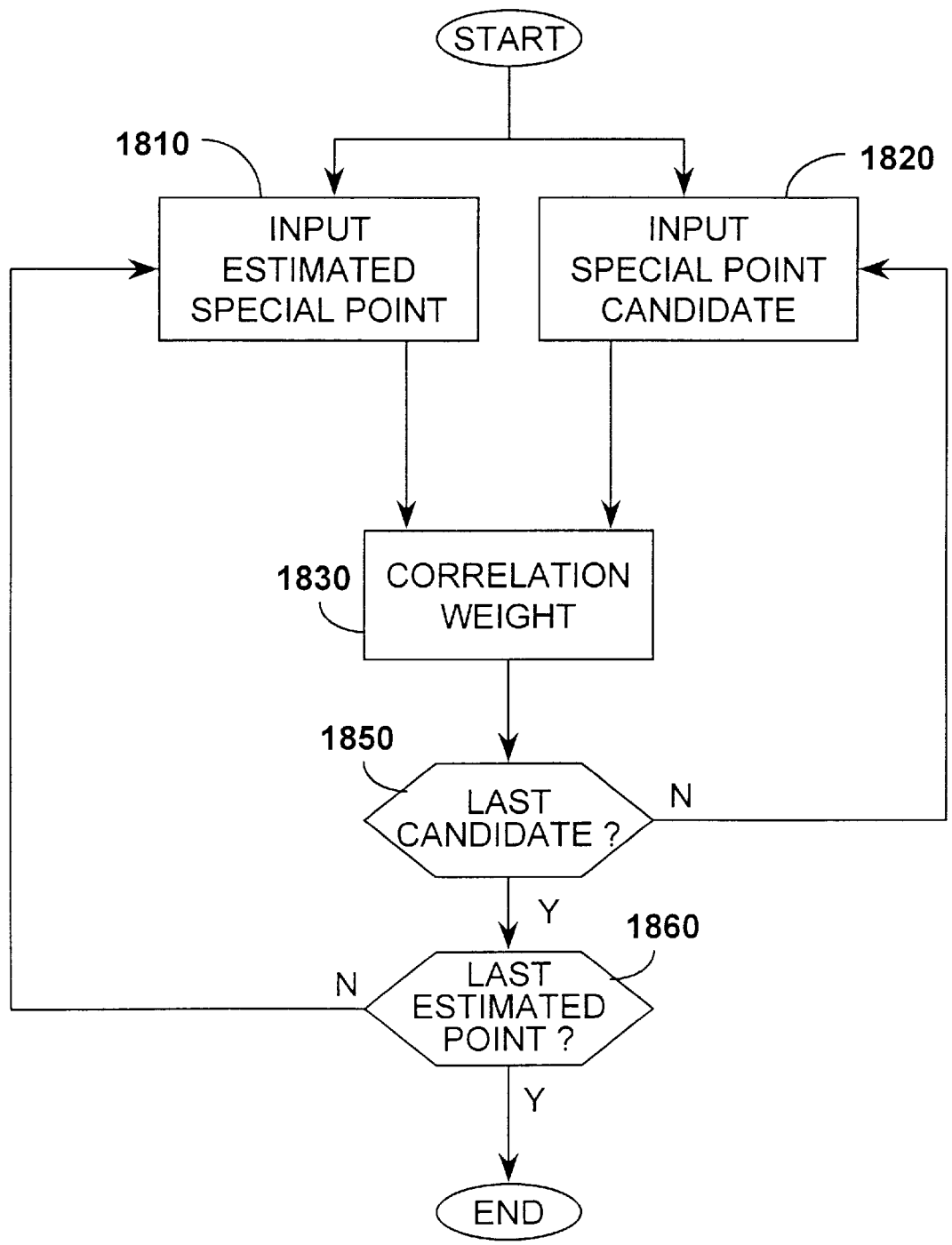
FIG. 18 is a simplified flowchart of a preferred method of operation for the special points weights computation unit 1700 of FIG. 17.

Reference is now made to FIG. 18, which is a simplified flowchart of a preferred method of operation for the special points weights computation unit 1700 of FIG. 17. An estimated or predicted special point and a special point candidate are input (steps 1810 and 1820). A correlation weight is computed (step 1830), based on the estimated or predicted special point and the special point candidate colors.

A preferred formula for computing correlation weight is as follows:

$$\text{correlation weight}=(1/(1+C*ER))$$

where C is a coefficient, preferably having a value of 10; and

ER is the normalized correlation error between a special point candidate and an estimated/predicted special point.

A preferred formula for computing ER is as follows:

$$ER=SQRT((SI_1+SI_2+SI_3)/27)$$

where SQRT is the square root;

and $SI_n=SUM\ ((I_n^K-I_n^{OK})*(I_n^K-I_n^{OK}))$, where SUM is the sum from k=1 to k=9, I is the intensity of the pixel, normalized in the ranged 0:1, K and OK are indexes representing a mask of pixels around the special point candidate and the estimated/predicted special point, respectively, and n represents the index of the color, as defined above.

The above formulas are for a 3×3 mask. It is appreciated that masks of other sizes may also be used. If, for example, a 5×5 mask is used, the sum would be taken from 1 to 25 and the denominator in the formula for ER would be equal to 75 instead of 27.

The correlation computation is repeated for each combination of an estimated/predicted special point with all of its candidate points (steps 1850 and 1860).

Figure 19:
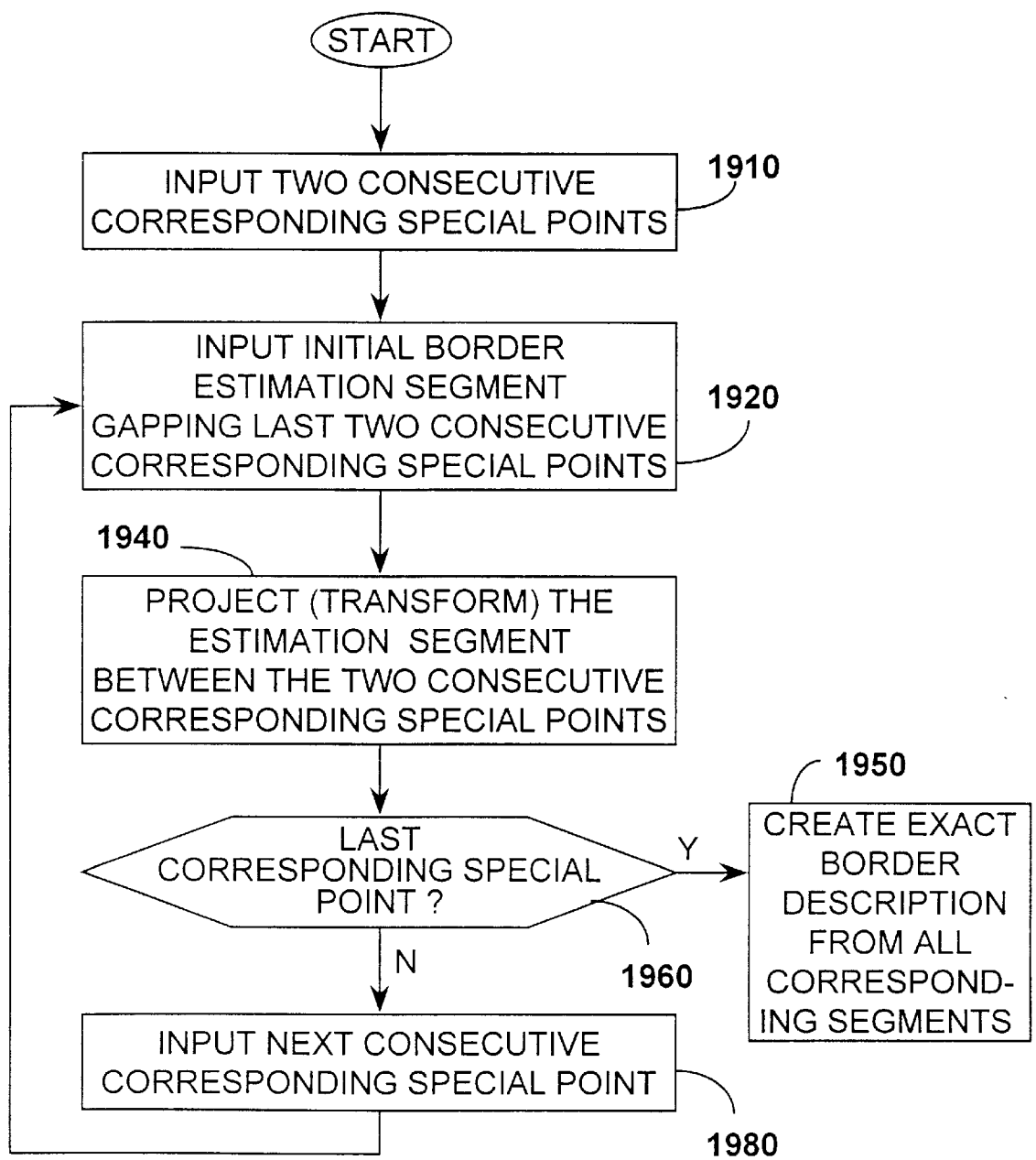
FIG. 19 is a simplified flowchart of a preferred method of operation for the border estimation block of FIGS. 3A and 4.

Reference is now made to FIG. 19 which is a simplified flowchart of a preferred method of operation for the border estimation block of FIGS. 3A and 4. Two consecutive corresponding special points are input (step 1910). An initial estimated border segment is input (1920). The initial estimated border segment connects the last two consecutive corresponding special points.

The estimation segment is projected between the consecutive corresponding special points, and an estimated border segment is created (step 1940).

The remaining special points are then processed until the last special point is reached (steps 1960 and 1980). The estimated border segments are then used to create an exact border description (step 1950).

Figure 20:
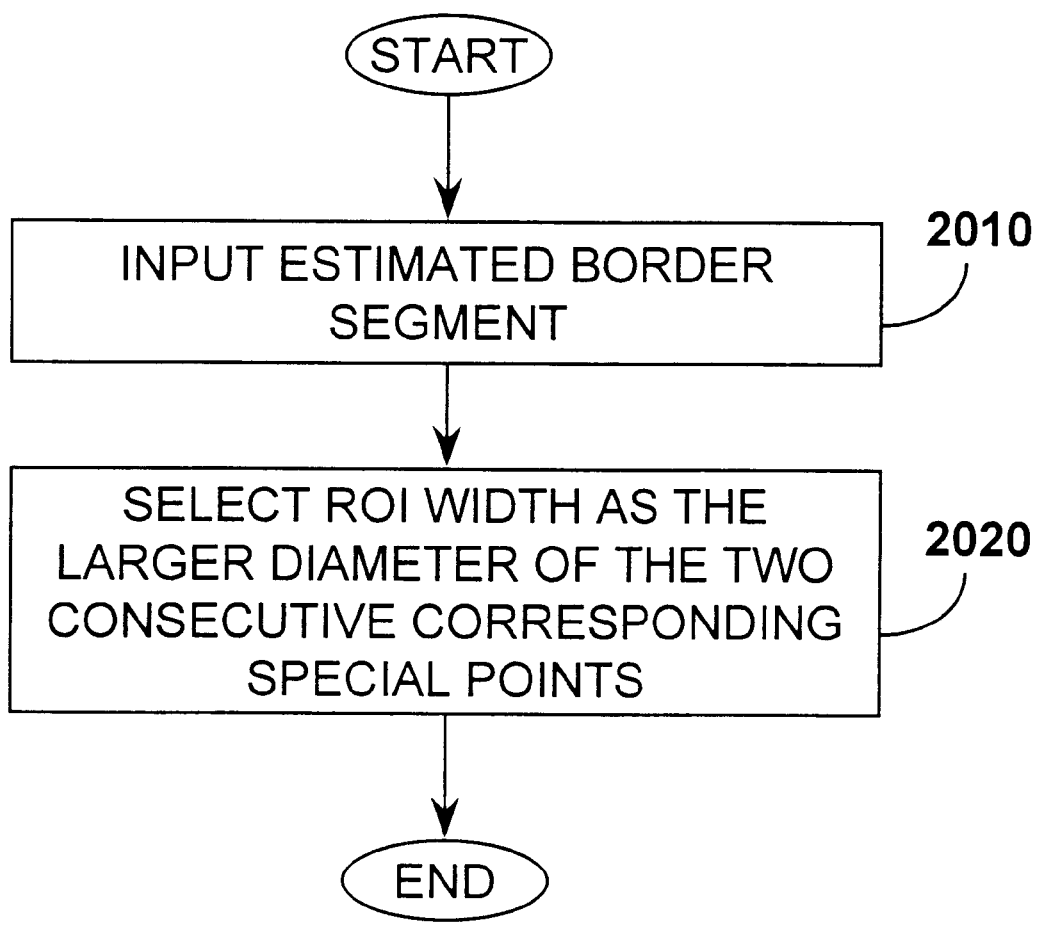
FIG. 20 is a simplified flowchart of an alternative preferred method of operation for the border estimation block of FIGS. 3A and 4.

Reference is now made to FIG. 20 which is a simplified flowchart of an alternative preferred method of operation for the border estimation block of FIGS. 3A and 4. In the method of FIG. 20, widths of ROIs (regions of interest) for borders are also computed. It is appreciated that the method of FIG. 20 is preferably performed at the conclusion of the method of FIG. 19. In the method of FIG. 20, a corresponding border segment is input (step 2010). The size of the ROI is selected as the size of the larger diameter of the two consecutive corresponding special points (step 2020).

Figure 21:
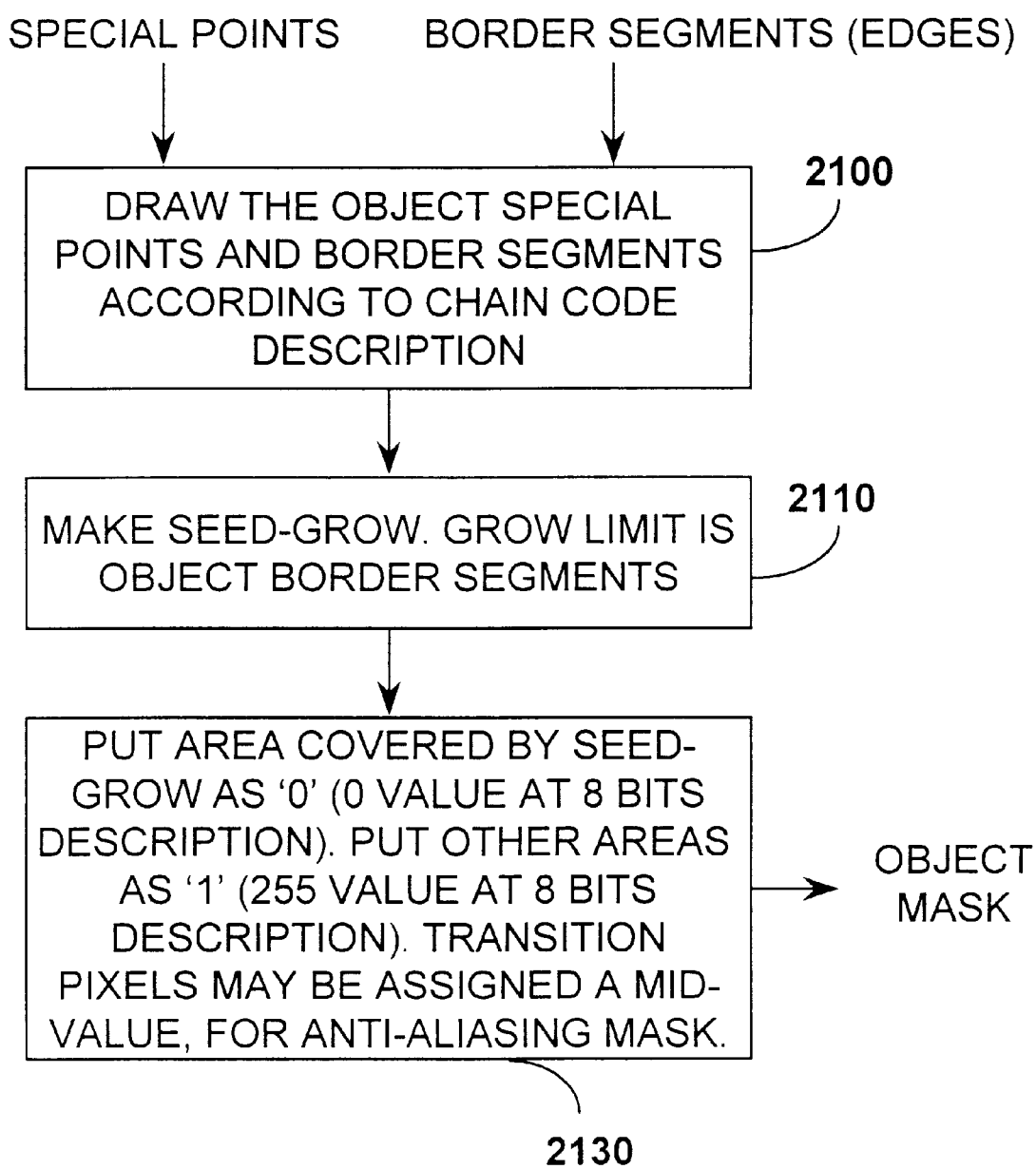
FIG. 21 is a simplified flowchart of a preferred method of operation for the borders and mask generation unit of FIGS. 3A and 4–10.

Reference is now made to FIG. 21 which is a simplified flowchart of a preferred method of operation for the borders and mask generation unit of FIGS. 3A and 4–10. In the method of FIG. 21, object special points and border segments are drawn according to the chain code description (step 2100). The term "drawn", as used in step 2100, does not necessarily indicate drawing in a visible form, but rather refers to creating an internal representation analogous to a drawn representation.

A seed-grow is created (step 2110) beginning from the frame of each picture. The seed-grow is limited by meeting an object special point or border segment, and does not go past a border segment. The seed-grow continues until no further growth is possible. Preferably, the seed grow begins on a portion of the picture frame which is not part of an object. Preferably, in order to ensure that the seed-grow begins on a portion of the picture frame which is not part of an object, an extra row of blank pixels is added all around the picture frame, and the seed-grow begins in one of the extra pixels.

Methods for seed-grow are well-known in the art, and are described in D. K. Ballard and C. M. Brown, *Computer Vision,* referred to above, at page 149.

Pixels of the picture are then assigned values (step 2130) as follows: area covered by the seed-grow, 0; other areas, 1; optionally, transition pixels, intermediate value between 0 and 1. Assigning an intermediate value to transition pixels may be preferred, for example, in the case where the mask being created includes anti-aliasing. Optionally, a border description may be created from the object mask by outputting only the transition pixels.

It is appreciated that the method of FIG. 21 creates a particular output format consisting of a mask, and that many other output formats and data representations may be used as, for example, direct chain code output.

Figure 22:
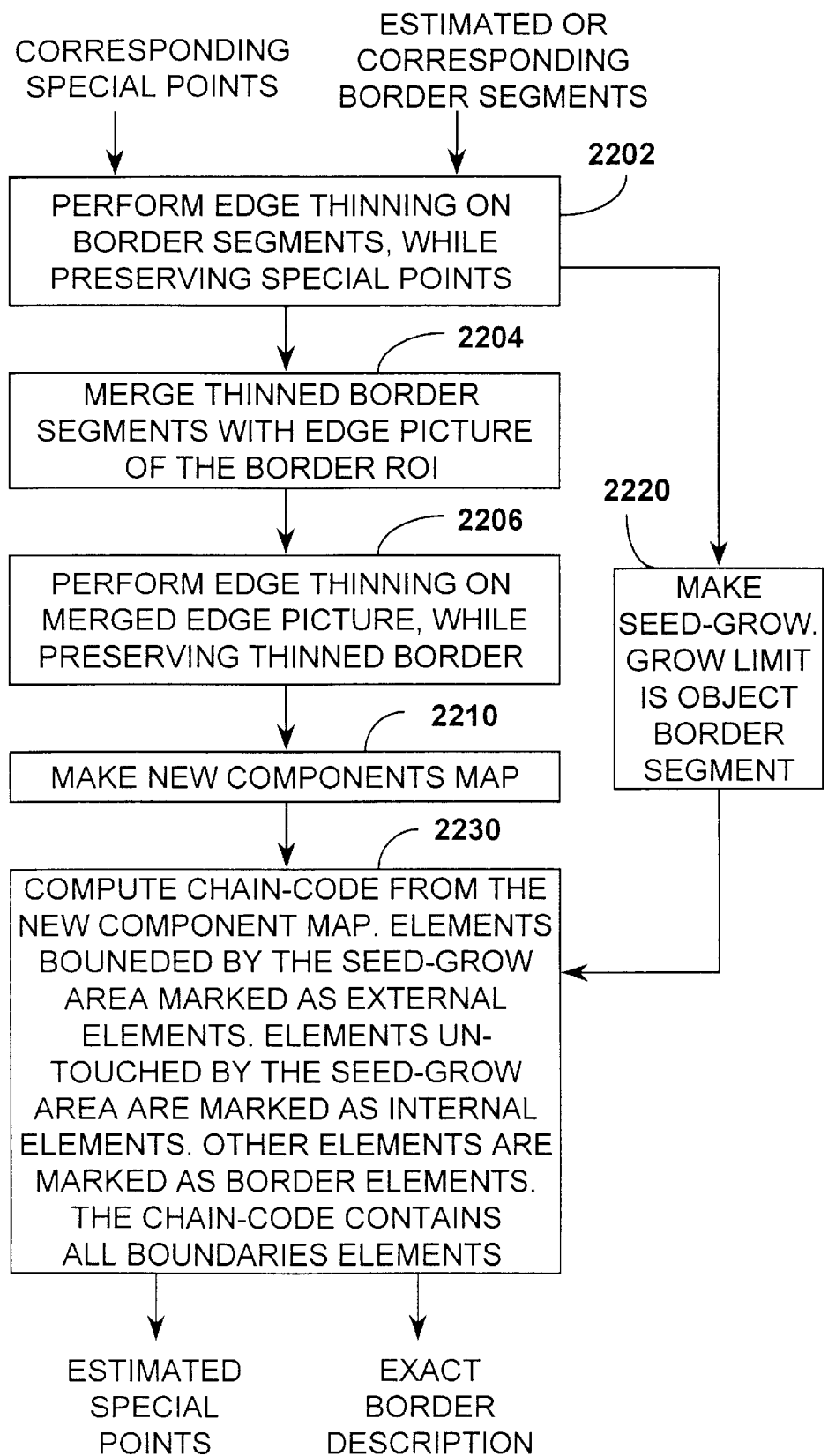
FIG. 22 is a simplified flowchart of a preferred method of operation for the exact object border description blocks of FIGS. 3A, 4, 5, 6, 7, 8, 9 and 10.

Reference is now made to FIG. 22 which is a simplified flowchart of a preferred method of operation for the exact object border description blocks of FIGS. 3A, 4, 5, 6, 7, 8, 9 and 10. FIG. 22 comprises a method for operation of blocks 350, 450, 465, 550, 576, 650, 665, 750, 850, 950 and 1050. The method of FIG. 22 also comprises a preferred method of operation for the border description portion of blocks 370, 470, 570, 670, 771, 774, 871, 874, 971, 974, 1071, 1074.

The method of FIG. 22 preferably comprises the following steps.

In the case of blocks 350, 450, 550, 650, 750, 850, and 950, it is appreciated that some steps of FIG. 22 may be omitted and only certain steps of FIG. 22, such as, for example, steps 2220 and 2230, are then performed. In this case, in place of corresponding special points and corresponding border segments, special points and border segments derived from the user's initial indication of the objects to be tracked may be input.

Edge thinning is performed on border segments, preserving special points (step 2202). Along the direction of the edge, if the edge is greater than one pixel in width, the width is reduced to one pixel. The reduction to one pixel is accomplished by keeping only one pixel, either the central pixel in the case where the edge is an odd number of pixels in width, or one of the two central pixels if the edge is an even number of pixels in width. However, every pixel constituting a special point is kept, and if the special point is not a central pixel then the special point is kept and other pixels are not kept.

The thinned border segments from step 2202 are merged with the edge picture of the border ROI (step 2204), produced by the apparatus of FIG. 12A.

The merged output of 2204 is thinned again in step 2206, similarly to the thinning of step 2202 described above.

A new component map is created from the output of step 2206, preferably only including the special points and border segments (step 2210). A preferred method for performing step 2210 is similar to that described above with reference to FIGS. 15 and 16.

A seed-grow is performed (step 2220), similar to the seed-grow described above with reference to step 2110 of FIG. 21. The grow limit for the seed grow of step 2220 is any border segment.

In step 2230, a chain code is computed from the new component map as follows. Elements bounded by the seed-grow area are marked as external elements. "Bounded" is understood in step 2230 to mean surrounded, except possibly at junction points. Elements not touched at all by, that is, not bordering at all on the seed-grow area, are marked as internal elements. Other elements, touched but not bounded by the seed-grow area are marked as border elements.

A chain code is then computed, linking, in order, all of the border elements. For further processing, the chain code is taken to comprise an exact border description, and the junctions described therein are taken as estimated special points.

Figure 23:
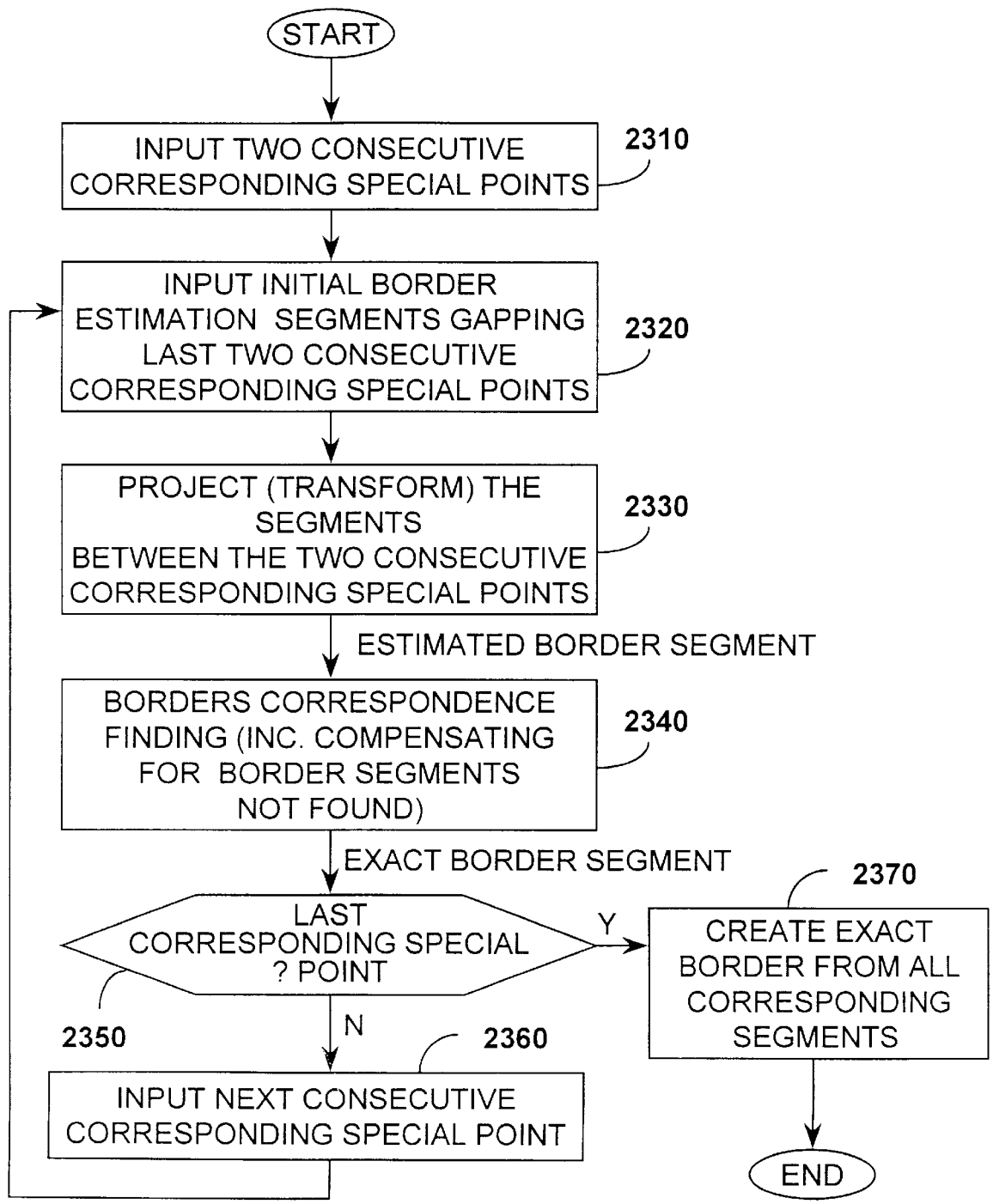
FIG. 23 is a simplified flowchart of a preferred method of operation of steps 570, 572, and 574 of FIG. 5 and of steps 670, 672, and 674 of FIG. 6.

Reference is now made to FIG. 23 which is a simplified flowchart of a preferred method of operation of the following elements: 570, 572, and 574 of FIG. 5, combined; 670, 672, and 674 of FIG. 6, combined; 771, 772 of 774 of FIG. 7, combined; 871, 872, 874 of FIG. 8, combined; 971, 972, 974 of FIG. 9, combined; and 1071, 1072, 1074 of FIG. 10, combined. It is appreciated that, in the case of elements 774, 874, 974, and 1074, FIG. 23 describes only a portion of the operation thereof and does not include other portions which are described above with reference to FIG. 22.

The steps of the method of FIG. 23 are similar to those of FIG. 19, and are self-explanatory with reference to the above description of FIG. 19, except as described below.

In step 2340, border correspondences are found, including compensating for border segments not found by using the estimated border segments.

In step 2370, an exact border description is created from all corresponding segments.

Figure 24:
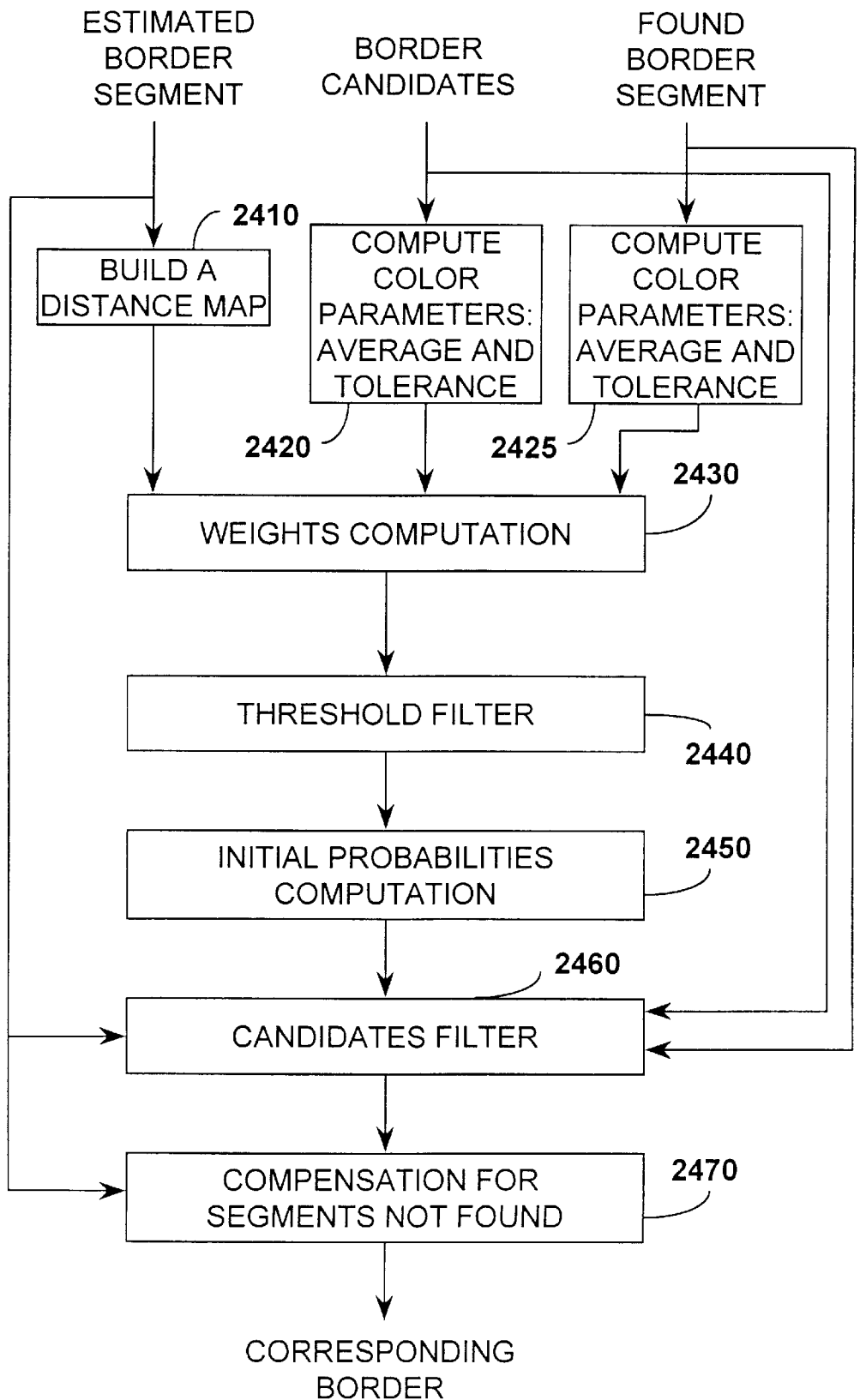
FIG. 24 is a simplified flowchart of an alternative method of operation of step 2340 of FIG. 23.

Reference is now made to FIG. 24 which is a simplified flowchart of an alternative method of operation of step 2340 of FIG. 23.

In step 2410, a distance map is built. A distance map is a map which indicates the distance of each pixel from an individual estimated border segment. Preferably, the distance map is built for each estimated border segment within the ROI. In the case that two end corresponding points have a different ROI size, the larger ROI size is preferably used.

Preferably, the distance map is created as follows:
a. each border segment pixel is assigned a distance of 0;
b. each unassigned pixel adjacent to a pixel that was already assigned a distance of n is assigned a distance of n+1, except for pixels diagonally adjacent to the last pixel at the end of the region of assigned pixels, which is not assigned a distance;
c. step b is repeated until each pixel within the ROI has been assigned a distance.

In step 2420, color parameters of border candidates are computed. Border candidates are typically edges found in the ROI. The color parameters preferably comprise average and tolerance. Preferably, each of the average and the tolerance are computed separately for a strip, typically of width 1 pixel, adjacent to the edge at the interior and exterior thereof. The interior and exterior are distinguished based on the direction of traversal of the border.

The average is computed as separate averages for each color component, each taken to be the average value of one of the three color components $I_1$, $I_2$, and $I_3$. The tolerance, also computed separately for each color component, describes the tolerance of the average color, and is typically based on the variance. A preferred method for computing the tolerance is described below with reference to FIG. 25.

Step 2425 is similar to step 2420, except that the input to step 2425 is a found border segment.

In step 2430, a weight is computed for each border segment, representing the similarity between the candidate border segments and the found border segment. Typically, separate weights are computed based on average color, average distance, tolerance of average color, and tolerance of distance. Typically, average distance is computed based on the average of the distances assigned to the pixels in the candidate border segment by the distance map computed previously, as described in step 2410.

In step 2440 a threshold filter applies a minimum threshold to the weights received from the weight computation 2430 and outputs a combined, thresholded weight.

Based on the combined, thresholded weight an initial probability is computed (unit 2450) for each candidate, representing its probability to be a part of a border segment corresponding to the found border segment. The candidates are then filtered in a candidates filter 2460, which picks the best possible group of one or more candidates for the border segment corresponding to the found border segment, based on a filter criterion. Preferably, the filter method takes into account the probability that each candidate is part of the border segment, as well as the relationship, that is, distance and angle, between the candidates with respect to the border segment. The filter method may employ maximum probability methods or any appropriate statistical iteration method such as, for example, a relaxation method. Relaxation methods are described in S. T. Barnard and W. B. Thompson; G. G. Pieroni and M. F. Costabile; R. N. Strickland and Zuhua Mao;. and A. Rosenfeld, R. A. Hummel, and S. W. Zucker, "Scene Labeling by Relaxation Operations", referred to above.

Parts of the border segment that were not found previously in step 2460 are filled in step 2470 using the estimated border segment or parts thereof.

Figure 25:
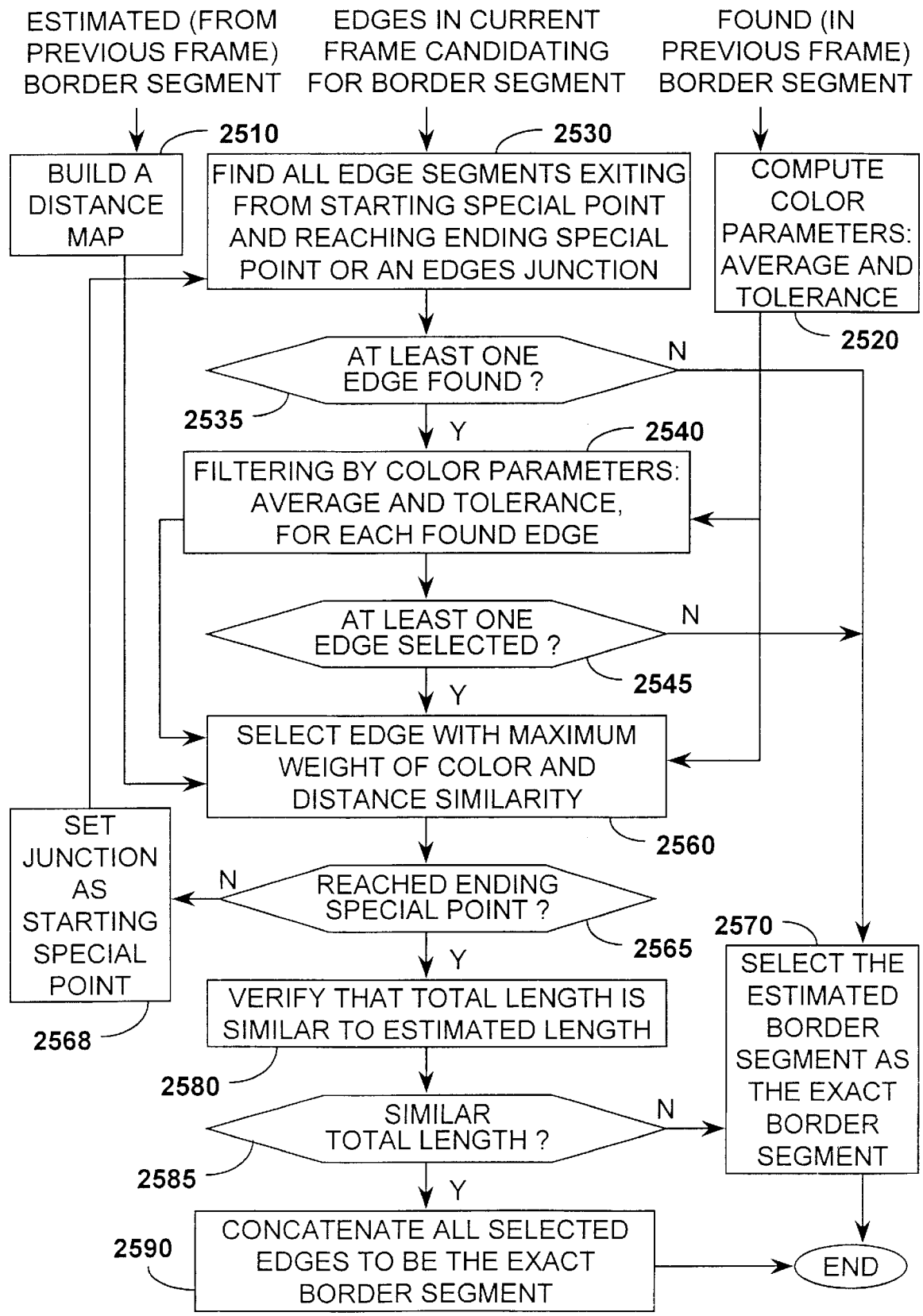
FIG. 25 is a simplified flowchart of a further alternative method of operation of step 2340 of FIG. 23.

Reference is now made to FIG. 25 which is a simplified flowchart of a further alternative method of operation of step 2340 of FIG. 23. The method of FIG. 25 is believed to be a preferred method of operation of step 2340 of FIG. 23, and is particularly suitable in the case of processing of sequential frames.

Step 2510 is similar to step 2410 of FIG. 24.

Step 2520 is similar to step 2425 of FIG. 24. Preferably, the tolerance is computed according to the following formula, where the non-normalized intensities are in the range 0:255:

20+0.2*(average color)+2*(variance of color)

In step 2530, beginning at a special point, typically a junction, all edge segments exiting from the special point are found, until another special point is found or a junction is reached.

If no edge is found (step 2535), the estimated or predicted border segment is taken to be the exact border segment (2570).

Alternatively to proceeding with step 2570, and similarly after steps 2545 and 2585 described below, the method of FIG. 25 may be performed again, beginning at step 2530, but finding edge segments in the opposite direction, that is, from the ending special point to the starting special point. After both directions have been attempted and no ending point is reached, processing would then continue with step 2570.

Further alternatively, in step 2570, if a portion of the border segment was found exactly and another portion was not found, only the portion not found may be replaced with the estimated or predicted border segment. Preferably in this case, the estimated border segment is projected based on the position of the exactly found border segment or segments.

Furthermore, the projected estimated border segment may be used to further find, within an ROI around the projected estimated border segment, further exact border segments by repeating the method of FIG. 25 beginning at step 2530. In this case, in step 2530, the process of finding may begin not only at the starting special point or ending found border segment, but may search elsewhere within the ROI by, for example, advancing step-by-step through the ROI. Preferably, the ROI is updated according to the exact border segments which are found, by reprojecting the remaining estimated border segments not found. Thus, segments outside of the original ROI may also be found.

The edges are filtered, typically with a minimum threshold filter, according to color parameters, typically comprising average and tolerance (step 2540).

If no edges are selected (step 2545), processing continues at step 2570.

The most similar edges are filtered according to the filter parameters of step 2540, preferably with the addition of distance (step 2560).

If the ending special point is not reached (step 2565), we have reached a junction and the junction is set as a starting special point (step 2568), and processing continues with step 2530.

If the ending special point has been reached, the total length is compared to the estimated length to verify that the entire border segment has been identified (step 2580). Typically, the estimated length is taken to be sufficiently close to the actual length, or similar, if the two lengths differ by no more than a predetermined percentage such as, for example, 30%.

If the total length is not similar (step 2585), processing continues at step 2570. If the length is similar, all selected edges are concatenated together to form the exact border segment (step 2590).

Figure 26:
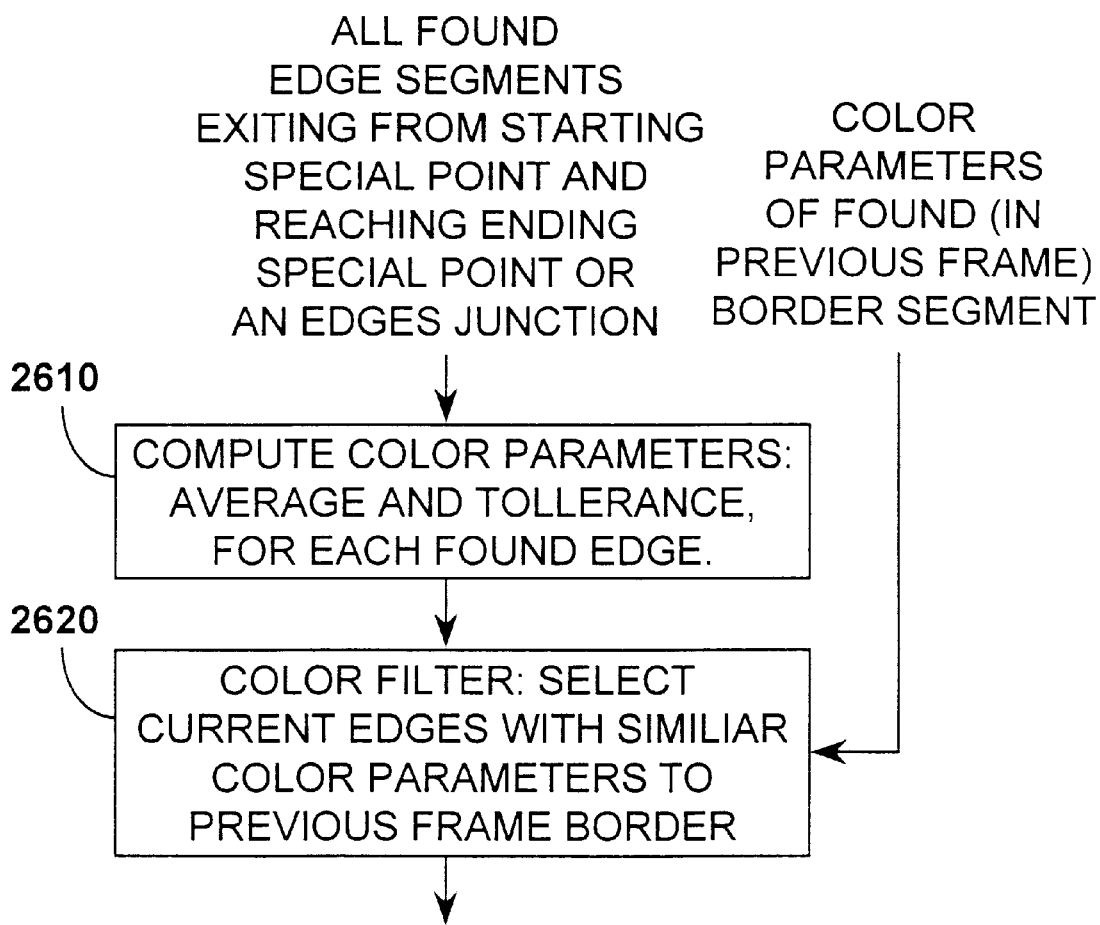
FIG. 26 is a simplified flowchart of a preferred method of operation of step 2540 of FIG. 25.

Reference is now made to FIG. 26 which is a simplified flowchart of a preferred method of operation of step 2540 of FIG. 25. The method of FIG. 26 preferably comprises the following steps.

Color parameters, preferably comprising average and tolerance for each color component, are computed for each found edge segment. Preferably, tolerance is computed as described above with reference to FIG. 25 (step 2610).

Current edges whose interior color parameters are similar to interior color parameters of the previous frame border are selected (step 2610). Exterior parameters may be used, typically when an object occludes the object whose borders are being processed, or when the background is relatively stationary relative to the object. "Similar" in this step means that the average value of color for the current edge is within the tolerance of the previous border color (step 2620).

Figure 27:
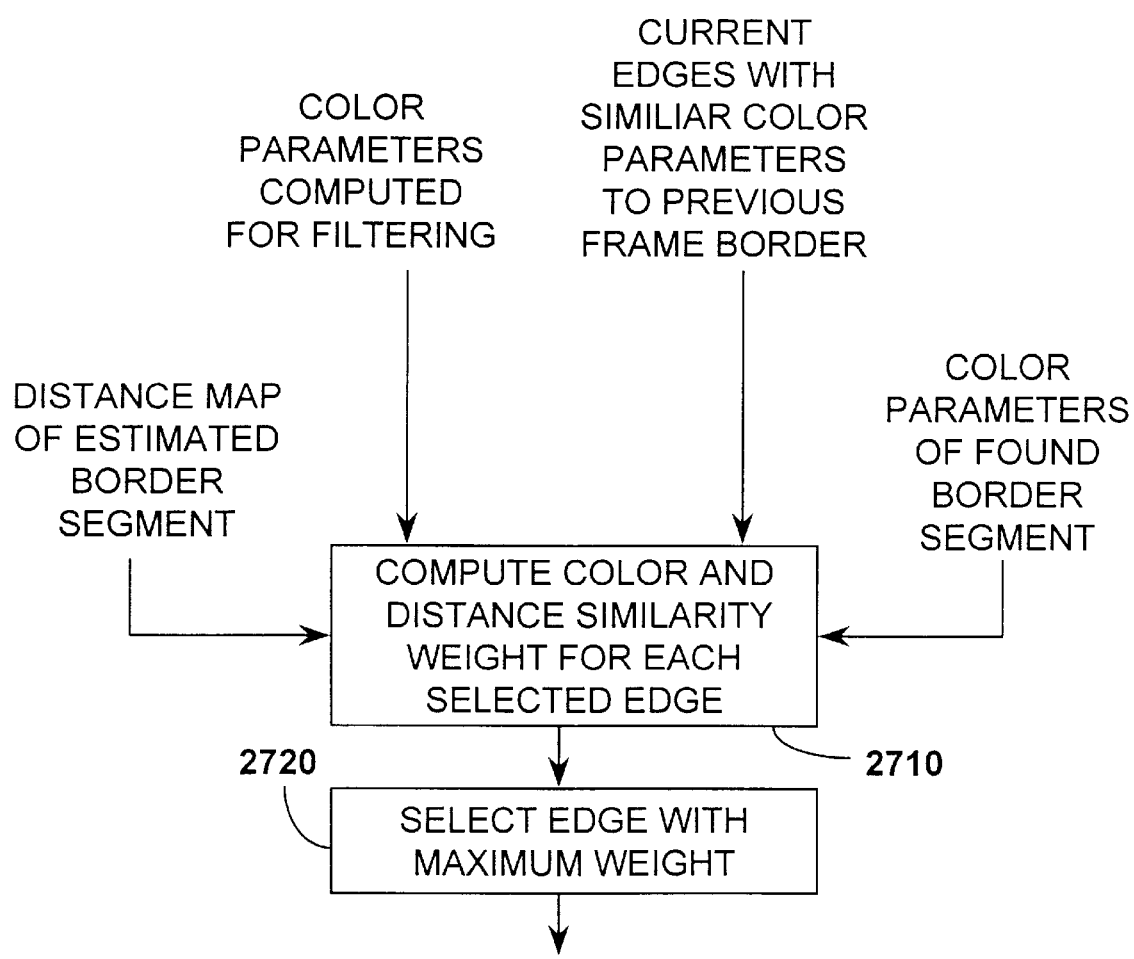
FIG. 27 is a simplified flowchart of a preferred method of operation of step 2560 of FIG. 25.

Reference is now made to FIG. 27 which is a simplified flowchart of a preferred method of operation of step 2560 of FIG. 25. The method of FIG. 27 preferably includes the following steps.

A weight $w_i$, combining information on both color and distance similarity, is computed for each selected edge i (step 2710). A preferred formula for computing the combined weight is as follows:

$$w_i = 18/den$$

$$den = (1+8*er_i)*(1+4*er_{out})*(1+d_i)* (1+2*var(d_i))*(1+(1/1_i)),$$

where:

$er_i$ is the error of the interior color for edge i;

$er_{out}$ is the error of the exterior color for edge i;

$d_i$ is the average distance from the predicted or estimated edge, normalized by the width of the distance map around the edge;

$var(d_i)$ is the variance of distance normalized by the width of the distance map around the edge; and $l_i$ is the length of the edge i, the error being preferably computed, separately for interior and exterior color, according to the following formula:

$$\text{error} = (SQRT\ (I_1 - I_1^o)^2 + (I_2 - I_2^o)^2 + (I_3 - I_3^o)^2) * (1/SQRT(3)),$$

where:

SQRT represents square root;

$I_n$ is the average interior or exterior color of the candidate edge;

$I_n^o$ is the average interior or exterior color of the previous or found edge for which a corresponding candidate edge is sought; and n ranges from 1 to 3, representing the three color components.

The edge with the maximum weight is selected (step 2720).

Figure 28:
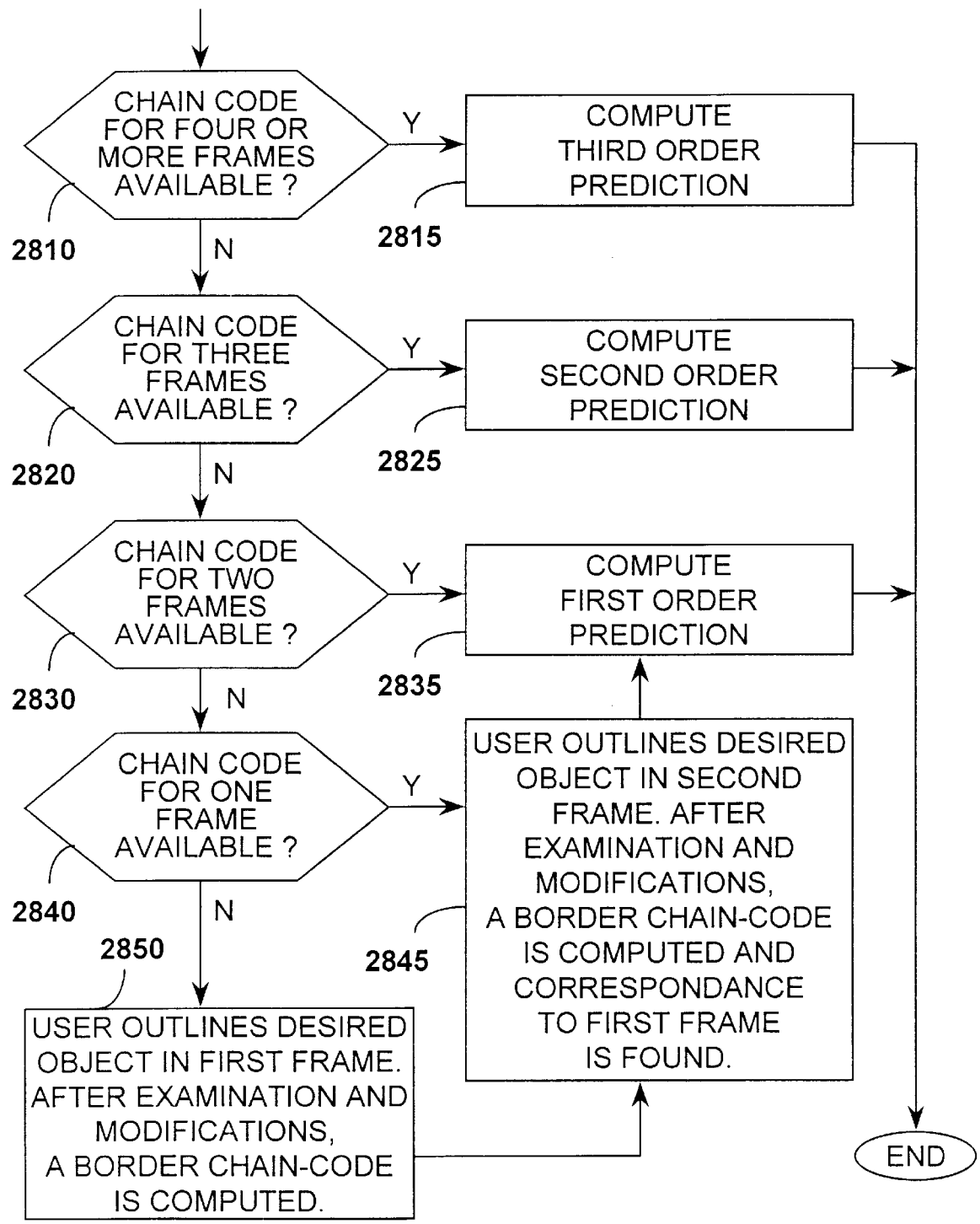
FIG. 28 is a simplified flowchart of a prediction method useful in the methods of FIGS. 7–10.

Reference is now made to FIG. 28 which is a simplified flowchart of a prediction method useful in the methods of FIGS. 7–10. The method of FIG. 28 is particularly useful for steps 752, 777, 852, 866, 952, 975, 1052 and 1066. The method of FIG. 28 preferably comprises the following steps.

The method of FIG. 28 refers to the case in which frame-by-frame processing is occurring. A check is made for whether chain code is available for four or more consecutive frames (step 2810). If not, processing continues with step 2820, described below.

A third order prediction of borders and/or special points is performed (step 2815). Step 2815 is described in more detail in FIG. 31, below, for the case of special points. Typically, borders are predicted similarly by using equations of motion on the control points of the splines of the estimated border segments.

Similarly, in steps 2820 and 2830 a decision is made, based on how many chain codes are available, as to whether a second order prediction (step 2825) or a first order prediction (step 2835) is to be made. Step 2825 is described more fully in FIG. 30 below, and step 2835 in FIG. 29 below.

In step 2840, sufficient information is not available for a prediction. In this case, the user is asked to identify the desired object in the second frame (step 2845) and, if necessary, in the first frame (step 2850).

Figure 29:
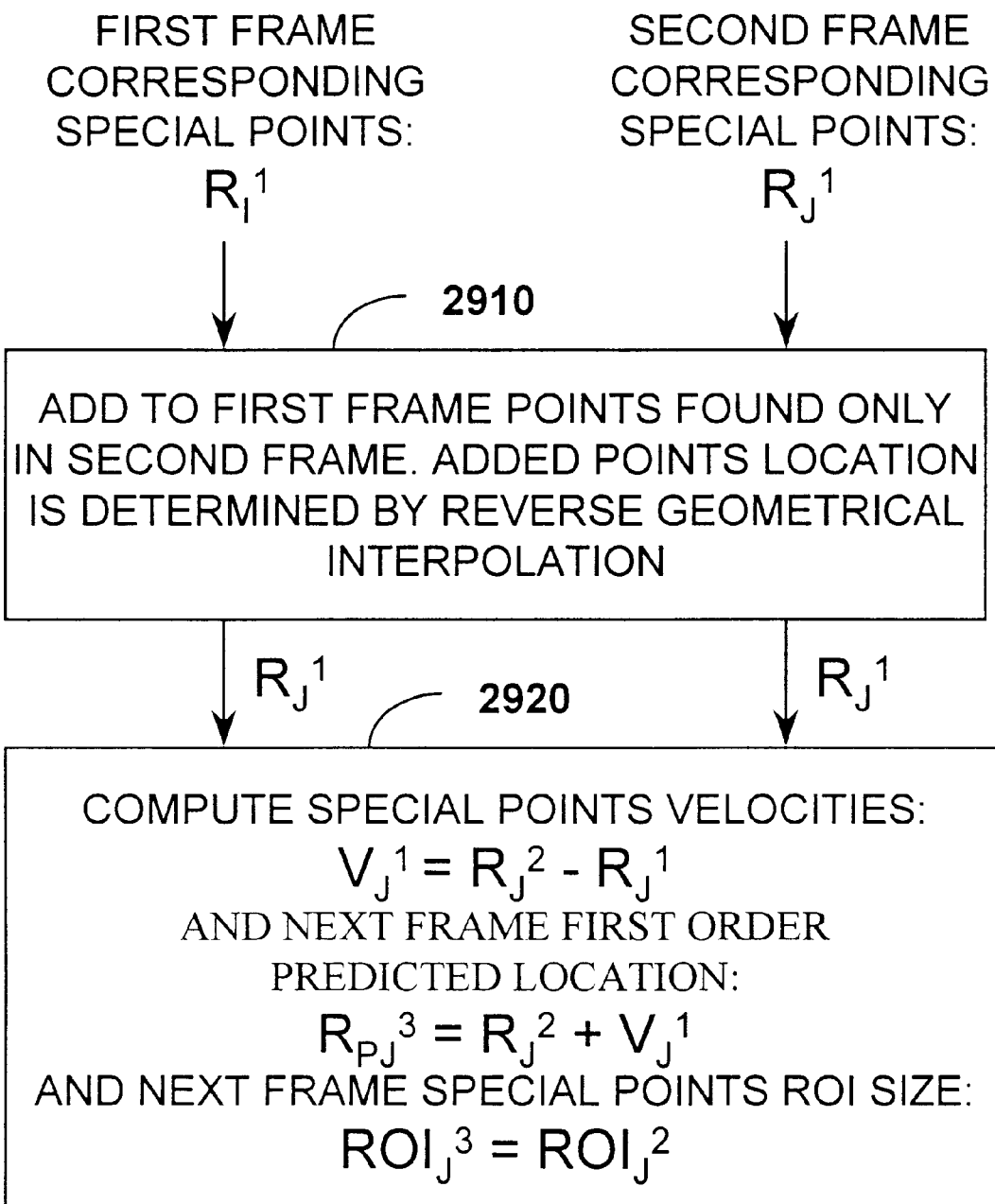
FIG. 29 is a simplified flowchart of a preferred method for carrying out the steps of FIG. 28 in the case of first-order prediction.

Reference is now made to FIG. 29 which is a simplified flowchart of a preferred method for carrying out the steps of FIG. 28 in the case of first-order prediction. The method of FIG. 29 preferably comprises the following steps.

First frame and second frame corresponding special points are input. Points found only in the second frame are added to the first frame (step 2910), so that the same number of points will be found in each frame, allowing a complete prediction for the next frame. In step 2910, point location is preferably determined by reverse geometrical interpolation along the chain-code edge, according to the points' location relative to the location of the two chain-code points, found in both frames, which bound the point to be interpolated.

In step 2920, the special point velocities, next frame first order predicted location, and next frame special point ROI size are computed.

Figure 30:
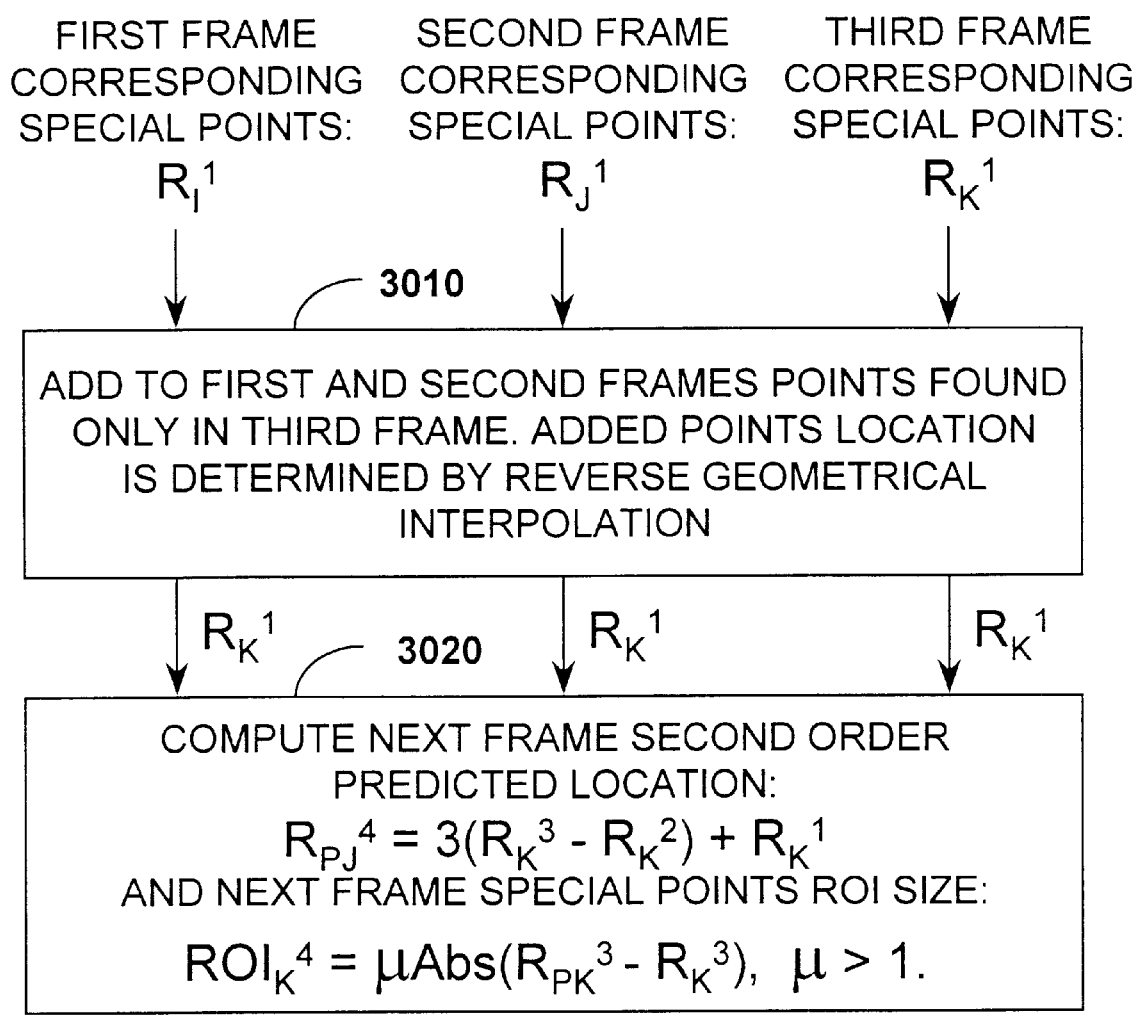
FIG. 30 is a simplified flowchart of a preferred method for carrying out the steps of FIG. 28 in the case of second-order prediction.

Reference is now made to FIG. 30 which is a simplified flowchart of a preferred method for carrying out the steps of FIG. 28 in the case of second-order prediction. The method of FIG. 30 is self-explanatory with reference to the above description of FIG. 29, step 3010 being analogous to step 2910, and step 3020 being analogous to step 2920.

In step 3020, it is appreciated that the computation of next frame special point ROI size is optional. Alternatively, the current frame ROI size may be used.

Figure 31:
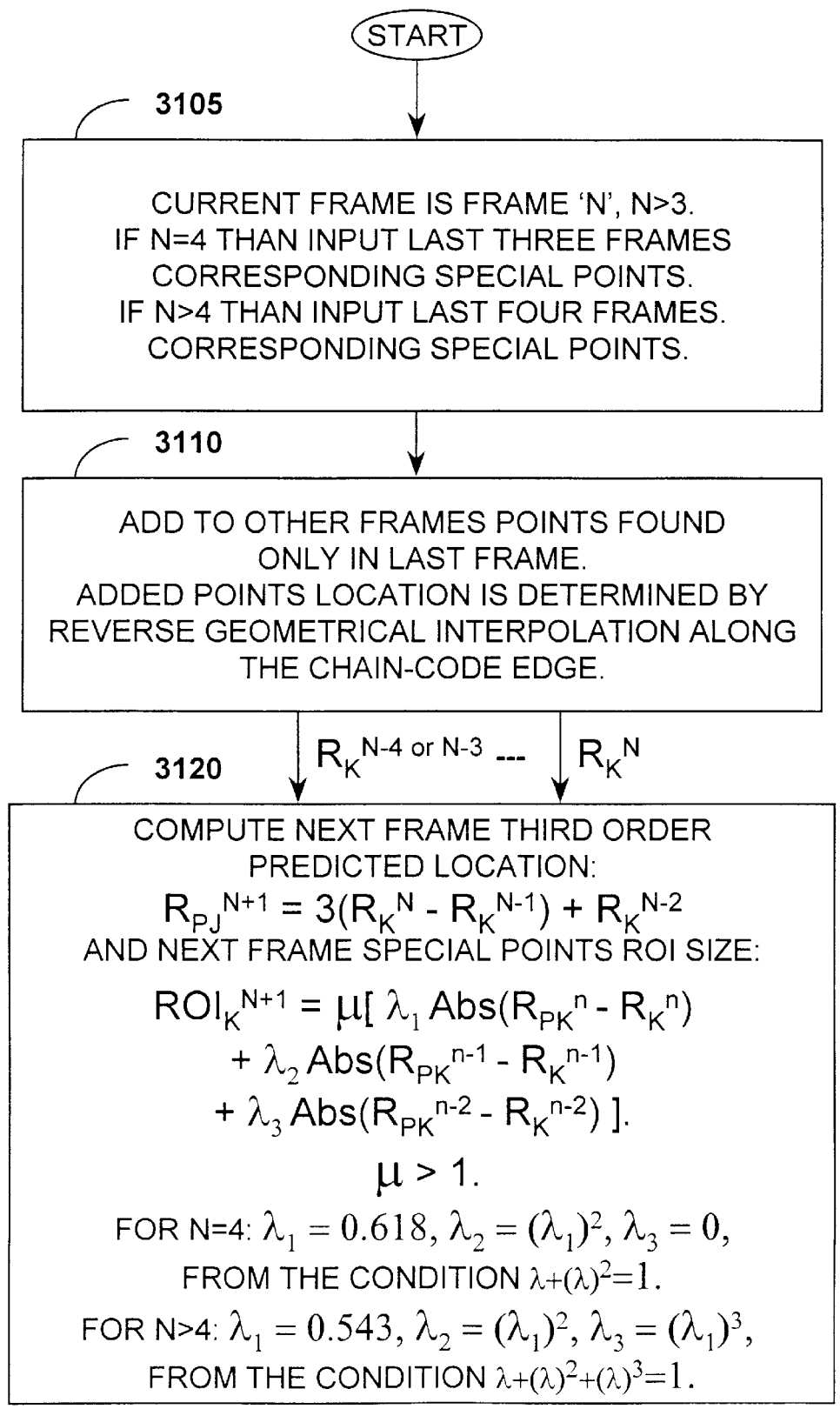
FIG. 31 is a simplified flowchart of a preferred method for carrying out the steps of FIG. 28 in the case of third-order and higher prediction.

Reference is now made to FIG. 31 which is a simplified flowchart of a preferred method for carrying out the steps of FIG. 28 in the case of third-order and higher prediction. The method of FIG. 31 is self-explanatory with reference to the above description of FIGS. 29 and 30, step 3110 being analogous to steps 2910 and 3010, and step 3120 being analogous to step 2920 and 3020.

In step 3105, a decision is made, based on how many frames have been previously processed, as to how many frames are used in subsequent steps. In step 3120, it is appreciated that the computation of next frame special point ROI size is optional. Alternatively, the current frame ROI size may be used.

Figure 32:
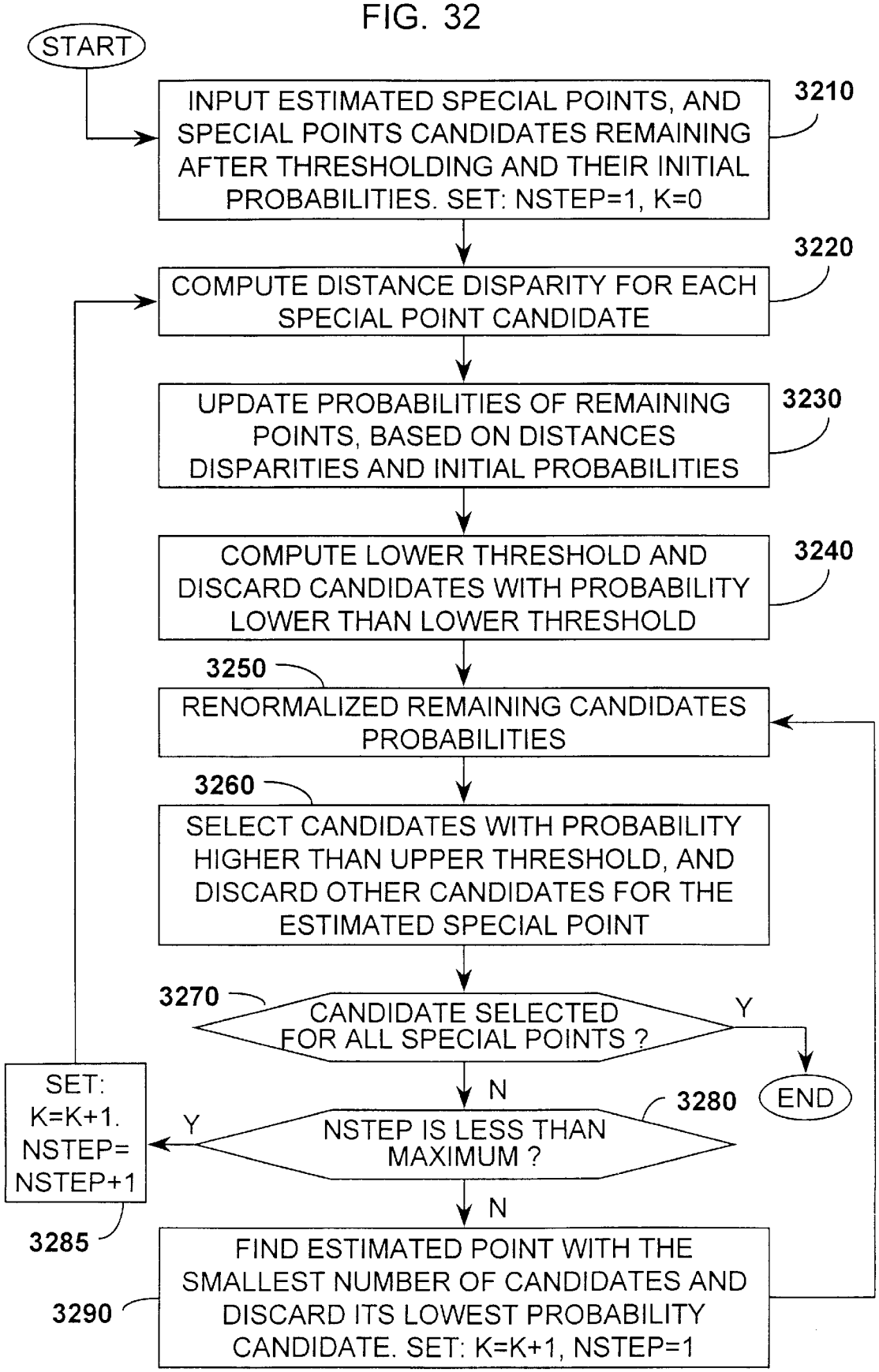
FIG. 32 is a simplified flowchart of a preferred method for operating unit 1730 of FIG. 17.

Reference is now made to FIG. 32 which is a simplified flowchart of a preferred method for operating unit 1730 of FIG. 17. The method of FIG. 32 is a preferred relaxation labeling method. Alternatively to the method of FIG. 32, other relaxation labeling methods well known in the art may be used such as, for example, the methods described in S. T. Barnard and W. B. Thompson; G. G. Pieroni and M. F. Costabile; R. N. Strickland and Zuhua Mao; and A. Rosenfeld, R. A. Hummel, and S. W. Zucker, "Scene Labeling by Relaxation Operations", referred to above.

The method of FIG. 32 preferably includes the following steps.

Estimated special points are input, along with special point candidates remaining after thresholding and their initial probabilities. Variable nstep is set to 1, and variable k to 0 (step 3210).

A distance disparity is computed for each special point candidate (step 3220). The distance disparity is preferably computed for each special point candidate relative to the candidates for the preceding and following special points as follows:

$$s^{air}(j) = \text{SUM} ((d_{ij} * P_i)/k(j))$$

SUM is the SUM over all i, i not equal to i*, the fictional candidate, the fictional candidate being described above with reference to FIG. 17;

j is the current candidate point;

i is the preceding or following point;

$d_{ij}$ is the difference between the Euclidian distance between points i and j and the Euclidian distance between the estimated locations of i and j;

$P_i$ is the probability that i is the special point in the preceding or next area;

k (j) is a normalization coefficient, preferably equal to the maximum of all Euclidian distances between the perimeter of the ROI of j and the perimeter of the ROI of i.

Note that $s^{air}$ is computed twice, once for the preceding special point and once for the next special point.

In step 3230, updated probabilities for the remaining points are computed, based on distance disparities and initial probabilities. The following formula is preferably used to update the probability for k+1:

$$P_r^{k+1}(j) = (P_r^k(j) * q_r(j))/(\text{SUM } (P_r^k(j) * q_r(j)),$$

where:

SUM is the sum over all j including j*, the fictional candidate $P_r^k$ (j) is the probability of point j to be the special point r in step k;

$q_r$ (j) is a coefficient of $p_{rk}$ (j) due to inconsistency with neighboring areas, and is preferably computed according to the following formula:

$$q_r(j) = (1/(1 + s_r(j))) + 0.1$$

where j is not the fictional point and $s_r$ (j) is preferably computed as follows:

$s_r$ (j) is the sum of $s^{air}$ over both the following and the preceding special points relative to special point r.

Where j is the fictional point, $q_r$ (j) is set to a predetermined value, typical 0.8.

In step 3240, a lower threshold is computed and all candidates with probabilities lower than the lower threshold are discarded. A preferred formula for computing the lower threshold is as follows:

$$1t_r^k = 1/(3 * m_k),$$

where $m_k$ is the number of retained candidates in step k.

In step 3250, the probabilities of the remaining candidates are renormalized by recomputing $p_r^k$, as in step 3230 described above, with respect to the remaining candidates.

In step 3260, candidates with probability higher than an upper threshold are selected, while other candidates are discarded. The selected candidates are each assigned a probability of 1.0. It is appreciated that it is possible that no candidates will be selected except for the fictional candidate. Typically, the upper threshold has a predetermined value as, for example, 0.75.

If candidates have been selected for all special points (step 3270), the method is completed. Otherwise, nstep, which represents a maximum number of iterations, is checked (step 3280). If nstep is less than a predetermined maximum value as, for example, 100, iteration continues with steps 3285 and 3220. If nstep is greater than the predetermined value, the estimated point with the smallest number of candidates is selected and its lowest probability candidate is discarded, nstep is set to 1 and k is incremented (step 3290). Processing continues with step 3250.

It is appreciated that the method of FIG. 32 generally has the effect of disregarding special point candidates which have moved differently, to a significant extent, from other adjacent special point candidates, by not finding a correspondence for those special points which have moved differently.

Referring back to FIG. 1, another example of a suitable application device is an effect device 92 such as, for example, a device for performing one or more of the following effects: compression; painting; blurring; sharpening; a filter operation; and an effect which changes over time at a different rate on different sides of the border.

Optionally, the application devices 80, 90 or 92 operate on an individual frame, and cause the result of this operation to be displayed to the user, before operation proceeds generated for a subsequent frame.

Typically, the video display apparatus 95 or a separate video display apparatus (not shown) is employed to display a result of performing the operation without previously displaying a separate representation of said border.

A result of performing an operation, without previously displaying a separate representation of the border, may be displayed for a plurality of frames rather than for a single frame.

An advantage of this option is that interactive correction may be effected not on the basis of viewing a representation of the border but rather on the basis of viewing an effect or application generated by the application devices assuming a particular border. Viewing an effect or application is often a more useful method for evaluating the quality of the border tracking, relative to viewing a representation of the border itself as tracked.

Preferably, the result of performing an operation such as an effect or application is displayed together with a representation of the border as tracked. If the result of performing the operation is deemed by the user unsatisfactory, the user uses the display to correct the border. Preferably, the display changes automatically to reflect the change in the result of performing the operation due to the new border.

Referring back to FIG. 2A, blocks 135 and 165 indicate that, optionally, an effect or application is carried out, e.g. by an external application device. Preferably ,the application or effect is carried out before the user is prompted to decide whether or not the border has been appropriately tracked (steps 140, 170). Thereby, the user can employ the results of the application or effect to evaluate the border as tracked.

Referring back to FIG. 2G, blocks 235 and 265 indicate that, optionally, an effect or application is carried out, e.g. by an external application device. Preferably, the application or effect is carried out before the user is prompted to decide whether or not the border has been appropriately tracked (steps 240, 270). Thereby, the user can employ the results of the application or effect to evaluate the border as tracked.

Figure 33:
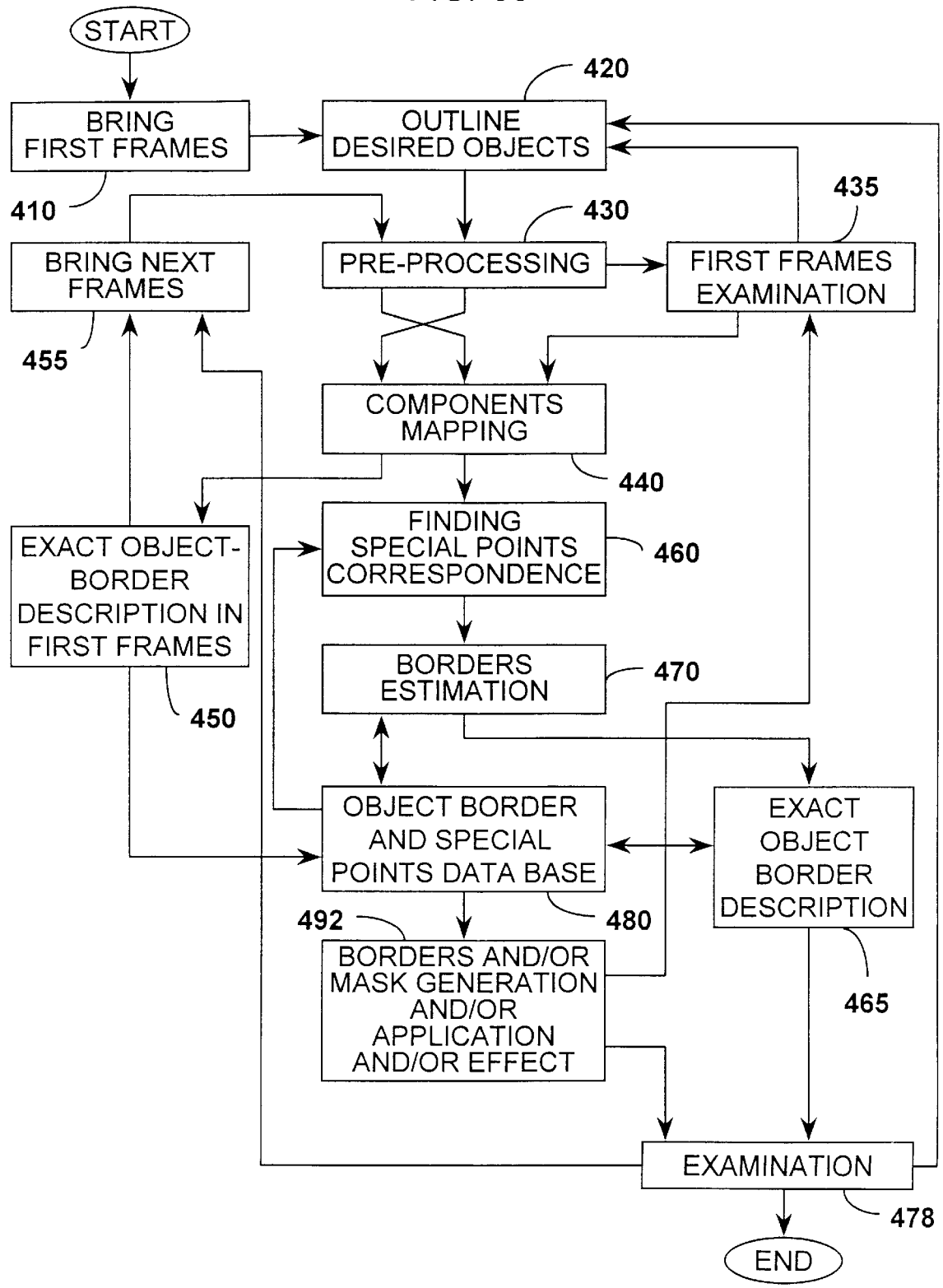
FIG. 33 is a simplified block diagram of a modification of the apparatus of FIG. 4.

Reference is now made to FIG. 33 which is similar to FIG. 4 except for the following differences, which can exist either separately or in combination:

a. Subsequent frames are only brought (step 455) once the user has deemed the border, as tracked, satisfactory, in the current frame.

b. The user determines whether or not the border is satisfactory by reviewing results of operations (effects and/or applications) generated with the assumption that the border's location in the current frame is as tracked.

Due to these differences, step 490 in FIG. 4 is replaced with step 492 in FIG. 33.

It is appreciated that one or both of the above modifications may also be effected on the apparatus of FIG. 6.

Figure 34:
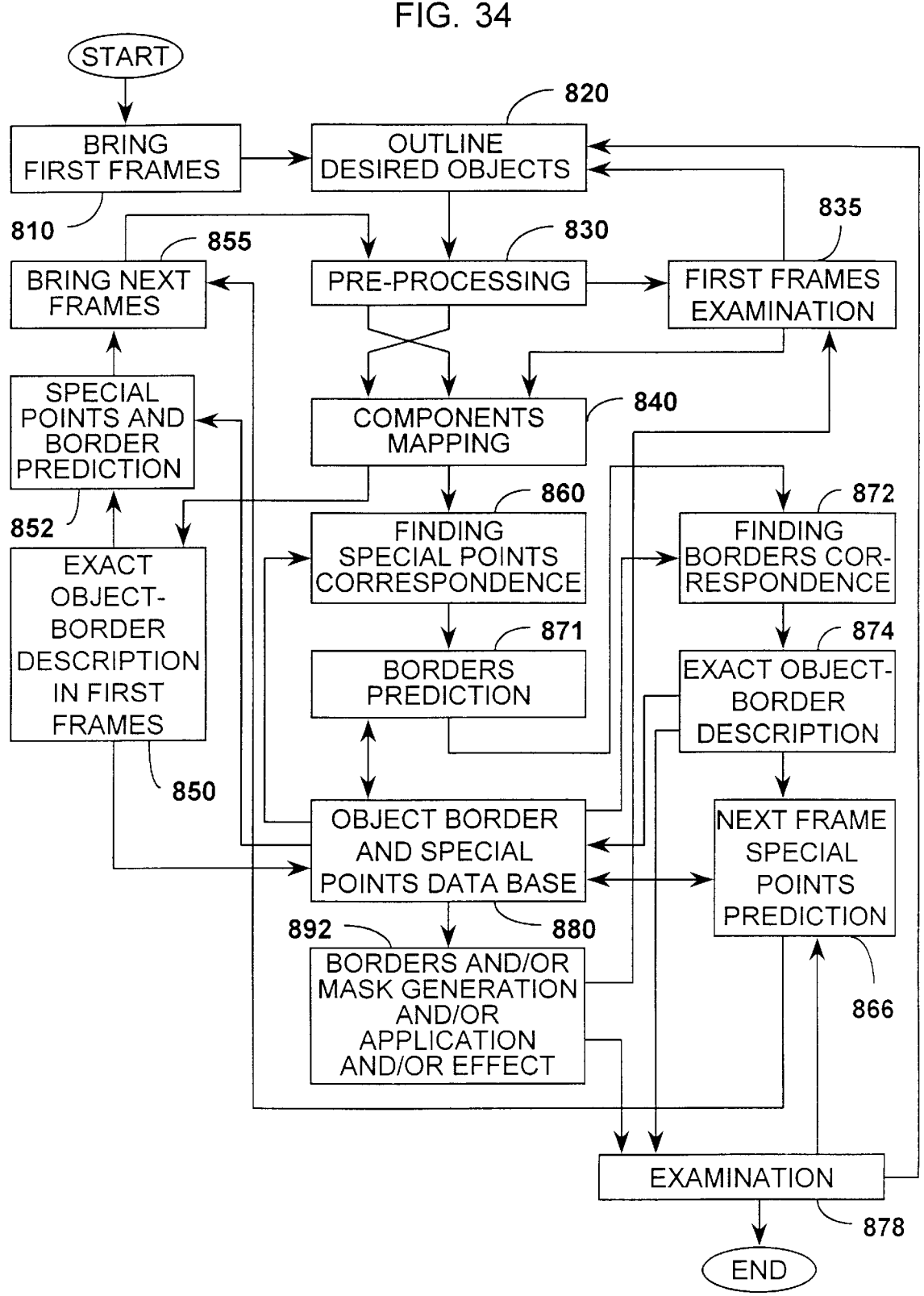
FIG. 34 is a simplified block diagram of a modification of the apparatus of FIG. 8.

Reference is now made to FIG. 34 which is similar to FIG. 8 except for the following differences, which can exist either separately or in combination:

a. Special points are only predicted in a subsequent frame (step 866) once the user has deemed the border, as tracked, satisfactory, in the current frame.

b. The user determines whether or not the border is satisfactory by reviewing results of operations (effects and/or applications) generated with the assumption that the border's location in the current frame is as tracked.

Due to these differences, step 890 in FIG. 8 is replaced with step 892 in FIG. 34.

It is appreciated that one or both of the above modifications may also be effected on the apparatus of FIG. 10.

Figure 35:
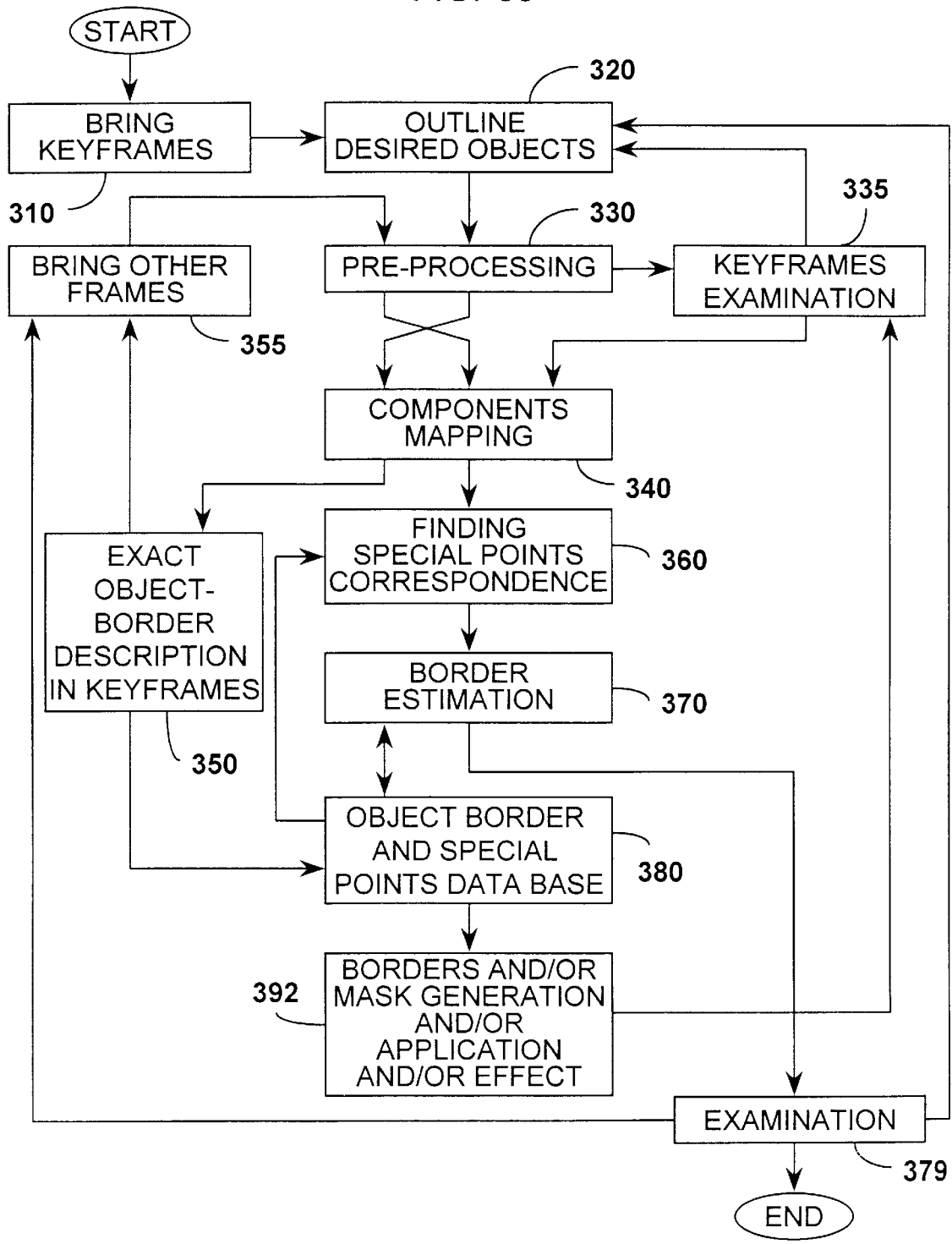
FIG. 35 is a simplified block diagram of a modification of the apparatus of FIG. 3A.

Reference is now made to FIG. 35 which is similar to FIG. 3A except for the following differences, which can exist either separately or in combination:

a. Other frames are only brought (step 355) once the user has deemed the border, as tracked, satisfactory, in the current frame.

b. The user determines whether or not the border is satisfactory by reviewing results of operations (effects and/or applications) generated with the assumption that the border's location in the current frame is as tracked.

Due to these differences, step 390 in FIG. 3A is replaced with step 392 in FIG. 35.

It is appreciated that one or both of the above modifications may also be effected on the apparatus of FIG. 5.

Figure 36:
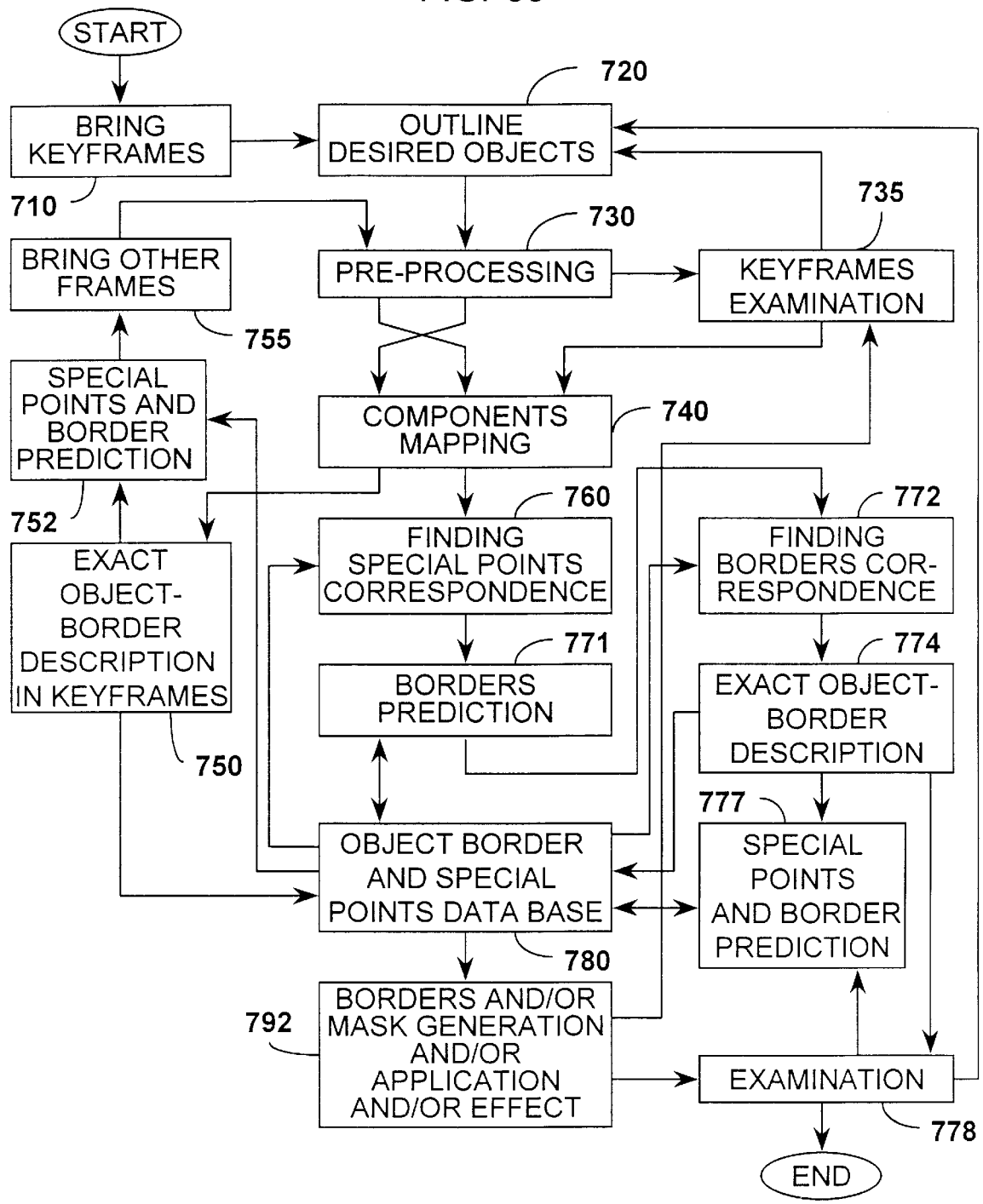
FIG. 36 is a simplified block diagram of a modification of the apparatus of FIG. 7.

Reference is now made to FIG. 36 which is similar to FIG. 7 except for the following differences, which can exist either separately or in combination:

a. Special points are only predicted in another frame or frames (step 777) once the user has deemed the border, as tracked, satisfactory, in the current frame.

b. The user determines whether or not the border is satisfactory by reviewing results of operations (effects and/or applications) generated with the assumption that the border's location in the current frame is as tracked.

Due to these differences, step 790 in FIG. 7 is replaced with step 792 in FIG. 36.

It is appreciated that one or both of the above modifications may also be effected on the apparatus of FIG. 9.

The keyframe examination blocks (335 in FIG. 3A, 435 in FIG. 4, 535 in FIG. 5, 635 in FIG. 6, 735 in FIG. 7, 835 in FIG. 8, 935 in FIG. 9, 1035 in FIG. 10) and other examination blocks (379 in FIG. 3A, 478 in FIG. 4, 578 in FIG. 5, 678 in FIG. 6, 778 in FIG. 7, 878 in FIG. 8, 978 in FIG. 9, 1078 in FIG. 10, 435 and 478 in FIG. 33, 835 and 878 in FIG. 34, 335 and 379 in FIG. 35 and 735 and 778 in FIG. 36) have two possible outcomes: if, as is preferred, the user performs an examination of the border and/or results of operating differentially on both sides of the border in the current frame and deems it unsatisfactory, the border in the current frame is typically corrected, preferably in response to a user-indicated correction. If the user deems the current frame satisfactory, the method proceeds to other frames.

In hotspot applications or other applications in which the location of the dynamic object is presented to the user, the mask generated in step 2130 of FIG. 21 may be used to determine whether the user is pointing at a dynamic object which may, for example, be a hotspot, or whether the user is pointing at a background location which is not a hotspot.

Reference is now made to Appendices A–D, which comprise a preferred software implementation of the method of FIG. 6, effected by the modifications as described for FIG. 4 by the description of FIG. 33.

Appendices A–D may be used as follows:

1. Provide the following hardware and software:
   a. A Pentium PC (IBM compatible), equipped with Windows 95, commercially available from Microsoft Corp., One Microsoft Way, Redmond, WA 98052-6399, USA. The PC should be equipped with at least 32M bytes of RAM and a CD ROM drive.

b. Premiere 4.0 for Windows, commercially available from Adobe Systems Inc., 1585 Charleston Road, Mountain View, Calif. 94039-7900, USA.

c. Run Time Library CW3220.dll file from Borland C++5.0, commercially available from Borland, 100 Borland Way, Scotts Valley, Calif. 95066-3249.

d. Object Window Library OWL50f.dll file from Borland C++5.0, commercially available from Borland, 100 Borland Way, Scotts Valley, Calif. 95066-3249.

e. Class Library BIDS5Of.dll from file Borland C++5.0, commercially available from Borland, 100 Borland Way, Scotts Valley, Calif. 95066-3249.

Appendices A–C comprise hexadecimal representations of executable files compressed with ZIP. The text (except page number and appendix name) of Appendices A–C should be entered into the computer each in a separate file as described bellow, and converted into binary form. Each file is then uncompressed using common utility, available from a number of sources, such as, for example the Pkunzip.exe, commercially available from PKWARE, Inc 7545 N.Port Washington Glendale, Wis. 53217.

Appendix D comprise Window 95 Registration file. The text (except appendix name) of Appendix D should be entered into the computer using Windows Notepad, in a file as described bellow.

Further processing is as follows:

1. The Appendices should be entered, and uncompressed when needed as described above, and put into the following files:
   Appendix A: Into Mask32.dll
   Appendix B: Into Amslib32.dll
   Appendix C: Into Amasker.exe
   Appendix D: Into Amasker.reg 2. The user has to create directory "C:\AutoMasker" and copy files Mask32.dll, AmsLib32.dll, Amasker.exe, and Amasker.reg to this directory. This directory is called the working directory. In this example hard disk drive C of the computer is used. Other hard disk drive of the computer may be alternatively used.

3. Copy files of Borland C++5.0, namely: CW3220.dll, BIDS50f.dll, and OWL50f.dll to windows system directory. (usual "c:\windows\system").

4. Run regedit.exe from Windows directory. Select from Registry menu: Import registry file. In File Open dialog box select "AMasker.reg" from working directory. Click OK.

A demo-work will be done on particular film, described in step 1 bellow. This film is provided by a way of example only. Other films may be used. The demo-work steps, besides the specific file and file-type as appear bellow, function as accurate operating instructions and may be performed for any film with format supported by the software (AVI, BMP sequence, TGA sequance). The demo-work steps are:

1. Copy AVI movie, for example "02_ducks.avi" from directory "clips\creative\files\" of Adobe Premiere 4.0 Deluxe CD ROM to the working directory.

2. Run AMasker.exe from the working directory.

3. Select in menu File, command New . . . . From now on, we will use the convention 'File'-'Command' to describe a command activation in a specific file menu (i.e., the last command will be written as File—New). From "Select source" dialog box click on "Files of type: " and select "AVI Video files (*.avi)", select file "02_ducks.avi" in current directory, namely from "c:\amasker", and click Open. A window is opened with the first frame of this movie. This window is called the Edit window, or Edit View, or the main window.

4. Select the Pen Tool from menu: Tools, and draw a rough border line on about the white duck (The border must be closed!!!). Press "Start" button or select Frame—Start. Click 'Ok' in opened "Select Group to Work" dialog box.

You have just created the first frame of the isolated duck movie. You may save the result by File—Save as . . . , enter file name and click Save. The result will be saved in the format of the software, which is called type "AMS". Later on, it is enough to use File—Save for saving results using the already given name. It is recommended to make File—Save every few frames, and on work end.

5. The object border may be modified: Draw a new border segment by using the Pen Tool, and open a hole in error border segments by using the Eraser Tool. After changing the border you may check its closeness by Frame—Overlay test.

6. The border may be automatically trimmed to real borders as seen by the program. Selecting Frame—Local Trim will trim the last modification. Selecting Frame—Border Trim will trim the whole border. Selecting Frame—Define Border will define the border as drawn, without trimming it.

7. When you decides that the object border is satisfying, you may proceed to further frames. Select Frame—Find Forward. Shortly the next frame with its found border will appear. You may correct it by using steps 5–6 as described above.

8. Repeat step 7 for the rest of the frames. It is possible to define few keyframes along the movie, and to advanced Forward or Backward (Select Frame—Find Backward). This allows for using frames where the object is clearly defined.

9. To preview the output select Window—Add view, and in select view menu click on Preview. A Preview window with 4 preview options is opened:
   a. Source—view unchanged source.
   b. Painted—view painted object and background,
   c. Alpha Mask—view white object on Black background.
   d. Border—view border line on the source.

The preview window in options b-d, shows the result of the object isolation modified for creating the output movie. (but before the output movie itself is created). Option b may be used for creating color effects, separately on the object and its background. Option c creates an Alpha channel mask to be used with typical editing, compositing, painting and effects products.

10. To change options for Painted and Alpha Mask views, select View—Output Palette while Preview window is active. A Palette with 3 Sub Topics is opened:
    a. Smoothness: Width, Offset, and Smooth levels of Border Smoothing.
    b. Object: for coloring Object, allow to increase or decrease color component of object, or if selected W/B Mode convert object to Gray-scale representation.
    c. Background: for coloring Background. There are the same options as for Object.

11. By selecting Frame—Follow Mode while the Preview window is active, the result shown in the Preview window will automatically follow the work done in the main window (the border finding and correcting window). You may use this option for viewing effects computed immediately after computing the frame border, without having to examine first the border itself or the Alpha mask. You may examine the border marking quality by examining the effect. Any frame, in any view, seen as unsatisfactory in the Preview window may be immediately dragged back by holding the right button of the mouse, to the main view for corrections.

12. When finishing finding borders on all frames, select Project—Make Movie while Edit View window is active.
   In Make Movie Dialog Box:
   a. Press Name button and Select file name, and file type for output file in Save As dialog Box.
   b. Select number frames to write (default is all working frame).
   c. Select Options, if any, as depended on selected format according to its specifications (for example compression type).
   d. Press the Create button.
The output file will be created.

13. You may view the result using any software capable of showing files in the output format, such as the Window's Media player for AVI. Alternatively you may open it as a new file, similarly as described in step 3 above, and play it in the preview window.

14. It is possible to reopen AMS-type projects for viewing, changing the borders, or changing the output representation, such as making different mask. You have to operate File—Open and use the browser for finding AMS-type files.

It is appreciated that, while certain components of the present invention are described above with reference to processing of color image sequences, the present invention is not limited to the processing of color images but may also process, for example, monochrome and grayscale images.

It is appreciated that the software components of the present invention may, if desired, be implemented in ROM (read-only memory) form. The software components may, generally, be implemented in hardware, if desired, using conventional techniques.

It is appreciated that the particular embodiment described in the Appendices is intended only to provide an extremely detailed disclosure of the present invention and is not intended to be limiting.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

APPENDIX A

| 50 | 4B | 03 | 04 | 14 | 00 | 02 | 00 | 08 | 00 | 5B | 7B | F1 | 20 | E3 | 6C |
|----|----|----|----|----|----|----|----|----|----|----|----|----|----|----|----|
| F8 | AE | 35 | 65 | 01 | 00 | 00 | 20 | 03 | 00 | 0A | 00 | 00 | 00 | 4D | 41 |
| 53 | 4B | 33 | 32 | 2E | 44 | 4C | 4C | EC | 7C | 7F | 7C | 54 | C5 | B5 | F8 |
| DD | DD | BB | 64 | 81 | 85 | 5D | 74 | 83 | 41 | 03 | C6 | 36 | 5A | 30 | C1 |
| 06 | 13 | 30 | BA | 01 | 97 | 24 | 37 | 04 | C8 | E2 | 26 | CB | 26 | 20 | 04 |
| 08 | 12 | 1A | 22 | 20 | 26 | 7B | FD | 51 | B2 | 80 | 5D | D2 | C7 | 65 | BC |
| CA | 6B | D5 | 52 | EB | EB | D3 | D2 | D7 | DA | 3E | 5E | B5 | 7D | D8 | 6F |
| B4 | 29 | 0D | 90 | 42 | B0 | A9 | A6 | 88 | BA | FB | 82 | 18 | DB | BC | BE |
| 8B | 49 | DB | 58 | F3 | 60 | 81 | 95 | FD | 9E | 33 | 33 | 77 | 7F | 90 | 90 |
| DA | EF | E7 | FB | C7 | FB | E3 | 45 | 97 | 3B | 77 | E6 | CC | CC | 99 | 33 |
| 67 | CE | 39 | 73 | E6 | CC | 75 | DF | EF | 11 | 8C | 82 | 20 | 88 | 82 | 4D |
| 88 | C5 | 04 | A1 | 4D | 60 | 7F | 2E | E1 | 46 | E1 | 6F | FE | 19 | 04 | E1 |
| 0D | BB | 30 | F9 | E6 | 43 | E3 | 7F | 7B | 4B | 9B | A1 | E2 | B7 | B7 | EC |
| DB | B7 | BC | 61 | 53 | 73 | D6 | B6 | A6 | 87 | BE | D2 | 54 | B7 | 25 | 6B |
| 8B | DC | EC | CF | 5A | 5F | 9F | D5 | 24 | 6F | CD | 92 | B7 | 6E | A8 | 6F |
| CA | AA | D9 | B4 | 35 | FF | CE | 49 | 13 | B2 | EF | 12 | FE | 87 | FC | 79 |
| 24 | 41 | A8 | 30 | 8C | 13 | 3E | C9 | 5A | B5 | 5D | CF | 3B | 13 | 9E | 7A |
| 69 | A2 | C1 | 38 | 4D | 78 | 04 | S8 | F3 | 3C | CF | B4 | F3 | DF | 3E | 23 |
| A5 | 03 | 4D | 1B | 29 | 09 | E8 | 9F | 18 | 6F | D0 | 14 | 7F | 31 | A6 | F4 |
| 64 | 67 | 75 | 78 | 33 | 82 | DD | 24 | 7C | 91 | 56 | 36 | 09 | 1B | 26 | 60 |
| 93 | A6 | A4 | 46 | 92 | FE | B2 | 4C | C2 | BE | E9 | FF | FF | C7 | 5D | 72 |
| 5F | A9 | 44 | 13 | BB | 8C | 0C | 21 | 1C | EB | B8 | AB | BA | 16 | 84 | 75 |
| A5 | 0B | 97 | 2F | A4 | 2F | DB | F8 | D8 | 1B | 3A | D9 | 92 | 3A | 32 | A0 |
| 46 | C7 | 1D | 9B | 36 | D4 | F9 | EB | F4 | C1 | C1 | 58 | AC | F0 | F8 | E3 |
| 28 | 70 | F5 | 49 | 70 | 40 | 03 | 4A | A4 | BF | 8E | 80 | 73 | DD | D1 | 54 |
| BF | F9 | A1 | 07 | 18 | 12 | 4B | 03 | 61 | 06 | 3C | 87 | 47 | C0 | 79 | EE |
| 68 | 6A | 6E | 7A | 40 | 27 | AA | 4E | C3 | EB | 4C | 23 | E0 | FE | A7 | F0 |
| DB | FF | FE | FD | EF | DF | FF | A4 | BF | 97 | EE | DF | 57 | 2C | 1C | E9 |
| 33 | 1E | 5B | 03 | CF | 60 | 4B | B6 | C5 | 60 | 6B | DD | 05 | F9 | BB | E6 |
| 37 | 41 | 86 | E0 | CF | D6 | 56 | FB | 8D | C2 | 1B | CD | F0 | 72 | 2B | 66 |
| FB | CD | 6F | 7C | 13 | D2 | 55 | DA | 2D | 90 | BD | 22 | BF | E3 | DC | 09 |
| C8 | BD | 62 | 6E | D2 | 6B | CB | D3 | 6A | 2A | F3 | 3B | 7E | 55 | 71 | B1 |
| 58 | 78 | 7D | E8 | 52 | B1 | E0 | 7C | FB | 11 | 73 | CE | DB | D1 | 4F | 7F |
| BC | 72 | ED | 86 | AF | 90 | A9 | A2 | A0 | A4 | 6F | 05 | 58 | 52 | 1C | 39 |
| B0 | 91 | 3E | A3 | 07 | 1A | B1 | EE | C7 | A2 | 92 | E3 | 08 | F0 | 8D | 82 |
| F6 | CE | 36 | A3 | B0 | 12 | 1B | 13 | E4 | B9 | AC | 8E | 93 | D6 | F1 | 7F |
| 89 | BD | 8D | 55 | F7 | 5B | 58 | B7 | 21 | 17 | 4B | 4B | B3 | 2D | 07 | D6 |
| 43 | 42 | BB | BB | C9 | 28 | 04 | 3B | C5 | 0B | 90 | 71 | 25 | 16 | 8B | C9 |
| 19 | BC | 99 | 49 | D8 | 88 | B2 | 24 | 42 | 26 | 35 | D2 | 44 | 34 | 58 | 81 |
| 7D | 9A | B5 | 8F | 1F | 36 | 0A | 47 | AD | C2 | B9 | 5C | 78 | FA | C8 | 60 |

APPENDIX A-continued

| | | | | | | | | | | | | | |
|---|---|---|---|---|---|---|---|---|---|---|---|---|---|
| B0 | F3 | B4 | B7 | 6D | 18 | 5B | AA | D9 | 6A | 14 | 1A | F3 | 1A | 0D | 5A |
| 26 | 6D | D2 | 42 | 42 | AD | BD | F2 | A6 | 46 | 81 | FE | 67 | 68 | E8 | 4E |

APPENDIX B

| | | | | | | | | | | | | | | | |
|---|---|---|---|---|---|---|---|---|---|---|---|---|---|---|---|
| 50 | 4B | 03 | 04 | 14 | 00 | 02 | 00 | 08 | 00 | D1 | 79 | F1 | 20 | 30 | 88 |
| FE | FC | E9 | A4 | 02 | 00 | 00 | B0 | 06 | 00 | 0C | 00 | 00 | 00 | 41 | 4D |
| 53 | 4C | 49 | 42 | 33 | 32 | 2E | 44 | 4C | 4C | EC | 7D | 7B | 7C | 14 | 45 |
| B6 | 70 | CF | 23 | 64 | 02 | 13 | 66 | 80 | 01 | A2 | A2 | 0E | 1A | 96 | 47 |
| B2 | 08 | 06 | 57 | 24 | A8 | 93 | 4C | 26 | 04 | 92 | 31 | 3D | 33 | 99 | 84 |
| F0 | 8E | 79 | 30 | 89 | 81 | E0 | 64 | 00 | 70 | 25 | 0A | 0E | 61 | E9 | 34 |
| ED | B2 | 2A | 2C | EB | A2 | 82 | AF | 75 | BD | 5E | 97 | BB | CB | 4A | 74 |
| 59 | 49 | 20 | 9B | 44 | AF | BA | C8 | 97 | DF | 8A | CA | 5E | F1 | B1 | BB |
| 1D | 83 | 5E | 10 | 84 | 88 | 91 | F9 | CE | A9 | EA | EE | E9 | 89 | 04 | F0 |
| F1 | FB | BE | FB | C7 | CD | 0F | 66 | A4 | 4F | 57 | 9D | 3A | 75 | EA | D4 |
| A9 | 53 | 55 | E7 | D4 | 38 | 17 | B0 | 8C | 96 | 61 | 18 | 3D | 63 | 62 | C2 |
| 61 | 86 | 69 | 65 | E8 | 9F | 8D | B9 | 92 | B9 | E4 | 9F | B6 | 61 | 5E | 31 |
| 33 | C3 | AF | DD | 9B | F2 | E6 | F8 | 56 | 4D | D1 | 9B | E3 | B7 | 6E | 2D |
| F1 | D5 | 36 | 5A | 57 | F9 | 1B | 96 | FB | 2B | 56 | 58 | 57 | 04 | 1B | 03 |
| D6 | 3B | AB | AD | FE | E0 | 4A | 6B | 70 | 65 | 55 | B5 | DF | 5A | 56 | BB |
| 32 | EB | C6 | D4 | A1 | E9 | 37 | 33 | FF | 43 | FE | 58 | 07 | C3 | 14 | 69 |
| 92 | 99 | 53 | D6 | B7 | EF | 91 | 61 | C7 | 99 | 07 | 77 | 0F | D3 | 68 | AF |
| 60 | FC | C0 | 99 | 9F | E8 | 29 | D0 | 2C | FD | DF | AA | 25 | DC | 21 | 69 |
| 2D | 61 | 01 | F9 | D3 | CB | 85 | 4F | 0E | 51 | 1E | B4 | 51 | 35 | 99 | 69 |
| 19 | 09 | 0D | B3 | 55 | C7 | D8 | B3 | E1 | 7B | 95 | 8E | 39 | 31 | 5A | C2 |
| F0 | A9 | 36 | 9E | C0 | C3 | 3A | 26 | 73 | CA | 0F | DF | 6E | 7B | 71 | 9E |
| 83 | 24 | D6 | 6B | 29 | 41 | D8 | D6 | 21 | D1 | 79 | AC | 0C | B3 | 2C | 2F |
| A7 | 24 | 87 | E6 | 93 | DA | BE | 16 | BE | D7 | 46 | D3 | 09 | DC | 68 | 9B |
| 3A | F7 | 8E | B9 | 25 | F8 | B0 | 0C | 1B | A8 | 63 | 98 | 52 | E4 | 45 | 5C |
| BE | DC | A9 | B5 | 55 | 15 | 81 | 0A | 8A | 1C | DB | CE | 8C | 81 | EF | 7C |
| 5D | 3C | BE | 6A | 29 | 9F | 8D | F2 | 8A | 99 | 0D | DF | 8B | E2 | F2 | D9 |
| A6 | FA | AB | EB | 1B | 2A | E1 | 61 | 1A | E5 | 15 | 93 | 09 | DF | 3B | E2 |
| F2 | B1 | 53 | FD | 8D | FE | 4A | 46 | A6 | 49 | E2 | 75 | 47 | 7C | BE | FF |
| 29 | 72 | F9 | BF | 7F | FF | FB | F7 | FF | E2 | 6F | F7 | 82 | AD | B9 | 4C |
| FB | 71 | ED | 53 | 4B | E0 | 3B | B4 | 2E | DD | A0 | 31 | 35 | AF | 07 | F8 |
| FA | 5B | FD | 00 | 60 | 02 | E9 | E2 | 6D | 95 | 5A | E6 | 95 | 46 | 78 | 98 |
| 80 | E0 | 40 | D2 | 2B | 0F | 43 | DA | 2D | 7E | 5D | A1 | 65 | E6 | 67 | B5 |
| F5 | 76 | 01 | F4 | 42 | 92 | 5F | 2E | 1D | BC | A2 | CC | 95 | D5 | 76 | 60 |
| 5D | B2 | 9D | 79 | B9 | 1F | 3E | B2 | FF | BA | 3A | 29 | E3 | AF | 03 | A7 |
| 9F | 2F | 5F | 5A | B5 | 9C | 1F | A3 | 67 | B8 | D1 | 2B | 21 | 2F | 9F | DB |
| FF | 54 | 0D | F9 | 1E | 78 | AA | 0E | CB | 7E | AA | E7 | 46 | 9F | 81 | FC |
| 75 | 8C | F8 | F1 | 22 | 2D | 53 | 8E | C8 | 98 | E0 | 4D | B4 | 4C | 36 | 29 |
| 13 | 98 | 48 | 9F | 2E | 56 | F6 | 37 | 58 | D6 | 97 | 89 | 5F | F3 | D2 | 0D |
| 4F | DD | 09 | 09 | 71 | 1F | 50 | 1A | EA | D0 | 9F | 03 | C0 | 85 | 70 | 38 |
| 1C | 4C | 93 | D0 | A4 | 22 | 12 | 6E | 5E | 3F | 9F | 5A | 47 | 12 | 03 | A1 |
| 22 | AC | 33 | 49 | 9C | BD | 4C | CB | 1C | 34 | 32 | BD | B3 | 17 | 6B | 19 |

APPENDIX C

| | | | | | | | | | | | | | | | |
|---|---|---|---|---|---|---|---|---|---|---|---|---|---|---|---|
| 50 | 4B | 03 | 04 | 14 | 00 | 02 | 00 | 08 | 00 | 34 | 7B | F1 | 20 | 88 | C6 |
| B8 | F4 | 55 | 6B | 02 | 00 | 00 | E0 | 06 | 00 | 0B | 00 | 00 | 00 | 41 | 4D |
| 41 | 53 | 4B | 45 | 52 | 2E | 45 | 58 | 45 | EC | 7D | 7B | 7C | 54 | D5 | B5 |
| F0 | 9E | 47 | C2 | 00 | 81 | 04 | 0D | 2A | 1A | 64 | 14 | BC | 02 | 46 | 04 |
| 82 | 8A | 10 | 74 | 92 | C9 | 40 | 20 | 19 | 38 | 33 | 93 | 07 | AF | 00 | 21 |
| 19 | 99 | 0C | 21 | 89 | C9 | 44 | 41 | C0 | 42 | 87 | B4 | 0C | 87 | E3 | A3 |
| 4A | 1F | D6 | 7E | 9F | 56 | BD | 5A | AB | 96 | 2A | BD | 8D | 8A | 1A | 09 |
| 97 | 60 | 2F | AD | 94 | 4B | 6B | BE | CA | B5 | B1 | 62 | EF | A1 | A1 | 7E |
| A0 | A9 | A4 | 36 | 9A | 6F | AD | FD | 98 | 39 | 8F | C9 | 43 | BC | BF | EF |
| 77 | FF | B8 | 93 | DF | 64 | CE | AC | B3 | CF | DA | 6B | AD | BD | D6 | DA |
| 6B | EF | BD | F6 | 1E | EF | 4A | 89 | 58 | 09 | 21 | 76 | 92 | 4E | FA | FB |
| 09 | 69 | 25 | EC | E5 | 22 | 57 | 92 | 21 | 5F | 16 | 42 | 5E | CD | 20 | 63 |
| 27 | 1D | 18 | F9 | EB | 6B | 5A | 2D | C5 | BF | BE | E6 | C1 | 07 | 4B | 42 |
| 35 | 4D | CE | 86 | C6 | FA | 0D | 8D | 95 | 9B | 9C | 9B | 9A | 9B | 22 | CE |
| F5 | 41 | 67 | 63 | 73 | 9D | B3 | B9 | AE | 3A | D8 | E8 | 2C | AF | A9 | CB |
| 99 | 3D | 66 | D4 | 94 | 5B | C9 | 7F | 93 | 97 | E4 | 21 | A4 | D8 | 32 | 82 |
| 9C | 77 | CE | D9 | 2A | 60 | 5D | 34 | FE | 9D | A3 | 2D | D6 | 09 | E4 | 7E |
| 1B | 08 | C2 | C6 | 80 | 19 | FC | FD | B8 | 8D | 4A | 87 | 5E | 5B | 19 | 08 |
| E8 | CB | 1E | C7 | 38 | 22 | FE | C5 | 2A | 1E | 74 | F2 | CF | 8C | 04 | 2A |
| D2 | 65 | 27 | 75 | F8 | D9 | 66 | 27 | 0D | 28 | 6A | 57 | 0A | 21 | 6F | 58 |
| CC | 04 | 9E | B3 | 93 | D5 | 0B | FF | EB | F9 | 76 | 2F | 2B | F0 | D0 | 8B |
| 07 | 6D | 8C | 20 | E4 | 35 | 55 | 5F | 06 | C8 | 5E | 57 | 90 | 57 | 92 | 47 |
| BF | B4 | 71 | DE | 0F | C2 | E7 | 23 | 36 | 5D | 39 | 90 | 46 | DB | 8C | C5 |
| 4B | 17 | 97 | E0 | 97 | 75 | F8 | B6 | B3 | 4F | C9 | 6E | 2C | 97 | 3F | A3 |
| A6 | BA | 32 | 52 | C9 | 90 | 23 | EF | 24 | 0B | 3E | F7 | DB | CD | F8 | 82 |

APPENDIX C-continued

| BC | 5C | 06 | 93 | 15 | 15 | E6 | 31 | 53 | 39 | D7 | 8C | C6 | 60 | 6D | 7D |
|----|----|----|----|----|----|----|----|----|----|----|----|----|----|----|----|
| 15 | D6 | C5 | 64 | 45 | 0A | E1 | F3 | 37 | A6 | 72 | D2 | BC | C6 | A6 | C6 |
| 2A | CA | 87 | 25 | 21 | EB | CB | 52 | 4C | E5 | FE | BB | E8 | E5 | FF | BC |
| FE | E7 | F5 | FF | E3 | F5 | C4 | CA | C7 | DD | E4 | AD | 2E | EB | 93 | 6B |
| E0 | B3 | DC | 97 | D3 | F6 | E6 | 81 | 95 | 05 | E4 | 95 | D6 | 55 | 05 | 64 |
| FE | 3B | 77 | A7 | DC | F0 | 4E | DF | A7 | CF | AD | 58 | 5B | BD | 41 | BE |
| CC | 4E | 62 | E3 | EB | A0 | 90 | 9C | DF | FB | E4 | 9D | F4 | B3 | EF | C9 |
| 30 | 7C | 46 | FF | 62 | 8F | 8D | 7F | 1E | CA | C3 | C5 | FC | 93 | 4D | 56 |
| F9 | 4F | 61 | A2 | F3 | 7B | B3 | 8D | AC | 08 | 65 | C3 | 6D | F8 | 72 | C9 |
| 36 | 1B | 79 | 72 | 3D | BD | 3E | B3 | 7B | AB | 8D | 9C | F9 | DE | DD | D4 |
| 81 | 94 | CA | 67 | 03 | B2 | C7 | 21 | 57 | A4 | C9 | DE | 8C | 0B | DD | 17 |
| FE | 9E | FE | D4 | A1 | 8C | 55 | 15 | ED | 7A | F8 | 87 | F2 | FF | F9 | 6D |
| B7 | AD | 3D | 7A | 82 | 5C | 38 | 3F | 50 | 81 | A2 | 41 | EF | C7 | E1 | BC |
| CE | B2 | F2 | 37 | 3F | 1A | 37 | 22 | 72 | 85 | 23 | 6C | 09 | 5B | 42 | 9B |
| 8A | B2 | 80 | FA | 8D | 9D | 36 | 12 | 3D | 9C | D1 | 61 | 2B | 78 | 02 | 78 |
| 6B | 57 | 9A | C6 | 97 | 4B | 65 | 6A | EC | 1B | 08 | 4D | C3 | EF | 13 | 94 |
| F2 | 0C | 3F | 80 | EE | 4E | 80 | 26 | 2A | E5 | D3 | 11 | 54 | 95 | 00 | 5D |

Appendix D

REGEDIT4
[HKEY_CURRENT_USER\Software\AutoMedia\AutoMasker\0.5\Smoothing]
"WidthSmooth"=dword:00000005
"OffsetSmooth"=dword:00000000
"Scale"=dword:00000001
[HKEY_CURRENT_USER\Software\Auto\Media\AutoMasker\0.5\Environment]
"Use Native Cursor"=dword: 00000001
"Beep on completion"=dword:00000001
"Internal flag"=dword:00000001
[HKEY_CURRENT_USER\Software\Auto\Media\AutoMasker\0.5\ControlBars]
"Type of Bar"=dword:00000000
[HKEY_CURRENT_USER\Software\Auto\Media\AutoMasker\0.5\ControlBars\DeskTop]
"Main Bar"="{[28,1,1,0,0,0,0],0,1,3,-1,11,-1,
39,46,20,23,24,-1,26,29,27,27,-1,38-1,-1,31,30,-1,
33,32,34,36,37}"
"Edit View"="{[28,1,1,0,0,0,0],0,1,3,-1,11,-1,
39,46,20,23,24,-1,26,29,28,27,-1,38,-1,-1,31,30,-1,
33,32,34,36,37}"
"PreView"="{[28,1,1,0,0,0,0],0,1,3,-1,11,-1,
39,46,20,23,24,-1,26,29,28,27,-1,38,-1,31 1,31,30,-1,
33,32,35,36,37}"
"Info View"="{[28,1,1,0,0,0,0],0,1,3,-1,11,-1,
39,46,20,23,24,-1,26,29,28,27,-1,38,-1,31 1,31,30,-1,
33,32,35,36,37}"
[HKEY_CURRENT_USER\Software\Auto\Media\AutoMasker\0.5\ControlBars\Custom]
"Tools"="{[5,3,1,0,0,0,0],40,41,44,42,43}"

We claim:

1. A method for tracking a border of a moving object through a sequence of images of the moving object including first and second images, the method comprising:

receiving the first image and an indication of a border of a moving object in the first image, the border comprising a multiplicity of border locations including border locations having locally distinctive features internal to the moving object and border locations having locally distinctive features external to the moving object;

selecting a plurality of special border locations to be tracked in the first image from among the multiplicity of border locations, wherein the plurality of special border locations are less than the total number of border locations, the selecting step including, for at least a portion of the border, preferring said border locations having at least one locally distinctive feature which is internal to the moving object and which is therefore generally conserved between images over said border locations having at least one locally distinctive feature which is external to the moving object;

tracking at least some of said plurality of special border locations from the first image to the second image; and computing an estimated border in said second image based on an output of said tracking step and based on information characterizing said border in said first image; and displaying said estimated border to a user.

2. A method according to claim 1 wherein at least one of said plurality of border locations comprises a location at which at least one border characteristic changes.

3. A method according to claim 2 wherein said border characteristic comprises at least one color adjacent to said border.

4. A method according to claim 1 wherein said tracking comprises disregarding a border location which, when tracked from said first image to said second image, is found to have moved differently from other adjacent border locations.

5. A method according to claim 4 wherein said disregarding step employs a relaxation technique to identify border locations which have moved differently from other adjacent border locations.

6. A method according to claim 1 wherein said computing step comprises projecting the border from the first image onto the second image such that each of said plurality of special border locations in said first image is transformed onto a corresponding one of the plurality of border locations in the second image and such that the configuration of the border in the first image, between special border locations, is preserved in the estimated border in said second image.

7. A method according to claim 6 wherein said projecting step comprises transforming a spline representation of the border in the first image such that each of said plurality of border locations in said first image is transformed onto a corresponding one of the plurality of border locations in the second image.

8. A method according to claim 6 wherein said projecting step comprises transforming a spline representation of the border in the first image such that each of said plurality of special border locations in said first image is transformed onto a corresponding one of the plurality of special border locations in the second image.

9. A method according to claim 1 and also comprising providing a first image seen from a first field of view and providing a second image seen from a different field of view.

10. A method according to claim 1 and also comprising providing first and second images each including at least one of a moving dynamic object and a dynamic background.

11. A method according to claim 1 and also including generating an effect which is applied differentially on different sides of said estimated border.

12. A method according to claim 11 wherein said effect is generated an displayed for an individual image before the effect is generated for a subsequent image.

13. A method according to claim 11 wherein said effect includes one of the following group of effects:

compositing;

retouching;

smoothing;

compression;

compositing;

painting;

blurring;

sharpening;

a filter operation; and an effect which changes over time at different rates on different sides of said border.

14. A method according to claim 11 wherein said moving object is part of an event, said event includes a plurality of dynamic hotspot objects and said selecting, tracking, computing and displaying steps are performed for each of the plurality of dynamic hotspot objects during the event.

15. A method according to claim 14, the method also including the steps of:

using estimated borders of each of said hotspot objects to interpret a user's selection of an individual one of said plurality of dynamic hotspot objects; and displaying information regarding the individual dynamic hotspot object selected by the user.

16. A method according to claim 11 wherein said step of displaying said border comprises displaying a result of applying said effect without previously displaying a separate representation of said border.

17. A method according to claim 1 wherein said border is tracked over a sequence of images including the first and second images, and wherein the border includes at least one portion which is absent in at least one image within said sequence of images.

18. A method according to claim 1 and also comprising improving a first segment of said estimated border, corresponding to a second segment of the border of the first image, by:

identifying at least one edge adjacent to the first segment of said estimated border, said edge having adjacent colors which correspond to colors adjacent the second border segment; and replacing said first segment of said estimated border with said edge.

19. A method according to claim 18 wherein said at least one edge adjacent to said first segment comprises a plurality of edges and said identifying step comprises selecting one of the plurality of edges so as to maximize a function of the following selection criteria:

closeness of the edge to the estimated borders and similarity of the edge's adjacent colors to the colors adjacent the second border segment.

20. A method according to claim 18 and also comprising:

operating an edge detector on a portion of the second image adjacent to at least a portion of said estimated border;

generating a data structure representing spatial relationships between edges detected by the edge detector; and wherein said step of identifying at least one edge comprises comparing at least a portion of said estimated border to said data structure, thereby to select from among the edges in said data structure, edges which are adjacent to at least a portion of said estimated border, said edge having adjacent colors which correspond to colors adjacent the border portion in the first image.

21. A method according to claim 20 wherein said step of selecting a plurality of special border locations comprises searching said data structure for locally distinctive features which are generally conserved between images.

22. A method according to claim 1 and wherein said tracking step comprises searching for a plurality of locations in the second image which correspond respectively to the plurality of special border locations in the first image in that, for each special border location in the first image found to have a corresponding location in the second image, the locally distinctive feature possessed by the special border location in the first image is also possessed by the corresponding location in the second image.

23. A method according to claim 22 wherein, for at least one of said plurality of special border locations, said locally distinctive feature comprises a color junction adjacent the border and internal to the moving object.

24. A method according to claim 22 wherein, for at least one of said plurality of special border locations, said locally distinctive feature comprises a corner.

25. A method according to claim 1 wherein said border is tracked over a sequence i of images by repeatedly performing said selecting, tracking, computing and displaying steps wherein, for each repetition r, the first image comprises an image i−1 and the second image comprises an image i, and in the next repetition r+1, the first image comprises image i and the second image comprises image i+1.

26. A method according to claim 1 wherein said step of tracking comprises:

identifying candidate second image locations for each of the special border locations in the first image; and selecting candidate second image locations corresponding respectively to at least some of said plurality of special border locations and characterized in that the relative arrangement of the selected candidate second image locations in the second image is locally similar to the relative arrangement of the special border locations in the first image.

27. A method according to claim 26 wherein said identifying step includes assigning an initial probability score to each candidate second image location, said score comprising an estimate of the probability that the candidate second image location corresponds to a particular special border location, and wherein said selecting step takes place at least partly in accordance with said scores.

28. A method according to claim 27 wherein said selecting step comprises employing a relaxation technique to perform disparity analysis iterations in order to discard some of said candidate second image locations until at most a single candidate second image location remains to correspond to each of the special border locations.

29. A method according to claim 26 wherein said selecting step comprises employing a relaxation technique to perform disparity analysis iterations in order to discard candidate second image locations until at most a single candidate second image location remains to correspond to each of the special border locations.

30. A method according to claim 1 and also comprising improving said estimated border based on external input.

31. A method according to claim 27 wherein said external input comprises human operator input.

32. A method according to claim 1 wherein said step of computing an estimated border comprises filling in an estimated border between first and second special border locations in the second image based on the configuration of the border in the first image between the first and second special border locations in the first image.

33. A method according to claim 1 and also comprising improving said estimated border by adjusting said estimated border to run through at least one edges adjacent the estimated border.

34. A method according to claim 33 wherein each of the edges is an interface between first and second colors, and wherein a portion of the first image border interfaces between third and fourth colors, and wherein a consideration in deciding whether or not to replace a portion of the estimated border, corresponding to said portion of the first image border, with a particular edge, is the extent of similarity between the first and third colors and the second and fourth colors.

35. A method according to claim 33 wherein said adjusting step comprises considering each special location along the border in turn, and for each individual special location, searching for a sequence of connected edges running between the individual special location and a special location adjacent thereto.

36. Apparatus for tracking a border of a moving object through a sequence of images of the moving object including first and second images, the apparatus comprising:

a border receiver operative to receive the first image and an indication of a border of a moving object in the first image, border comprising a multiplicity of border locations including border locations having locally distinctive features internal to the moving object and border locations having locally distinctive features external to the moving object;

a border selector operative to select a plurality of special border locations to be tracked in the first image from among the multiplicity of border locations, wherein the plurality of special border locations are less than the total number of border locations, the selecting step including, for at least a portion of the border, preferring said border locations having at least one locally distinctive feature which is internal to the moving object and which is therefore generally conserved between images over said border locations having at least one locally distinctive feature which is external to the moving object;

a border tracker operative to track at least some of said plurality of special border locations from the first image to the second image; and border display apparatus operative to compute an estimated border in said second image based on an output of said tracking step and based on information characterizing said border in said first image; and to display said estimated border to a user.

* * * * *